United States Patent
Moriyama et al.

(10) Patent No.: US 6,895,182 B1
(45) Date of Patent: May 17, 2005

(54) OPTICAL RING TRANSMISSION SYSTEM USING SQUELCH METHOD

(75) Inventors: Junichi Moriyama, Kawasaki (JP); Tsutomu Chikazawa, Yokohama (JP); Yoshihisa Ikeda, Osaka (JP); Takanori Yasui, Osaka (JP); Atsuki Taniguchi, Kawasaki (JP); Masahiro Shioda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 09/695,613

(22) Filed: Oct. 24, 2000

(30) Foreign Application Priority Data

Oct. 25, 1999 (JP) .......................................... 11-302582
Jul. 26, 2000 (JP) ....................................... 2000-225992

(51) Int. Cl.[7] ............................ H04J 14/00; H04L 12/26
(52) U.S. Cl. ..................... 398/3; 398/4; 398/5; 398/59; 370/222
(58) Field of Search ............................. 398/5, 59, 3, 4; 370/223, 224, 254, 258, 216, 222, 403, 404, 405

(56) References Cited

U.S. PATENT DOCUMENTS 5,394,389 A * 2/1995 Kremer ...................... 370/223
5,537,393 A * 7/1996 Shioda et al. ............... 370/223
6,122,250 A * 9/2000 Taniguchi .................... 370/222
6,614,754 B1 * 9/2003 Usuba et al. ................ 370/222

FOREIGN PATENT DOCUMENTS

JP 9-93278 4/1997
JP 10-290249 10/1998

* cited by examiner

Primary Examiner—M. R. Sedighian
Assistant Examiner—Dalzid Singh
(74) Attorney, Agent, or Firm—Katten Muchin Zavis Rosenman

(57) ABSTRACT

An optical transmission technique for a ring transmission system that can transmit time-division-multiplexed optical signals in dual directions. An optical transmitting apparatus comprises a data link reading section, a topology creating section, a data link writing section, a squelch table creating section, a squelch table, an RIP table creating section, an RIP table, a node recognizing section, an east-side receiving unit, an east-side transmitting unit, a west-side transmitting unit, and a west-side receiving unit. When a transmission route is switched at plural positions, the squelch table and the RIP table are automatically created as soon as a crossconnect is set. With minimum setting, the ring transmission system can be normally operated without increasing the number of setting items, the squelch table can be created at a high speed using existing hardware, and an alarm can be automatically transmitted from a secondary node until each table is created.

16 Claims, 79 Drawing Sheets

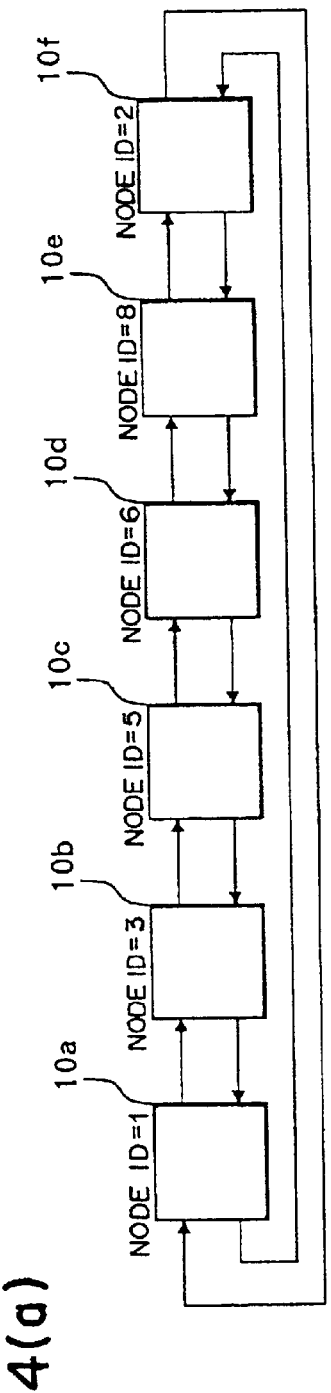

F I G. 13
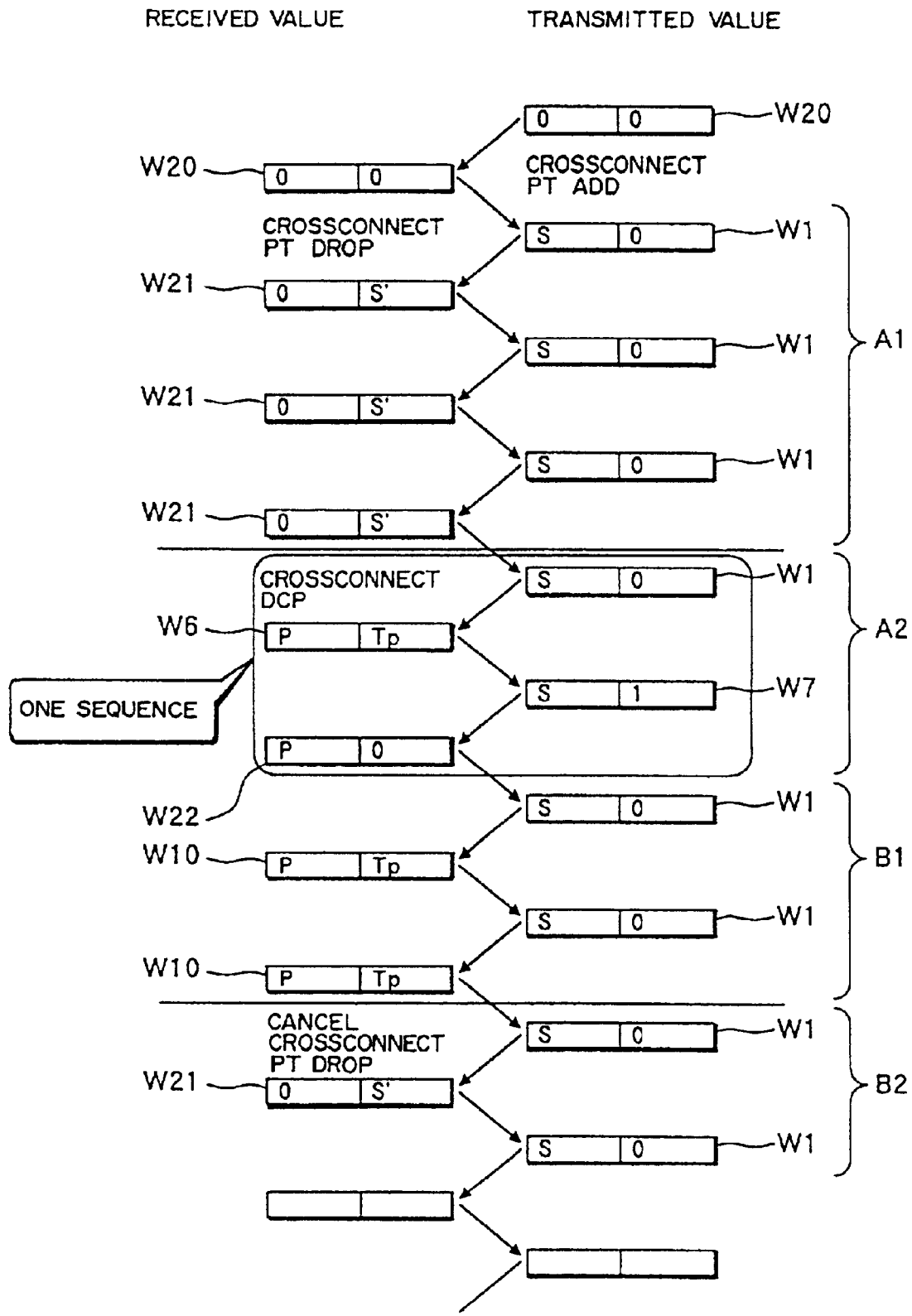

FIG.19(a)

• RING MAP OF B NODE ( NODE ID = 8 )

EAST ⟶ WEST

| NODE NAME | B | C | D | E | F | A |
|---|---|---|---|---|---|---|
| NODE ID | 8 | 3 | 1 | 5 | 9 | 6 |

FIG.19(b)

• RING MAP OF C NODE ( NODE ID = 3 )

EAST ⟶ WEST

| NODE NAME | C | D | E | F | A | B |
|---|---|---|---|---|---|---|
| NODE ID | 3 | 1 | 5 | 9 | 6 | 8 |

FIG. 21

NETWORK STRUCTURE INFORMATION TABLE (DCP/DTP/DCW/DTW STRUCTURE)

| CH | | East | | West | | DIR |
|---|---|---|---|---|---|---|
| | DROP | DC/DT-WK/PT (E) | DC/DT-WK/PT (W) | DC/DT-WK/PT (E) | DC/DT-WK/PT (W) | ADD | E→W |
| | ADD | DC/DT-WK/PT (E) | DC/DT-WK/PT (W) | DC/DT-WK/PT (E) | DC/DT-WK/PT (W) | DROP | E←W |

11 — DROP CH. INFORMATION ON EAST SIDE
12 — STRUCTURE OF EAST END (ON THE OPPOSITE NODE'S SIDE)
13 — STRUCTURE OF WEST END (ON ITS OWN NODE'S SIDE)
14 — STRUCTURE OF WEST END (ON ITS OWN NODE'S SIDE)
15 — ADD CH. INFORMATION ON WEST SIDE
16 — STRUCTURE OF WEST END (ON THE OPPOSITE NODE'S SIDE)
17 — STRUCTURE OF EAST END (ON ITS OWN NODE'S SIDE)
18 — STRUCTURE OF EAST END (ON ITS OWN NODE'S SIDE)

FIG. 22

FAILURE DETECTION PATTERNS AND OPERATIONS OF NODES (IN THE CASE OF DCP)

|   | Failure detection pattern | Operation of primary node | Operation of secondary node | Corresponding basic operation |
|---|---|---|---|---|
| a | Failure in working line involving primary node | Only DROP, stop service selector | Access to PTCT line in the opposite direction | (2-α) |
| b | Failure in working line not involving primary node | Same the above | Access to PTCT line in the opposite direction, set "drop & continue"[1], set service selector[1] | (2-γ) |
| c | Failure in protection line in the single-sided | Same the above | Stop access to PCA | (1) |
| d | Failure in a (another) span through which no signal passes | Same the above | Same the above | (1) |
| e | Failure in protection line in the double-sided | Same the above | Access to PTCT line in the opposite direction | Exception |

Comment 1) Operating "drop & continue" and "service selector" at secondary node is Optional Enhanced Operation (GR-1230, Issue 3, Fig. 3-43).

Comment 2) Pattern only in double-sided DCP.

Note) Contents of c and d are equivalent.

FIG. 23

FAILURE DETECTION PATTERNS AND OPERATIONS OF NODES (IN THE CASE OF DTP)

| | Failure detection pattern | Operation of terminal node | Operation of secondary node | Corresponding basic operation |
|---|---|---|---|---|
| a | Failure in working line involving primary node | Stop bridging to PTCT, stop path-switching | Access to PTCT line in the forward direction | (2-α) |
| b | Failure in working line not involving primary node | Same the above | Access to PTCT line in the forward direction, set "drop & continue"[1], set service selector[1] | (2-γ) |
| c | Failure in protection line | Same the above | Stop access to PCA | (1) |
| d | Failure in a (another) span through which no signal passes | Same the above | Same the above | (1) |

Comment 1) Operating "drop & continue" and "service selector" at secondary node is Optional Enhanced Operation (GR-1230, Issue 3, Fig. 3-43).

Note) Contents of c and d are equivalent.

Note) Operation of secondary node is to access to PTCT line in the opposite direction in DCP, but to access in the forward direction (direction in which the secondary node originally accesses) in DTP.

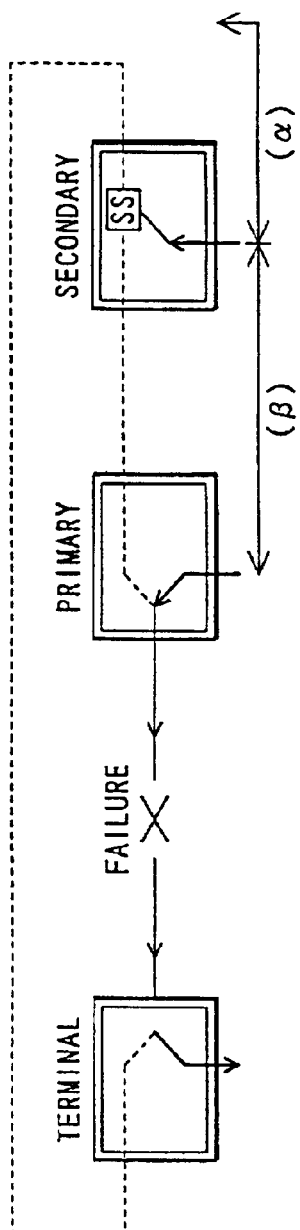
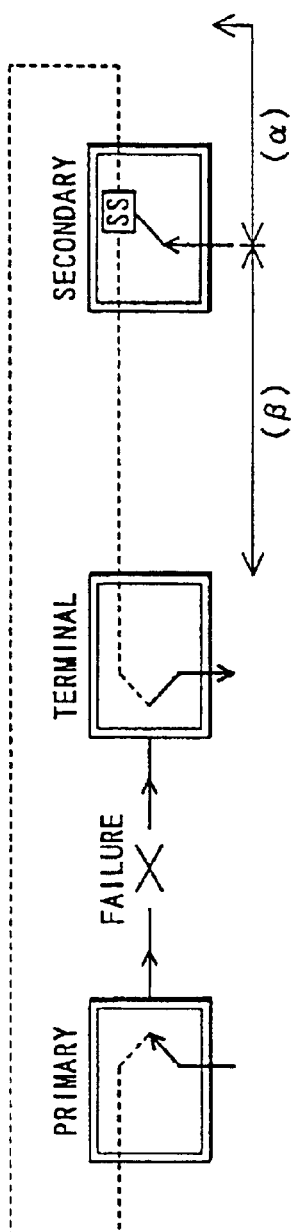
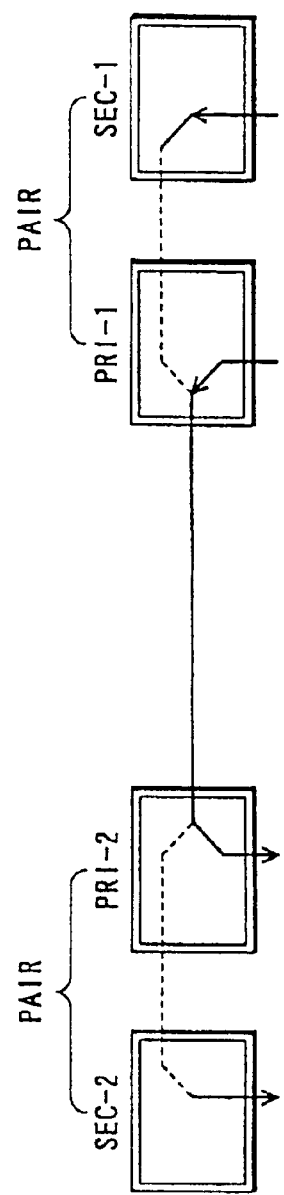
FIG. 24(a) DCP
FIG. 24(b) DTP
FIG. 24(c)

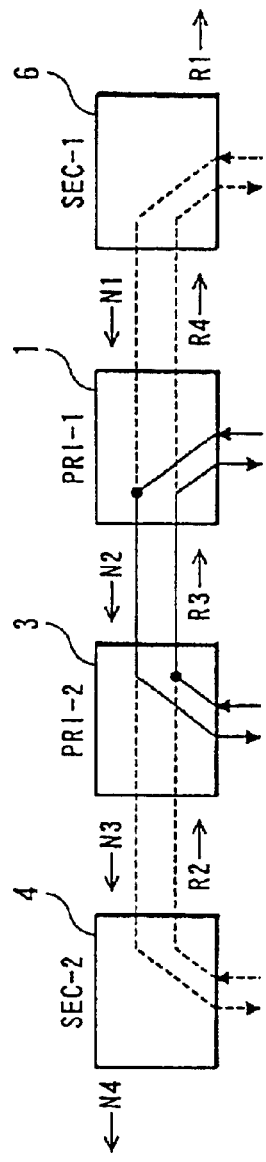
FIG. 26(a) NORMAL OPERATION
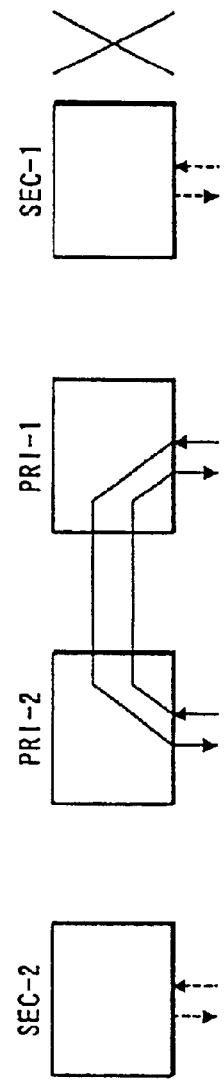
FIG. 26(b)
FAILURE POSITION LOOKED
FROM SEC-1 N4-R1
FAILURE POSITION LOOKED
FROM PRI-1 N4-R1
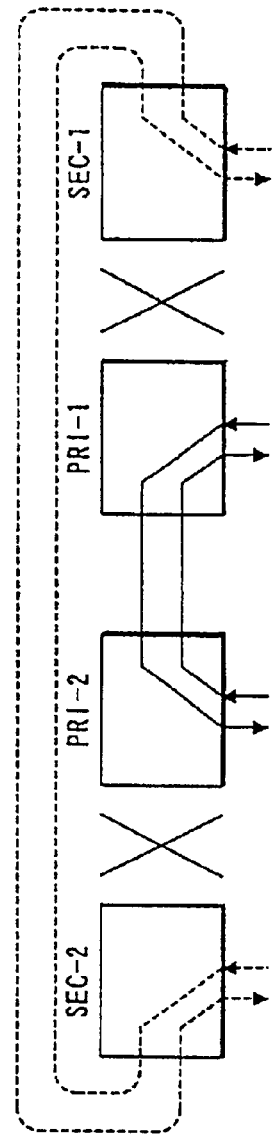
FIG. 26(c)
FAILURE POSITION LOOKED
FROM SEC-1 N1-R2
FAILURE POSITION LOOKED
FROM PRI-1 N3-R4

FAILURE POSITION LOOKED
FROM SEC-1 N1-R3
FAILURE POSITION LOOKED
FROM PRI-1 N2-R4

FAILURE POSITION LOOKED
FROM SEC-1 N2-R3
FAILURE POSITION LOOKED
FROM PRI-1 N2-R3

FAILURE POSITION LOOKED
FROM SEC-1 N1-R4
FAILURE POSITION LOOKED
FROM PRI-1 N1-R4

NORMAL OPERATION

FAILURE POSITION LOOKED
FROM SEC-1 N4-R1
FAILURE POSITION LOOKED
FROM PRI-1 N4-R1

FAILURE POSITION LOOKED
FROM SEC-1 N1-R2
FAILURE POSITION LOOKED
FROM PRI-1 N3-R4

FAILURE POSITION LOOKED
FROM SEC-1 N2-R2
FAILURE POSITION LOOKED
FROM PRI-1 N2-R2

FAILURE POSITION LOOKED
FROM SEC-1 N3-R2
FAILURE POSITION LOOKED
FROM PRI-1 N3-R2

FAILURE POSITION LOOKED
FROM SEC-1 N1-R3
FAILURE POSITION LOOKED
FROM PRI-1 N2-R4

FAILURE POSITION LOOKED
FROM SEC-1 N2-R3
FAILURE POSITION LOOKED
FROM PRI-1 N2-R3

FAILURE POSITION LOOKED
FROM SEC-1 N1-R4
FAILURE POSITION LOOKED
FROM PRI-1 N1-R4

FIG. 31(a) NORMAL OPERATION
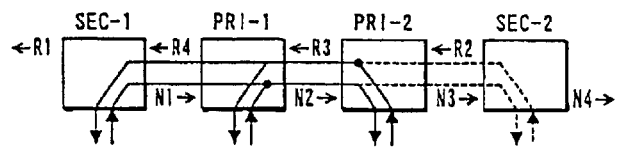

FIG. 31(b) FAILURE POSITION LOOKED FROM SEC-1 N1-R1
FAILURE POSITION LOOKED FROM PRI-1 N4-R4
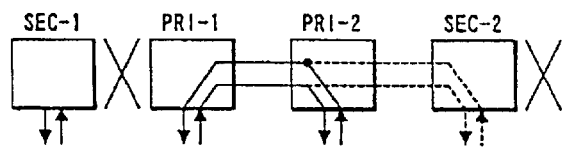

FIG. 31(c) FAILURE POSITION LOOKED FROM SEC-1 N2-R1
FAILURE POSITION LOOKED FROM PRI-1 N2-R1
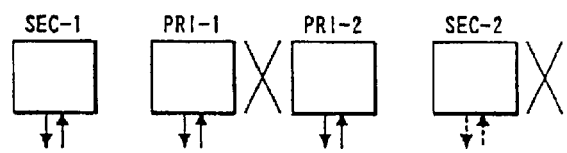

FIG. 31(d) FAILURE POSITION LOOKED FROM SEC-1 N3-R1
FAILURE POSITION LOOKED FROM PRI-1 N3-R1
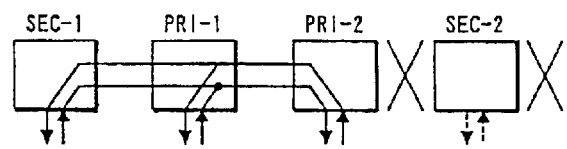

FIG. 31(e) FAILURE POSITION LOOKED FROM SEC-1 N4-R1
FAILURE POSITION LOOKED FROM PRI-1 N4-R1
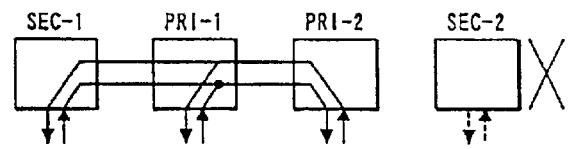

FIG. 31(f) FAILURE POSITION LOOKED FROM SEC-1 N1-R2
FAILURE POSITION LOOKED FROM PRI-1 N3-R4
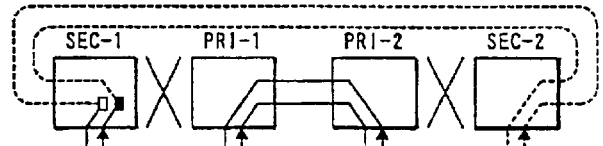

FIG. 31(g) FAILURE POSITION LOOKED FROM SEC-1 N2-R2
FAILURE POSITION LOOKED FROM PRI-1 N2-R2
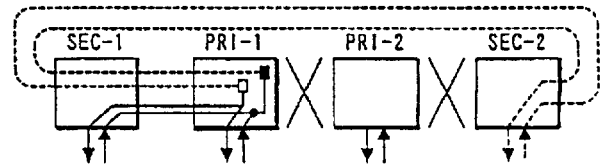

FIG. 31(h) FAILURE POSITION LOOKED FROM SEC-1 N3-R2
FAILURE POSITION LOOKED FROM PRI-1 N3-R2
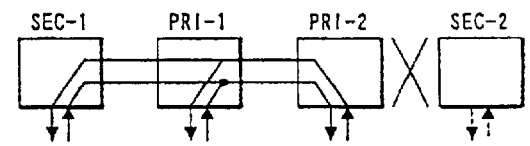

FAILURE POSITION LOOKED
FROM SEC-1 N1-R3
FAILURE POSITION LOOKED
FROM PRI-1 N2-R4

FAILURE POSITION LOOKED
FROM SEC-1 N2-R3
FAILURE POSITION LOOKED
FROM PRI-1 N2-R3

FAILURE POSITION LOOKED
FROM SEC-1 N1-R4
FAILURE POSITION LOOKED
FROM PRI-1 N1-R4

FIG. 34(a) NORMAL OPERATION 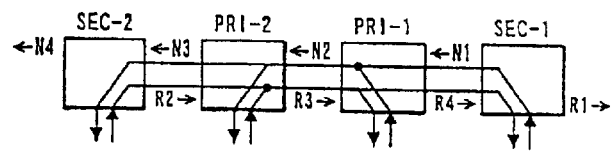

FIG. 34(b) FAILURE POSITION LOOKED FROM SEC-1 N1-R1
FAILURE POSITION LOOKED FROM PRI-1 N4-R4
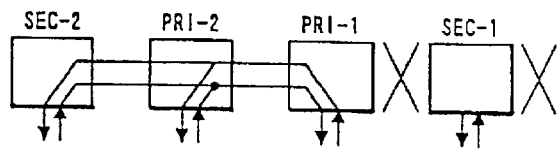

FIG. 34(c) FAILURE POSITION LOOKED FROM SEC-1 N2-R1
FAILURE POSITION LOOKED FROM PRI-1 N2-R1
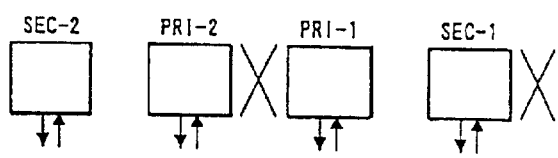

FIG. 34(d) FAILURE POSITION LOOKED FROM SEC-1 N4-R1
FAILURE POSITION LOOKED FROM PRI-1 N3-R1
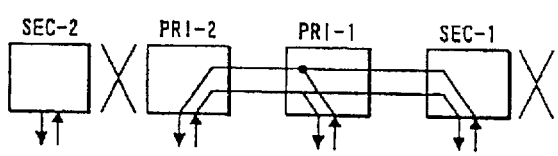

FIG. 34(e) FAILURE POSITION LOOKED FROM SEC-1 N4-R1
FAILURE POSITION LOOKED FROM PRI-1 N4-R1
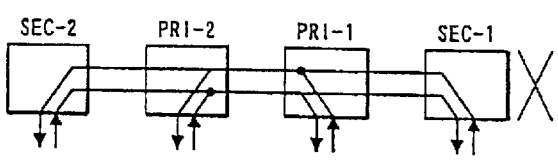

FIG. 34(f) FAILURE POSITION LOOKED FROM SEC-1 N1-R2
FAILURE POSITION LOOKED FROM PRI-1 N3-R4
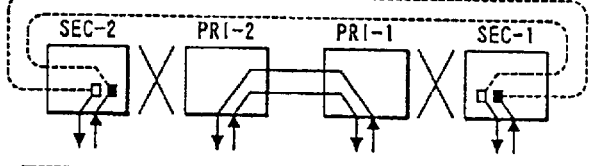

FIG. 34(g) FAILURE POSITION LOOKED FROM SEC-1 N2-R2
FAILURE POSITION LOOKED FROM PRI-1 N2-R2
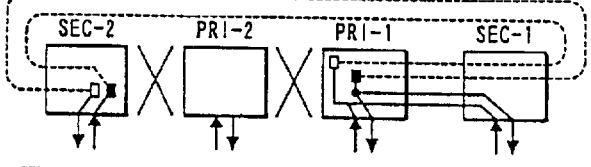

FIG. 34(h) FAILURE POSITION LOOKED FROM SEC-1 N3-R2
FAILURE POSITION LOOKED FROM PRI-1 N3-R2
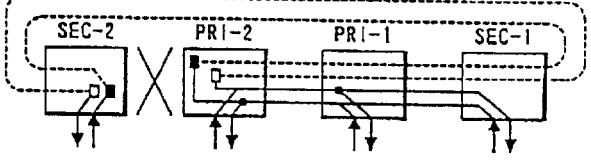

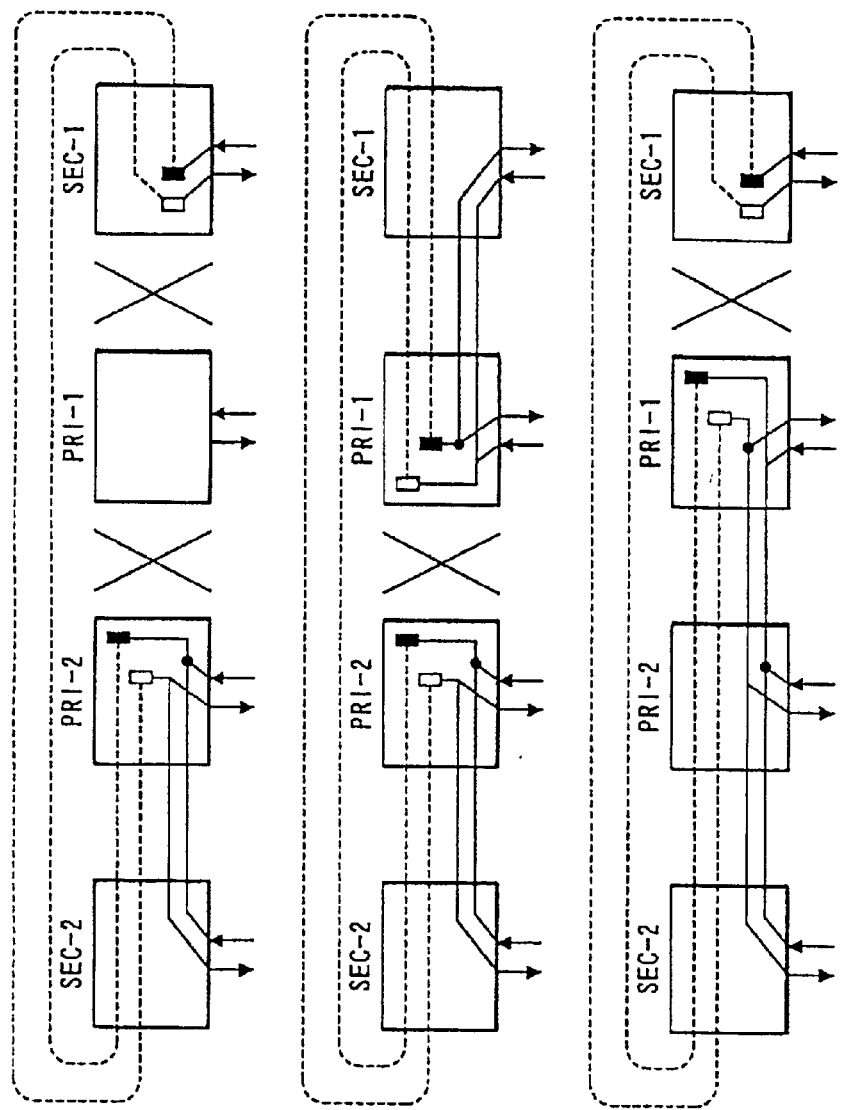
FIG. 35(a) FAILURE POSITION LOOKED FROM SEC-1 N1-R3
FAILURE POSITION LOOKED FROM PRI-1 N2-R4
FIG. 35(b) FAILURE POSITION LOOKED FROM SEC-1 N2-R3
FAILURE POSITION LOOKED FROM PRI-1 N2-R3
FIG. 35(c) FAILURE POSITION LOOKED FROM SEC-1 N1-R4
FAILURE POSITION LOOKED FROM PRI-1 N1-R4

F I G. 36
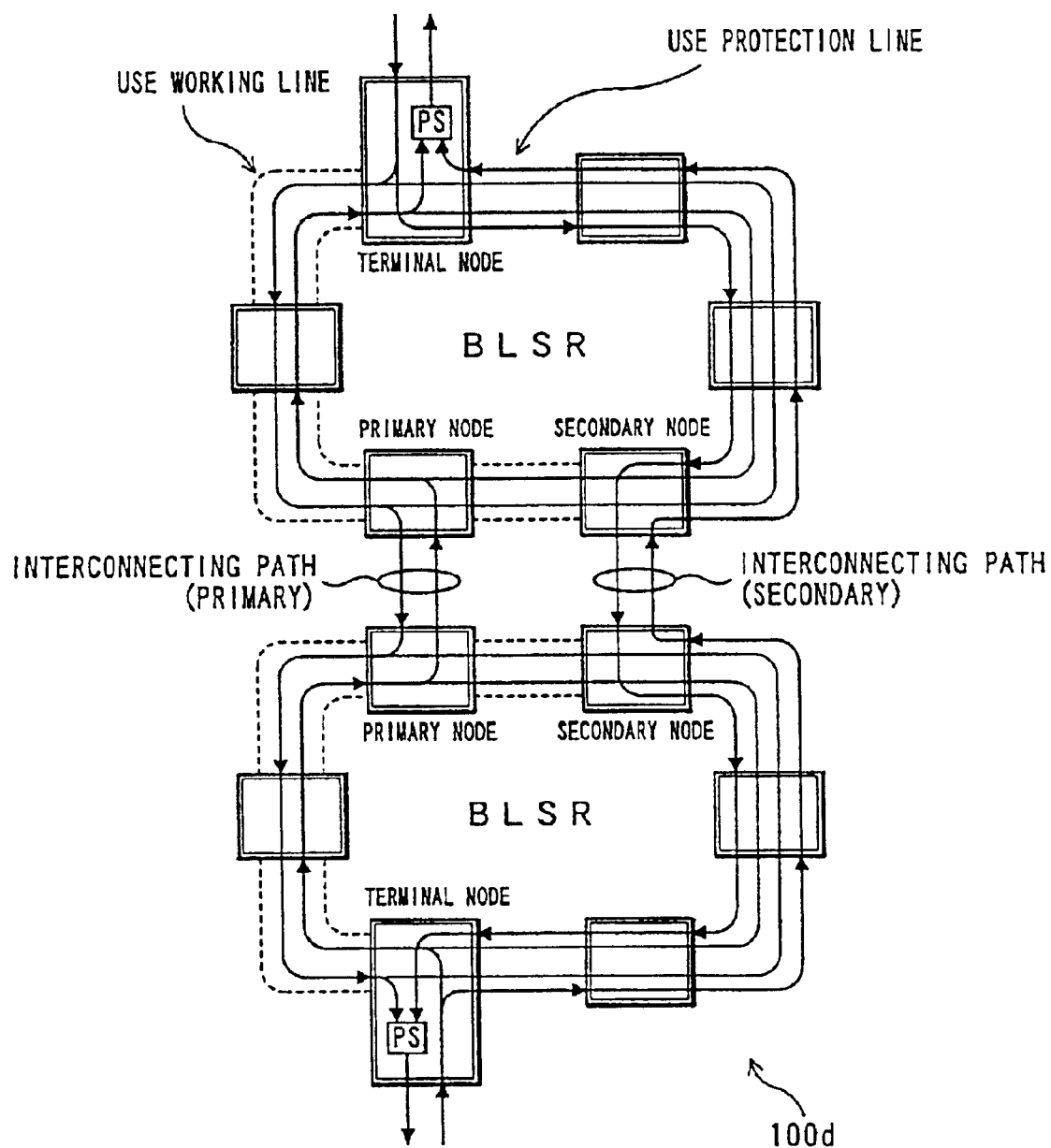

FAILURE OPERATION PATTERNS IN DTP (NORMAL BLSR)

NORMAL OPERATION

FAILURE POSITION LOOKED FROM SEC-1 N2-R1
FAILURE POSITION LOOKED FROM TERM N2-R1

FAILURE POSITION LOOKED FROM SEC-1 N2-R3
FAILURE POSITION LOOKED FROM TERM N2-R3

FAILURE POSITION LOOKED FROM SEC-1 N1-R4
FAILURE POSITION LOOKED FROM TERM N1-R4

FAILURE POSITION LOOKED FROM SEC-1 N4-R1
FAILURE POSITION LOOKED FROM TERM N4-R1

SINGLE-SIDED DCP STRUCTURE

NORMAL OPERATION

FAILURE POSITION LOOKED
FROM SEC-1 N4-R1
FAILURE POSITION LOOKED
FROM PRI-1 N4-R1

FAILURE POSITION LOOKED
FROM SEC-1 N1-R3
FAILURE POSITION LOOKED
FROM PRI-1 N2-R4

FAILURE POSITION LOOKED
FROM SEC-1 N2-R3
FAILURE POSITION LOOKED
FROM PRI-1 N2-R3

FAILURE POSITION LOOKED
FROM SEC-1 N1-R4
FAILURE POSITION LOOKED
FROM PRI-1 N1-R4

NORMAL STATE

AT THE TIME OF FAILURE OCCURRENCE

NORMAL STATE

AT THE TIME OF FAILURE OCCURRENCE

RESTORATION MEASURE

PATH SWITCH FUNCTION IS
NECESSARY HERE
(OPERATION AS A TERMINAL IN DTP)

NORMAL STATE

AT THE TIME OF FAILURE OCCURRENCE

RESTORATION MEASURE

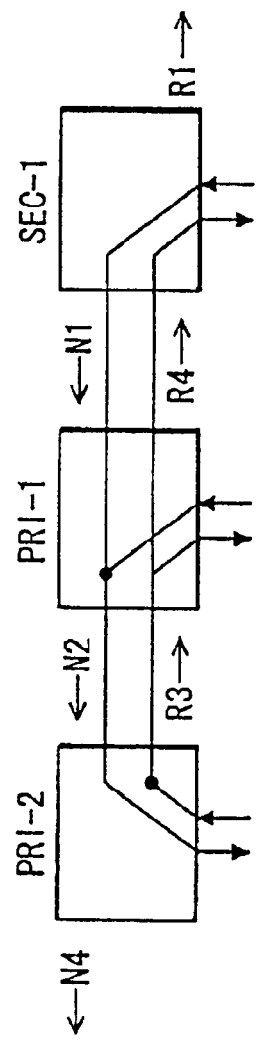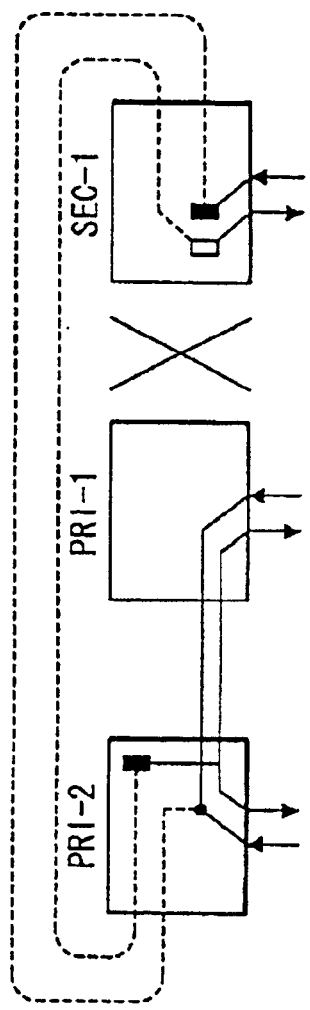
FIG. 52(a)
NORMAL OPERATION
FIG. 52(b)
FAILURE POSITION LOOKED
FROM SEC-1 N1-R4
FAILURE POSITION LOOKED
FROM PRI-1 N1-R4

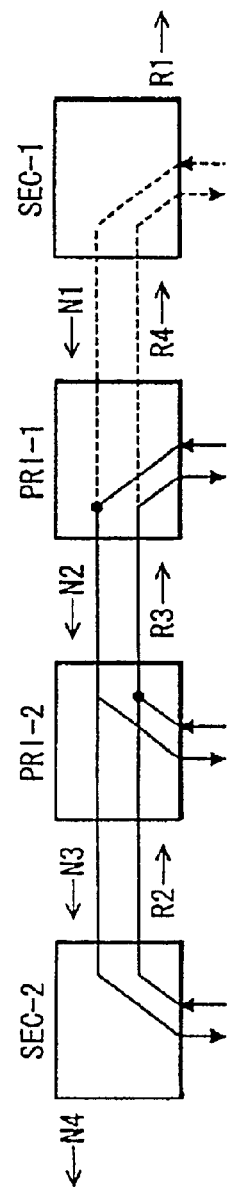
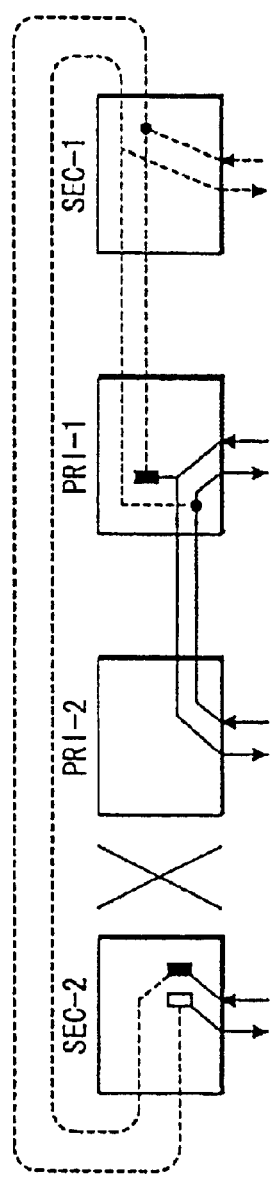
FIG. 53(a) NORMAL OPERATION
FIG. 53(b) FAILURE POSITION LOOKED FROM SEC-1 N3-R2
FAILURE POSITION LOOKED FROM PRI-1 N3-R2

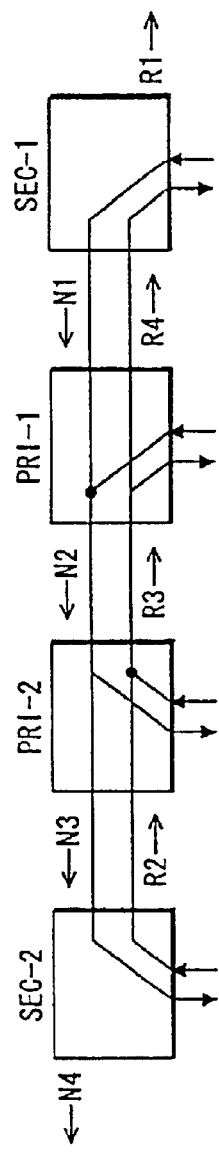
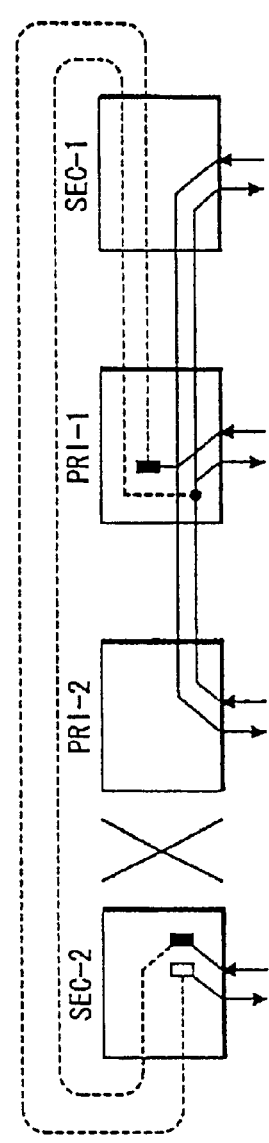
FIG. 54(a) NORMAL OPERATION
FIG. 54(b) FAILURE POSITION LOOKED FROM SEC-1 N3-R2
FAILURE POSITION LOOKED FROM PRI-1 N3-R2

F I G. 58
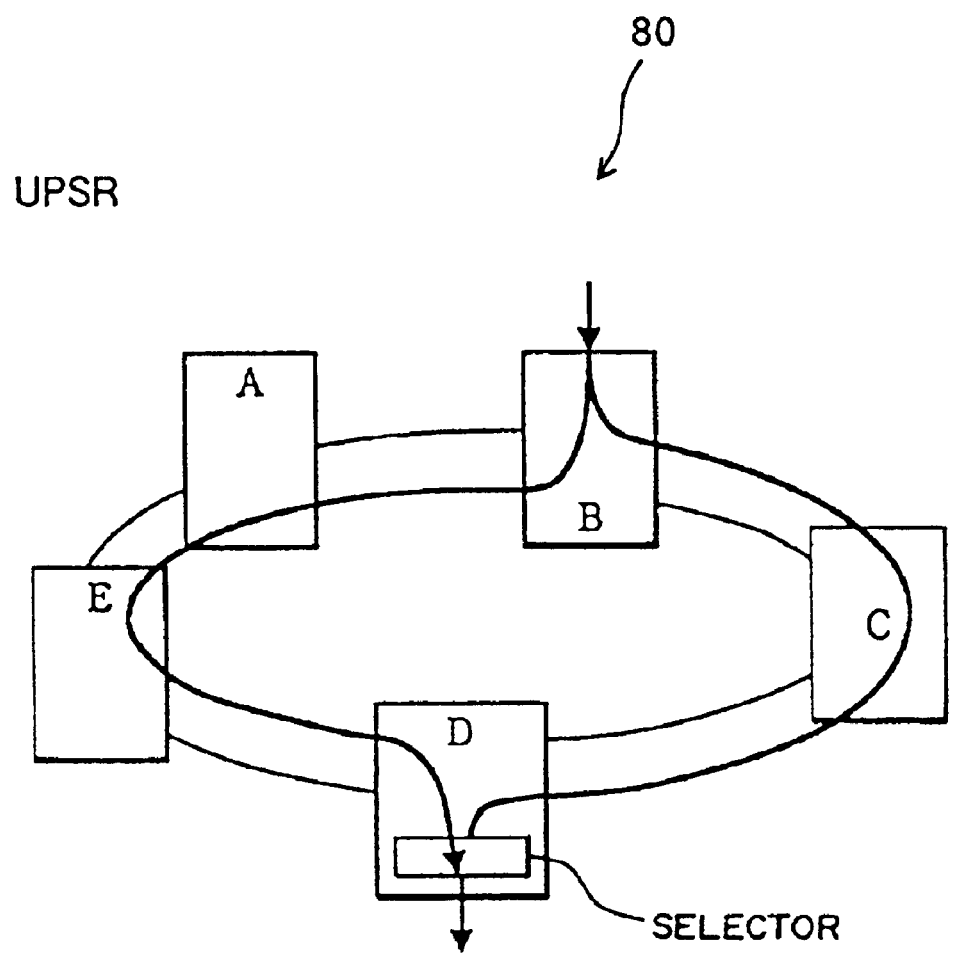

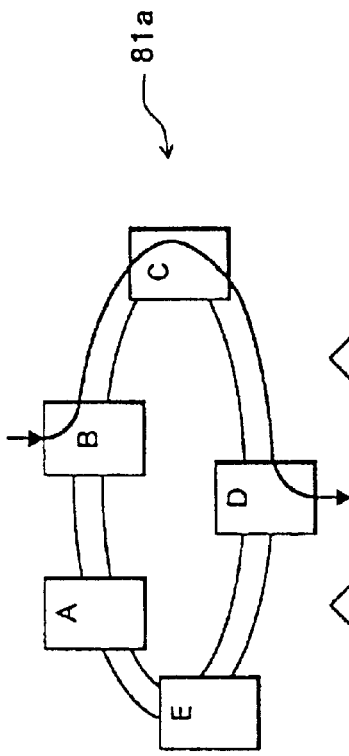
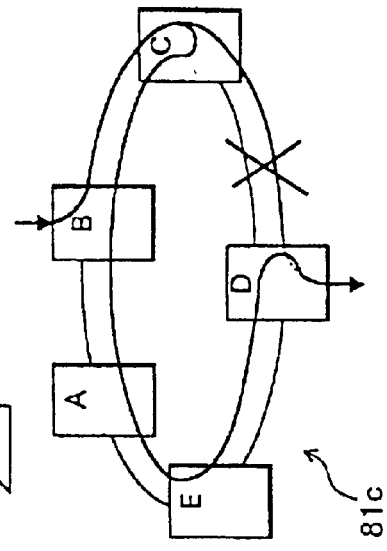
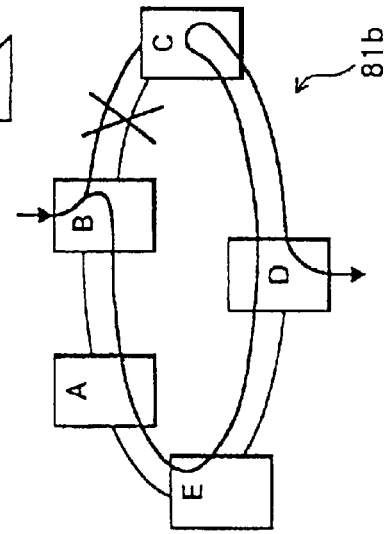
FIG. 59(a)
FIG. 59(b)
FIG. 59(c)
BLSR

FIG. 61

| EAST SIDE | | WEST SIDE | | |
|---|---|---|---|---|
| SOURCE | DESTINATION | SOURCE | DESTINATION | TRASMIT |
| DESTINATION | SOURCE | DESTINATION | SOURCE | |

E ⟶ W DIRECTION
W ⟶ E DIRECTION

| EAST SIDE | | WEST SIDE | | |
|---|---|---|---|---|
| SOURCE | DESTINATION | SOURCE | DESTINATION | RECEIVE |
| DESTINATION | SOURCE | DESTINATION | SOURCE | |

E ⟶ W DIRECTION
W ⟶ E DIRECTION

SOURCE : 4 bits
DESTINATION : 4 bits

| PATH | SOURCE NODE ID | DESTINATION NODE ID |
|---|---|---|
| 1 | B | C |
| 2 | C | A |

| | | NODE A | |
|---|---|---|---|
| | | EAST | WEST |
| PATH1 | E-W | | |
| | E-W | A | C |

| NODE B | | | |
|---|---|---|---|
| EAST | | WEST | |
| | | B | C |
| A | C | A | C |
| SOURCE | DEST. | SOURCE | DEST. |
| DEST. | SOURCE | DEST. | SOURCE |

| NODE C | |
|---|---|
| EAST | WEST |
| B | C |
| A | C |

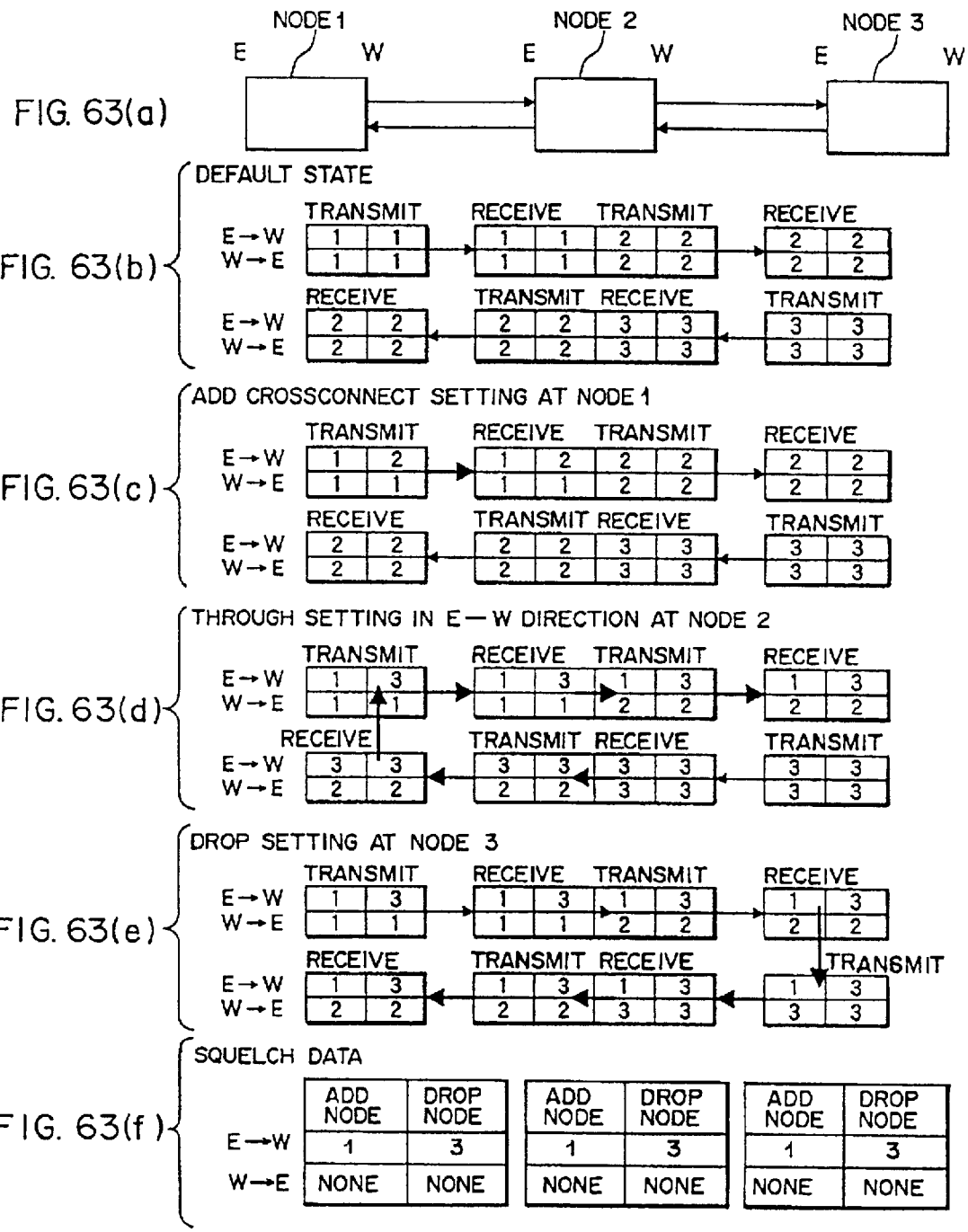

FIG. 66

|  | Operation of primary node | Operation of secondary node |
|---|---|---|
| Failure in working line involving primary node |  | Execute ADD/DROP control on PT line in a direction opposite to primary node, insert AIS in PT line toward primary node |
| Failure in working line not involving primary node | Inhibit "Continue on PT", fix switching of SS to ADD's side | Execute "Drop and Continue" on PT line toward primary node (PT line from terminal node) to transmit signals to primary node, inhibit setting of SS on PT line toward terminal node |
| Failure in protection line, failure in a span through which no signal passes | Inhibit "Continue on PT", fix switching of SS to ADD's side | Inhibit "ADD/DROP" to PT line |

FIG. 69

|  | Operation of primary node | Operation of secondary node |
|---|---|---|
| Failure in working line involving primary node |  | Keep executing "ADD/DROP" on PT line |
| Failure in working line not involving primary node | Perform normal switching operation, operate as a through station when being a through station | Execute "Drop and Continue" on PT line toward primary node (PT line from terminal node) to transmit signals to primary node, inhibit setting of SS on PT line toward terminal node |
| Failure in protection line, failure in a span through which no signal passes | Same the above | Inhibit "ADD/DROP" to PT line |
| Failure in working line or PT line involving terminal node | Same the above | Same the above |

F I G. 70
SINGLE-SIDED DCW STRUCTURE
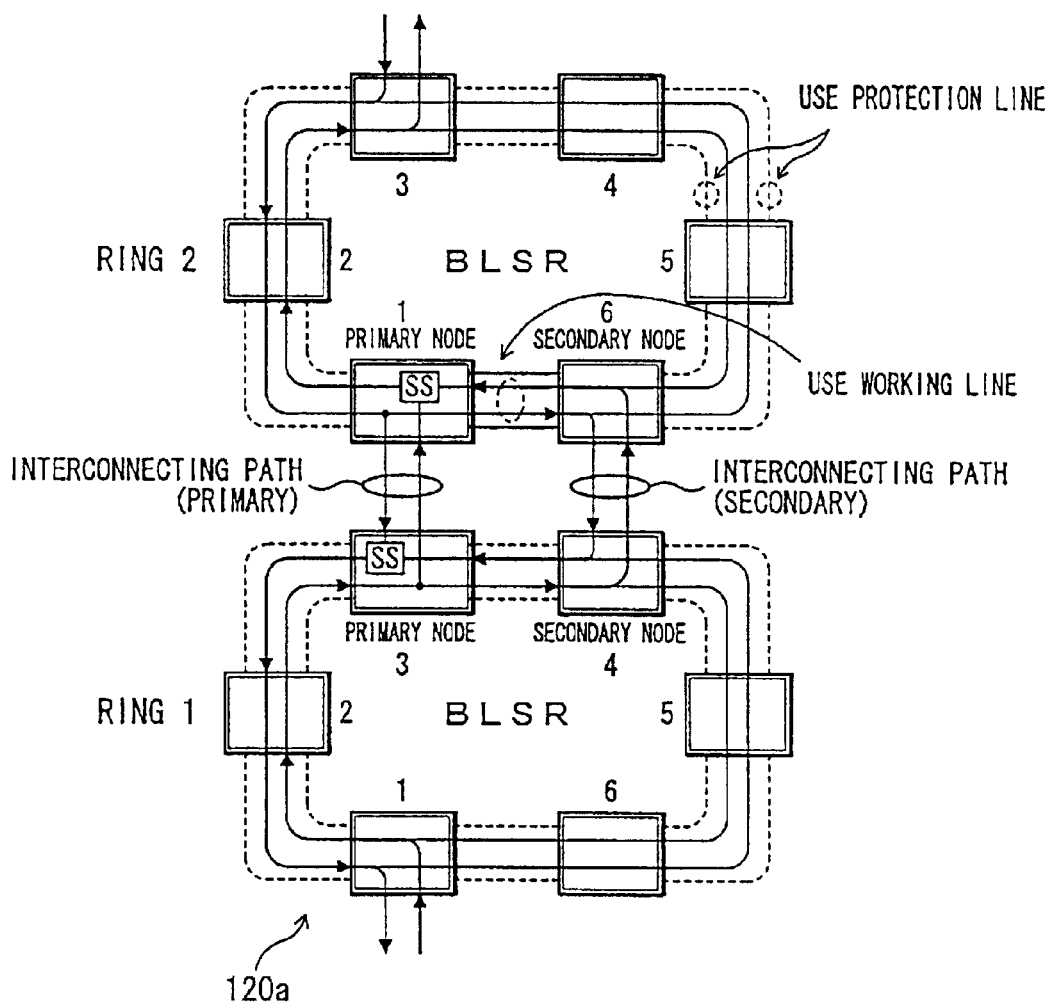

SINGLE-SIDED DCP STRUCTURE

NORMAL OPERATION IN NORMAL-BLSR

RESTORATION CONTROL IN NORMAL-BLSR

OPTICAL RING TRANSMISSION SYSTEM USING SQUELCH METHOD

BACKGROUND OF THE INVENTION (1) Field of the Invention

The present invention relates to an optical transmitting apparatus and an optical transmitting method for a ring transmission system suitable for use in a ring transmission system in which a plurality of optical transmitting apparatuses are connected to one another over a bidirectional ring transmission path having a data link channel.

(2) Description of Related Art

In optical transmission using optical fibers, signal multiplexing is done with SDH (Synchronous Digital Hierarchy) in order to improve the reliability of transmission lines, improve services, and make management easy. In concrete, the optical transmission uses architecture called SONET (Synchronous Optical Network). SONET is a high-speed leased line service adopting SDH, where a plurality of optical transmitting apparatuses are connected to one another through optical fibers to configure a transmission path in a ring form (hereinafter referred to as a ring transmission path, or merely a ring occasionally). Optical signals are transmitted in the ring-formed transmission system. On the ring transmission path, optical signals are transmitted as a plurality of time slots having been time-division-multiplexed, and a system called OC48 (Optical Carrier 48), or OC192 (Optical Carrier 192) is adopted as its transmission mode.

In OC48, 48 time slots are time-division-multiplexed, thus 48 lines are involved, whereas in OC192, 192 time slots are time-division-multiplexed, thus 192 lines are involved. A half of these multiplexed time slots are assigned to lines for working (hereinafter referred to as working lines), and the remaining half thereof are assigned to lines for protection (hereinafter referred to as protection lines). Incidentally, the working line is indicated as Working or Work, whereas the protection line is indicated as Protection, PT or PTCT.

In addition, the multiplexed time slots have a control channel called a data link channel so that the optical signals are properly transmitted to the destination. In the following description, the data link channel is occasionally referred to as a data link.

As well known, in the ring transmission system, an optical transmitting apparatus inserts an optical signal (adds an optical signal) to the ring transmission system, and the added optical signal is transmitted over optical fibers. Another optical transmission apparatus extracts the transmitted optical signal (drops the optical signal), whereby the optical signal is transferred in the ring transmission system. Namely, the data link permits add/drop information to be transmitted, which in turn allows the optical transmitting apparatuses connected through the optical fibers to read and write contents of the data link.

One line of the multiplexed time slots is called an STS line, corresponding to one structural unit of OC48 or the like. In concrete, a line referred to as STS-1 (Synchronous Transport Signal Level 1) is used. The format relating to a speed of the STS-1 line specifies a speed of 51.840 Mbit/s. OC48 therefore has a speed of 2.4 Gbps (51.840 Mbit/s×48) since 48 time slots are multiplexed.

In OC48, there are two types of structures to transmit optical signals on multiplexed 48 lines; one is two-fiber BLSR structure using one optical fiber, the other is four-fiber BLSR structure using two optical fibers. In concrete, the two-fiber BLSR structure assigns a half of the transmission capacity to a bandwidth for the working lines, assigning the other half to a bandwidth for the protection lines. In the four-fiber BLSR structure, one optical fiber is assigned to a bandwidth for the working lines, whereas the other one is assigned to a bandwidth for the protection lines. Recent use of four-fiber BLSR allows a bandwidth for working lines to be largely secured, leading to effective use of the bandwidth of the working lines. Four-fiber BLSR also permits more complicated line settings and line switching than two-fiber BLSR.

For transmission of optical signals in the ring, there are a UPSR (Unidirectional Path-Switched Ring) structure capable of transmission in only one direction, and a BLSR (Bidirectional Line-Switched Ring) structure capable of transmission in both directions. The BLSR structure becomes the mainstream, by which STS (Synchronous Transport Signal) line can be effectively used.

BLSR has two modes; normal BLSR and submarine BLSR, as will be described later.

FIG. 58 is a schematic diagram showing the UPSR structure. A ring transmission system 80 shown in FIG. 58 can transmit optical signals in only one direction. The ring transmission system 80 has five optical transmitting apparatuses (nodes) given respective node IDs (Node Identifications) A, B, C, D, and E, where an optical signal added to the node B is passed through a route along the node B and the node C, and dropped from the node D, while passed through the node A and the node E, and dropped from node D. Here, the node is the same as the optical transmitting apparatus. The optical transmitting apparatus will be occasionally referred to as a node when description is made of a ring connection in the following description. In the ring transmission system 80, transmission of optical signals is interrupted when the optical fiber between the node A and the node B, or the node A and the node C is cut due to occurrence of any failure (line failure).

FIGS. 59(a) through 59(c) are schematic diagrams of the BLSR structure, in which two lines, a working line and a protection line, are provided among nodes. A ring transmission system 81a shown in FIG. 59(a) is able to transmit optical signals in both directions. When an optical signal is transmitted from a node B toward a node D, the optical signal is outputted from the node D via a node C. FIG. 59(b) is a schematic diagram of the BLSR structure when a failure occurs between the node B and the node C. When a failure occurs between the node B and the node C as shown in FIG. 59(b), an optical signal added to the node B is transmitted along a loop in the opposite direction, taking a route along nodes having node IDs B, A, E, D, C, and D, and is dropped from the node D. FIG. 59(c) is a schematic diagram of the BLSR structure in which a failure occurs between the node C and node D. In FIG. 59(c), an optical signal added to the node B is transmitted via B, C, B, A, E, and D (node IDs), and dropped from the node D. Therefore, there are two directions to transmit the optical signal.

Since the BLSR structure can transmit a plurality of optical signals over the same line, it is possible to transmit another optical signal over the protection line, taking advantage of the fact that line switching is not done when the ring transmission system is in the idle state. Namely, the protection line is shared by a plurality of optical signals on the working line and the protection line. For this, line switching may cause a connection (misconnection) that an optical signal is inadvertently transmitted over the plural lines since the protection line accommodates a plurality of lines.

For the purpose of more complicated line switching, each node is equipped with a squelch table (Squelch Table), and a RIP table (Ring Interworking on Protection Table); hereinafter referred to as an RIP table. The squelch table will be now described with reference to FIGS. 60 through 63. The RIP table closely relates to DCP (Drop and Continue on Protection) connection, and DTP (Dual Transmit on Protection) connection representing connection modes of the ring transmission system; the squelch table will be described when DCP connection and DTP connection are explained with reference to FIGS. 64 through 69.

The above squelch is a process performed to prevent an optical signal being now transmitted from being connected to an inappropriate node and to save the optical signal, when failures occur at two or more positions on the ring transmission path and the ring transmission path is thus segmented. In concrete, the squelch signifies an operation performed by each node to add an AIS (Alarm Indication Signal) to the optical signal, thereby avoiding interference of the optical signal. The squelch is also referred to as squelching or squelch process, but they have the same meaning in their use. A state in which the ring transmission line is segmented is occasionally referred to as ring segmentation.

In order to achieve the squelch function, each node is equipped with a squelch table. The squelch table is a table in which line connection information necessary for squelching is written, that is, a table in which data showing an ID of an add node and an ID of a drop node of a line that is currently operated are written. The squelch table is provided for each STS line, by which each node can acquire cross connect information on from which node to which node a path (route) is set. The cross connect information represents a line connect state that an optical signal is to be directed in which direction, or the optical signal is to be passed through or not at a certain node in the BLSR structure.

Each node determines whether squelching should be done on an optical signal or not, specifies a position at which a failure has occurred, and compares the position with the squelch table, thereby determining whether it is possible to save the optical signal or not. When saving the optical signal is impossible, squelching is performed.

On the BLSR-structured ring transmission path, every node needs to accurately know a position on the ring transmission path at which a failure has occurred, and a relation between the position and its own position in order to form a detour for the optical signal in cooperation, as stated above. In order to determine the positional relation, individual node IDs are assigned to the nodes, and each node has the order in which the node IDs have been arranged as topology (ring topology).

FIG. 60 is a diagram showing topology. A ring transmission system 82 in the BLSR structure shown in FIG. 60 has four nodes A, B, C, and D, in which optical signals are transmitted over a working line and a protection line. Each node has E (East) and W (West) in respective directions toward two adjacent nodes. A way to determine the directions is that a direction in which an optical signal is transmitted clockwise is defined as E direction (W→E direction, eastward round, clockwise), and a direction in which the optical signal is transmitted counterclockwise is defined as W direction (E→W direction, westward round, counterclockwise), when the ring transmission system shown in FIG. 60 is looked from the top. Each node has topology (TPLOGY) in which its own node ID always takes the lead. For example, the node A has topology A, B, C, and D in which itself is in the lead.

FIG. 61 is a diagram showing a format of the data link. As stated above, the data link has crossconnect information in which and ID of an add node and an ID of a drop node are written. The ID of an add node is described as source node ID (Source Node ID), whereas the ID of a drop node is described as destination node ID (Destination Node ID).

The data link shown in FIG. 61 has the E→W direction and the W→E direction, separately, and has transmit data and received data in the respective directions.

Each piece of the crossconnect information is managed by one byte; eight bytes when the all are summed up. As each one byte, four bits are assigned to each of a source node ID part and a destination node ID part to manage information on transmission and reception. Whereby, crossconnect is set in the data link, and each node can recognize which is connected to which.

FIG. 62(*a*) is a schematic diagram of ring transmission paths having add nodes and drop nodes, in which node A, node B, and node C are connected one to another. An optical signal is added to the node C shown in FIG. 62(*a*), transmitted to the node B over a path 2, and dropped from the node A. On the other hand, an optical signal is added to the node B, transmitted to the node C over a path 1, and dropped from the node C.

FIG. 62(*b*) is a diagram showing an example of a squelch table of the node B. The squelch table 84 has two paths 1, and 2, in which a source node ID indicating an add node and a destination node ID indicating a drop node are written for each of the paths.

FIG. 62(*c*) is a diagram for comparing squelch table values of the nodes, where squelch tables 83*a*, 83*b*, and 83*c* are shown. The squelch table 83*a* shown in FIG. 62(*c*) corresponds to the west side of the node A, representing that an optical signal on the path 2 added to the node C is to be dropped from the node A. The squelch table 83*b* corresponds to the east side and the west side of the node B, in which an ID of the add node C and an ID of the drop node A are written in the column of the east side. Besides, an ID of the add node C and an ID of the drop node A in the W→E direction are written in the column of the west side, and an ID of the add node B and an ID of the drop node C in the E→W direction are written in the column of the west side, as well. In the squelch table 83*c*, an ID of the add node B and an ID of the drop node C in the E→W direction are written in the column of the east side, and an ID of the add node C and an ID of the drop node A in the W→E are written in the column of the east side.

In the squelch table 83*b* shown in FIG. 62(*c*), there are eight frames in which Source and Dest (Destination) are entered. Each of these represents an ID in the same position as a corresponding frame among the eight frames in each of the squelch tables 83*a*, 83*b*, and 83*c*. For example, B and C in the E→W entered in the column of the west side in the squelch table 83*b* represent a source node ID and a destination node ID, respectively.

In other words, an added node enters its own ID in the source node ID part, enters a destination node ID of a received data link in the destination node ID part, and transmits them. On the other hand, a dropping node enters its own node in the destination node ID part, enters a source node ID of a received data link in the source node ID part, and transmits them.

Next, description will be made of a concrete example of data flow in a data link through three nodes with reference to FIGS. 63(*a*) through 63(*f*). FIG. 63(*a*) is a schematic diagram in which three nodes are connected, where the nodes 1, 2, and 3 have node IDs 1, 2, and 3, respectively. FIG. 63(b) is a diagram showing contents of the data link at each node in the initial state, in which the node 1 writes its own absolute node ID in the source node ID part in the E→W direction when the node 1 is add-crossconnected. FIG. 63(c) is a diagram showing contents of the data link at each of the nodes when "add-crossconnect" is set at the node 1. As shown in FIG. 63(c), a node ID of a destination node received by the node 1 is entered in the destination node ID part in the E→W direction of the node 1, and transmitted.

FIG. 63(d) is a diagram showing contents of the data link at each of the nodes when "through" in the E→W direction is set at the node 2, where the node 2 receives a drop node 3, transmits this value, and transmits data received from the E side to the W side as it is.

FIG. 63(e) is a diagram showing contents of the data link at each of the nodes when "drop-crossconnect" is set at the node 3. The node 3 implements drop-crossconnect so as to write its own absolute node ID in the destination node ID part in the E→W direction, copies a received source node ID part in the source node ID part to be transmitted, and transmits them. The node 1 again replaces the destination node ID part when detecting that the received destination node ID part has been changed, and transmits it.

FIG. 63(f) is a diagram showing contents of a squelch table at each of the nodes. As shown in FIG. 63(f), when data on the transmitting side becomes identical to data on the receiving side in the squelch table at each of all the nodes, the node 1 determines that a data link in the ring transmission path is completed, and takes out the data to create a squelch table on the basis of the data link.

There are a number of items to be set when a squelch table is created, it is thus required to decrease the number of items as less as possible. It is also required that setting at each node are automatically done using information about the data link, so that the setting in the optical transmitting apparatus is readily done.

When the number of rings is one, a bandwidth for the protection line is replaced with a bandwidth for the working line when a switching is done. Therefore, it is unnecessary to perform the squelch operation, and to use the data link by the line setting to inform of a state of the line setting.

Even if crossconnect is executed in a bandwidth for the protection line, information in a bandwidth for the working line is transferred to the bandwidth for the protection line whenever a switching is done, there is thus no possibility of occurrence of misconnect as a bandwidth for the protection line. For this, there is no necessity to create a squelch table for a bandwidth for the protection line; a data link for creating a squelch table is not used for a bandwidth for the protection line.

According to the specifications of BLSR, the number of nodes possessed by one ring is 16. When nodes in number more than that is necessary, two or more rings are interconnected. This interconnection system for rings is also referred to as ring interconnection. There are four types of ring interconnection; DCW (Drop and Continue on Working), DTW (Dual Transmit on Working), DCP (Drop and Continue on Protection), and DTP (Dual Transmit on Protection).

Each node can find from a so-called RIP table which type of ring interconnection among the four itself belongs to.

Next, description will be made of an RIP table. The RIP table is a table in which information necessary to connect two or more ring transmission systems is written.

With the RIP table, a ring transmission system in which two or more rings are connected (also referred to as a dual ring transmission system) is realized.

In DCP (DCP application) and DTP (DTP application), optical signals are transmitted over a protection line between a primary node and a secondary node. In DCW (DCW application) and DTW (DTW application), optical signals are transmitted over a working line between a primary node and a secondary node.

a difference between a group of DCP and DTP, or and a group of DCW and DTW is that optical signals are transmitted over the protection line or the working line. The following description will be made by way of DCP and DTP unless otherwise provided.

The DCP connection and DTP connection stand for a connection structure in which, when an optical signal is added to a certain ring transmission system and the added optical signal is dropped to another ring transmission system, there are provided two add nodes, and better one of the added optical signals in two systems is selected at a drop node, and dropped.

Assume that, in a ring transmission system in which a first ring transmission system and a second transmission system are combined, an optical signal transmitted from another external ring transmission system is added to the first transmission system, the added optical signal is transmitted to the second ring transmission system, then the optical signal is dropped therefrom to still another external ring transmission system.

When one node in the first ring transmission system receives the optical signal from another different ring transmission system and transmits the optical signal to the second ring transmission system, two nodes of the second ring transmission system receive the optical signal separately from the first ring transmission system.

The two nodes in the second ring transmission system are called a primary node and a second node. A node in the second ring transmission system that transmits the optical signal from the first ring transmission system to another external ring transmission system is called a drop node.

The optical signal received separately by the primary node and the secondary node is transmitted in two systems in the second ring transmission system, and better one of the optical signals in two systems is selected at the drop node and transmitted to still another external ring transmission system.

The difference between the DCP connection and the DTP connection is in a positional relation between the primary node and the secondary node. In concrete, in the DCP connection, no drop node exists between the primary node and the secondary node, whereas, in the DTP connection, a drop node exists between the primary node and the secondary node.

Hereinafter, DCP and DTP will be described with reference to FIGS. 64 through 69.

FIG. 64 is a schematic diagram of the DCP connection. A ring transmission system 90 and a ring transmission system 91 shown in FIG. 64 are combined by coupling nodes belonging to the respective ring transmission systems, where optical signals can be transmitted in these plural ring transmission systems. In FIG. 64, solid lines represent working lines (expressed as "Work"), while broken lines represent protection lines (expressed as "PTCT"). In a node 90a, there is a service selector SS that transfers data. Additionally, the DCP connection is expressed as "DCP".

The ring transmission systems 90 and 91 also stand for transmission rings. Accordingly, the ring transmission systems 90 and 91 signify one ring, or two, three or more rings connected to one another. In the following description, the ring transmission system will be occasionally called merely a transmission ring or a ring.

The ring transmission system 90 receives an optical signal at two nodes, a primary node 90a and a secondary node 90b, from the ring transmission system 91. The secondary node 90b transmits the received optical signal to the primary node 90a over the protection line. The primary node 90a selects better one of the same optical signals in two systems received over the working line and the protection line, and transmits one having a better quality to a drop node 90c. The drop node 90c transmits the optical signal to another external ring transmission system.

FIG. 65(a) is a diagram showing a structure of the DCP connection. FIG. 65(b) is a diagram illustrating squelch tables of respective nodes DCP-connected to one another. The DCP connection shown in FIG. 65(a) has a drop node 90c (also referred to as node 1), a primary node 90a (also referred to as node 3), and a secondary node 90b (also referred to as node 5). The drop node 90c is arranged outside a region between the primary node 90a and the secondary node 90b. Optical signals are added to the primary node 90a and the secondary node 90b. One having a better quality of these optical signals in two systems is selected at the primary node 90a, transmitted to the drop node 90c, then transmitted to another ring transmission system (not shown) from the drop node 90c.

On the other hand, an optical signal added to the drop node 90c is transmitted over the working line and dropped from the primary node 90a, while transmitted over the protection line and dropped from the secondary node 90b. Namely, the optical signal is dropped and continued at the primary node 90a.

Squelch tables are set only in a region between the node 1 and the node 3 through which the working line passes, as shown in FIG. 65(b). In a region between the node 4 and the node 5 in which the protection line is used, no squelch table is set. In a region between the node 1 and the node 3, node IDs at both ends of a DCP-connected path are set as a source node ID and a destination node ID.

FIG. 66 is a diagram illustrating operations of the primary node and the secondary node in the DCP connection. As shown in FIG. 66, when a failure occurs in the working line involving the primary node, the secondary node executes an add/drop control on the protection line in the opposite direction to the primary node, and writes AIS that is an alarm signal in the protection line on primary node's side. When a failure occurs in the working line not involving the secondary node, the primary node inhibits "continue" of the optical signal to fix the setting of an SS (Service Selector) to add node's side. The secondary node executes "drop and continue" of the optical signal on the protection line in a direction toward the primary node to transmit the optical signal to the primary node. When a failure occurs in the protection line, or when a failure occurs in a span through which no optical signal passes, the secondary node executes an add/drop control on the protection line, and writes an AIS in a line on the primary node's side.

FIG. 67 is a schematic diagram of the DTP connection. A ring transmission system 92 and a ring transmission system 93 shown in FIG. 67 are coupled to transmit optical signals. Incidentally, solid lines shown in FIG. 67 represent working lines (denoted by "Work"), whereas broken lines represent protection lines (denoted by "PTCT").

The ring transmission system 92 receives optical signals by two nodes, a primary node 92a and a secondary node 92b, from the ring transmission system 93. The primary node 92a transmits the received optical signal to a drop node 92c over the working line, whereas the secondary node 92b transmits the received optical signal identical to the former to the drop node 92c over the protection line. The drop node 92c selects a better one of the identical optical signals in two systems received over the working line and the protection line, and transmits it to another external ring transmission system (not shown). In each of the optical transmitting apparatus 92c and an optical transmitting apparatus 93c, a switch PSW (Path Switch) for selecting and dropping data is shown. Additionally, there is also shown DTP in order to indicate the DTP connection.

FIG. 68(a) is a diagram showing a structure of the DTP connection. FIG. 68(b) is an illustrative diagram of squelch tables of DTP-connected nodes. The DTP connection shown in FIG. 68(a) has a primary node 92a (also referred to as node 1), a drop node 92c (also referred to as node 3), and a secondary node 92b (also referred to as node 5). The drop node 92c is arranged between the primary node 92a and the secondary node 92b.

To the primary node 92a and the secondary node 92b, optical signals from an external ring transmission system (not shown) are added, and transmitted to the drop node 92c over a working line and a protection line in two systems. Better one of the optical signals in the two systems is selected at the drop node 92c, and transmitted to still another ring transmission system (not shown).

On the other hand, an optical signal added to the drop node 92c from another ring transmission system is transmitted over the working line and dropped from the primary node 92a, while being transmitted over the protection line and dropped from the secondary node 92b.

Similarly, nodes that are required to set squelch tables are only in a region between the node 1 and the node 3 through which the working line passes. In addition, between the node 4 and the node 5 using only the protection line, no squelch table is set. Node IDs in a PCA (Protection Channel Access) span of a DTP-connected path between the node 1 and the node 3 are set as a source node ID and a destination node ID. The PCA signifies that optical signal are transmitted over the protection line when the line is not switched, which is eroded when the line is switched since the working line uses the protection line, whose priority is low. Namely, on the occasion of a connection to the secondary node, the PCA is used in order to avoid use of the working line.

FIG. 69 is a diagram illustrating operations of the primary node and the secondary node in the DTP connection. When a failure occurs in the working line involving the primary node, the operations are as follows:

Namely, when a failure occurs in the working line involving the primary node, the secondary node continuously executes the add/drop control on the protection line. When a failure occurs in the working line not involving the primary node, the primary node executes a normal switching operation. When the primary node merely passes optical signals therethrough, the primary node operates as a through node. The secondary node executes "drop and continue" of the optical signal on the protection line in a direction toward the primary node to transmit the optical signal to the primary node. Additionally, the secondary node performs setting of a service selector SS on the protection line toward a terminal node. The terminal node is a node having both an add function and a drop function, or a node having only the drop function.

When a failure occurs in the protection line, or when a failure occurs in a span through which no optical signal passes, the primary node carries out a normal switching operation. Only when the primary node merely passes optical signals therethrough, the primary node operates as a through node. The secondary node inhibits "add/drop crossconnect" using the protection line.

When a failure occurs in the working line or the protection line involving a terminal node, the primary node carries out a normal switching operation. Only when the primary node merely passes optical signals therethrough, the primary node operates as a through node. The secondary node inhibits "add/drop crossconnect" using the protection line, similarly.

The DCP connection and the DTP connection are used to connect two or more rings, and further improve use efficiency of the line. In the case of the DCP connection and the DTP connection in four-fiber (or two-fiber) BLSR, it is necessary to configure squelch tables in a form involving a bandwidth for the protection line. For this, the secondary node in the DCP connection and the DTP connection is required to change the line switching operation according to a span in which a failure occurs. Each node thus has to recognize information about in which span the working line is set, whether or not itself is defined as a secondary node in the DCP connection or the DTP connection, then operates.

Namely, in the case of the DCP connection or the DTP connection, an increase in number of nodes relating to a path makes it difficult to express crossconnection information by only the above squelch tables. In order to configure more complicated squelch tables and manage switching of each line, an RIP table for each node is configured so as to cope with switching in a more complicated structure. The RIP table has contents almost identical to those of the squelch table, in which node IDs of a primary, secondary, and terminal nodes are stored. Setting of these is required for each line. The setting has to be done for each node, for each STS line, and for each direction when done by the user.

BLSR technique has been standardized (GR-1230) in the classification of SONET in the specifications of Bellcore (Bellcore Corp.), a way to realize which is known. The above UPSR technique has been standardized in the classification of SONET in the specifications of Bellcore, a way to realize which is known, as well. Hereinafter, description will be mainly made of what relates to this invention; description of others is omitted.

The above BLSR is specifically referred to as normal BLSR (hereinafter expressed as "Normal BLSR" in the drawings).

One of the normal BLSRs, in which an excessive path (path in a redundant part) is eliminated on the occasion of restoration, is specifically called a submarine BLSR. The submarine BLSR is the one in which a cause of quality degradation arising when the normal BLSR is used is eliminated from the normal BLSR.

The submarine BLSR is used as a node that connects continents by, say, a submarine cable. In order to transmit optical signals from West Coast in America to Japan, a submarine cable is laid between Hawaii and Japan. When a failure occurs between Japan and Hawaii, for example, a node in Hawaii changes a direction to transmit optical signals from Japan to Alaska, the optical signals are thus transmitted to Japan via Alaska. The optical signals are transmitted for a distance equal to a round-trip between Hawaii and a position at which the failure has occurred (failure position), so that a loss of the optical signal generates due to an excessive path when the optical signal is looped back.

When a detouring distance is long and becomes tens of thousands of kilometers in total, the optical signals are looped back on the shortest route. When the submarine BLSR is used, the optical signals are looped back at the terminal node, whereby the excessive path is eliminated, which remarkably increases effect of path shortening, restoring the optical signals.

With the normal BLSR and the submarine BLSR, it is possible to improve the coefficient of line utilization and the rate of line saving, coping with an increase in transmission capacity in recent digital optical communications.

Next, description will be made of double-sided and single-sided. Namely, double-sided stands for that both ends (two nodes) of one ring are DCP- (DTP-, (DCW-, or DTW-) connected, whereas single-sided stands for that one end (one terminal node) of one ring is DCP- (DTP-, DCW-, or DTW-) connected.

In case where one ring is connected to two rings, double-sided DCW stands for a connection mode of the central ring when the central ring is DCW-connected to two rings.

On the other hand, in the case where one ring is connected to two rings, single-sided DCW stands for a connection mode of the central ring when the central ring is DCW-connected to one out of the two rings. Namely, it stands for that a position connected to another ring is only one in the ring. Double-sided and single-sided are used in the above sense in the following description.

FIG. 70 is a diagram showing a structure of single-sided DCW. In a ring transmission system 120a shown in FIG. 70, a ring 1 and a ring 2 are connected to each other. Ring 1-node 3 (indicating a node 3 of the ring 1, expressed in the same way in the following description) and ring 1-node 4 make a pair, while ring 2-node 1 and ring 2-node 6 make another pair.

The ring 1 shown in FIG. 70 is in the DCW structure with single-sided nodes 3 and 4. The ring 2 is in the DCW structure with single-sided nodes 1 and 6.

A pair of a primary node (denoted as Primary Node) and a secondary node (denoted as Secondary Node) access to the same optical signal, and transmit the optical signal to another transmission ring.

An optical signal added to a terminal node (ring 1-node 1) passes through ring 1-node 2, reaches ring 1-node 3 that is the primary node, and is split into two at the primary node. One of the split optical signals is directly dropped to the ring 2-node 1, while the other optical signal is continued to the secondary node (ring 1-node 4). The continued optical signal is added to ring 2-node 6 that is the secondary node, and transferred to the ring 2-node 1.

At the primary node (ring 2-node 1) of the ring 2, either one of the optical signal coming in from the ring 1-node 3 and the optical signal coming in from the ring 1-node 6 is selected and transferred to ring 2-node 2, and finally dropped from the terminal node (ring 2-node 3).

Unlike DCP, a path of an optical signal to ring 2-node 6 and ring 2-node 1 from ring 1-node 3 via ring 1-node 4 shown in FIG. 70 is established using the working line in the single-sided DCW. When the optical signal is transmitted over the protection line between the above points, the system is in DCP.

In FIG. 70, a path from ring 1-node 4 to ring 2-node 6 is established using the working line. Therefore, the path using the working line is occupied by the optical signal on the working line although it is redundant. This causes that other optical signal cannot use the same channel on the working line, which in turn causes a decrease in coefficient of line utilization.

With respect to DCW, the line in a single ring is occupied by optical signals on the working line, which leads to a decrease in coefficient of line utilization.

Meanwhile, it is possible to provide another node between ring 2-node 1 and ring 2-node 6.

FIG. 71 is a diagram showing a structure of DTW. In a ring transmission system 120b shown in FIG. 71, optical signals are transmitted over a working line (Working) in dual directions (Dual) by one terminal node in a ring 1 or a ring 2.

Ring 1-node 3 and ring 1-node 4, and ring 2-node 1 and ring 2-node 6 shown in FIG. 71 are connected as primary nodes and secondary nodes, respectively, thereby connecting the rings.

An optical signal added to ring 1-node 1 that is a terminal node is split into two; one to be transmitted on the eastward round (clockwise), and the other to be transmitted on the westward round (counterclockwise). The optical signal from ring 1-node 1 reaches ring 1-node 3 that is the primary node via ring 1-node 2, and transferred to ring 2-node 3 that is the terminal node via ring 2-node 1 and ring 2-node 2 as it is. On the other hand, the optical signal added to the ring 1-node 1 is transferred counterclockwise to ring 2-node 3 via ring 1-node 6, ring 1-node 5, . . . and ring 2-node 4.

Ring 2-node 3 that is the terminal node performs path-switching (Path Switch) on the received optical signal transmitted clockwise and the received optical signal transmitted counterclockwise to finally drop either one of the optical signals.

On the other hand, ring 1-node 1 (terminal node) selects either one of paths of the optical signal transmitted from ring 1-node 3 (primary node) over the working line and the optical signal transmitted in the opposite direction from ring 1-node 4 (secondary node) over the protection line, and drops either one having a better quality to transmit it to another ring. An optical signal added to the ring 1-node 1 (terminal node) is connected to ring l-node 3 (primary node) over the working line, while connected to ring 1-node 4 (secondary node) in the opposite direction.

In DTW, the service selector control is not performed at ring 1-node 3 (primary node), and a direction of adding/dropping at ring 1-node 4 (secondary node) is opposite to that in DCP. Similarly to DCW described above, an optical signal transmitted on the eastward round and an optical signal transmitted on the westward round are both transmitted over the working line in DTW.

Next, description will be made of line connection modes using RIP tables with reference to FIGS. 72 and 73. FIG. 72 is a diagram showing a structure of single-sided DCP. A ring transmission system 120c shown in FIG. 72 is DCP-connected at terminal nodes (ring 1-node 3, ring 1-node 4) in a ring 1, while DCP-connected at other terminal nodes (ring 2-node 1, ring 2-node 6) in a ring 2, as well.

Ring 2-node 1 shown in FIG. 72 drops an optical signal from ring 2-node 3 (terminal node) over the working line, and continues the optical signal toward a secondary node (ring 2-node 6). The secondary node (ring 2-node 6) drops the optical signal over the protection line.

On the other hand, ring 2-node 1 is inputted thereto an optical signal transmitted from ring 1-node 3 over the working line and an optical signal transmitted from the ring 2-node 6 over the protection line, selects either one of them by a service selector SS, and transmits the selected optical signal to ring 2-node 2 over the working line.

This single-sided DCP differs from the single-sided DCW (refer to FIG. 70) in that the optical signal transmitted from the ring 1-node 3 to ring 2-node 6 and ring 2-node 1 via ring 1-node 4 is transmitted over the protection line. Namely, the optical signal is transmitted from ring 1-node 3 to finally ring 2-node 1 over the working line. When the rings are interconnected using RIP tables, it is possible to transmit another optical signal over the working line in a span interconnected over the protection line. For this, the single-sided DCP has a higher coefficient of line utilization than the single-sided DCW.

Namely, a difference between the single-sided DCP and the single-sided DCW is in interconnected portions between the primary nodes and the secondary nodes of ring 1-node 3 and ring 1-node 4, and ring 2-node 1 and ring 2-node 6, respectively.

Incidentally, in FIG. 72, another node may be installed between ring 2-node 1 and ring 2-node 6.

FIG. 73 is a diagram showing a structure of DTP. A ring transmission system 120d shown in FIG. 73 is DTP-structured at one terminal node in a ring. Namely, in the ring 1, ring 1-node 1 (terminal node) selects a path of either an optical signal transmitted from ring 1-node 3 (primary node) over the working line or an optical signal transmitted in the opposite direction from the ring 1-node 4 (secondary node) over the protection line, and drops an optical signal on the selected path.

On the other hand, an added optical signal is connected to ring 1-node 3 (primary node) over the working line, while being connected to ring 1-node 4 (secondary node) over the protection line.

The above is similar in a ring 2. Ring 2-node 3 (terminal node) selects a path of either an optical signal from ring 2-node 1 (primary node) over the working line or an optical signal in the opposite direction from ring 2-node 6 (secondary node) over the protection line, and drops an optical signal on the selected path. An added optical signal is connected to ring 2-node 1 (primary node) over the working line, while being connected to ring 2-node 6 over the protection line.

A difference between DTP and DCP is in positional relation between the primary node and the secondary node; DCP is a connection without a drop node between the primary node and the secondary node, whereas DTP is a connection with a drop node between the primary node and the secondary node. Unlike DTP, a service selector SS is provided in the primary node in DCP. In DTP, an optical signal in the counterclockwise direction added from ring 1-node 1 is transmitted over the protection line, unlike DTW.

Namely, in the ring 1, ring 1-node 3 and ring 1-node 4 are DTP-connected, whereas ring 1-node 1 and ring 1-node 6 is not DTP-connected.

As above, when either one of optical signals in two systems added to two add nodes is selected and dropped, and the rings are interconnected using RIP tables, a line span interconnected using the protection line can be used for transmission of another optical signal using the protection line, which leads to a higher coefficient of line utilization than that of DTW.

Next, description will be made of a loop-back control when a failure occurs in the normal BLSR with reference to FIGS. 74 and 75.

FIG. 74 is an illustrative diagram of transmission as normal BLSR in normal operations (in normal time in the Normal-BLSR). An optical signal added from the W (West) side to a node C in a ring 200 shown in FIG. 74 is transmitted counterclockwise, finally reaches a node F via a node B and a node A, and is dropped from the E (East) side of the node F. To the contrary, an optical signal added from the E side of the node C is transmitted clockwise to the node D, and dropped from the W side of the node D.

Optical signals in the normal BLSR are transmitted over the same working line in the ring 200, so that the normal BLSR has a higher coefficient of line utilization than the UPSR.

FIG. 75 is a diagram illustrating a line restoration control (restoration control in the Normal-BLSR). FIG. 75 shows flow of optical signals under a control for line restoration when a failure occurs between the node A and the node B in the ring 200 shown in FIG. 74.

When the failure occurs, the node A and the node B shown in FIG. 75 loop-back optical signals as failure nodes situated on both sides of the failure position. Line information is transmitted counterclockwise from the node C toward the node F shown in FIG. 75.

The optical signal is looped-back at the node B by a bridge from the working line to the protection line, passes through the node C, the node D, the node E, the node F, and the node A, again is looped-back toward the node F, then is dropped from the E (East) side of the node F. An optical signal being transmitted from the node C toward the node D is continuously transmitted as it is since the optical signal is not affected by the failure.

The optical signal transmitted from the node C to the node F passes through extra paths until reaching the node F. These extra paths are a path between the node B and the node C, and a path between the node A and the node F shown in FIG. 75, which are detouring routes.

As above, there are many kinds of modes of ring connection. It is required that optical signals be transmitted not only safely but also for the shortest distance between nodes configuring the ring.

Meanwhile, as types of ring connection, there are connections between DCW (own node) and DCP (opposite node), DCW (own node) and DCW (opposite node), etc. However, the loop-back control method does not differ depending on only a type of the connection.

Further, as another mode of connection, there are a primary node and a secondary node of own nodes and the opposite nodes. When rings are interconnected, the primary node has two optical signals; one is dropped from a primary node or a secondary node of another ring to be added to its own ring, and the other is dropped from the primary node or the secondary node of another ring, added to a secondary node of its own ring, and reaches the primary node over the working line or the protection line.

The service selector function selects one having a better quality of the former and latter optical signals, and transmits the selected optical signal to a node that is an object of the transmission. The technique regarding the service selector function in the BLSR is described in standards of SONET, thus is known; detailed description of which is omitted.

Next, description will be made of a loop-back control with respect to transmission for the shortest distance by way of example where the number of rings is three in the case of connections between DCW (own node) and DCP (opposite node), and DCW (own node) and DCW (opposite node).

FIG. 76 is an illustrative diagram of a DCP-DCW inter-ring connection, showing a modified connection of double-sided DCP. One side of a ring 2 shown in FIG. 76 is DCP-connected to a ring 1, the other side of the ring 2 is DCW-connected to a ring 3, and ring 2-node 4 (secondary node) in the DCP structure and ring 2-node 6 (secondary node) in the DCW structure are connected over the protection line, the working line and the working line. Before a failure occurs, an optical signal is added to ring 3-node 1 and dropped from ring 1-node 3.

First, an optical signal is added to ring 3-node 1, and transmitted to ring 3-node 3. From node 3, one of the split optical signals is transmitted to ring 2-node 1, while the other is transmitted to ring 2-node 6 via ring 3-node 4 (secondary node), then to ring 2-node 1 (primary node).

At ring 2-node 1, either one of the optical signals coming in from the two directions is selected by a service selector SS, and the one having a better quality is transmitted to ring 2-node 3 via ring 2-node 2. One of the optical signals split at ring 2-node 3 is transmitted to ring 1-node 1, whereas the other is transmitted to ring 1-node 1 via ring 2-node 4 and ring 1-node 6. The optical signal is transmitted by a service selector SS to ring 1-node 3 from the ring 1-node 1, then dropped therefrom. The optical signal is transferred over the working line between ring 2-node 1 (primary node) and ring 2-node 6 (secondary node).

In FIG. 76, it is possible to provide another node between ring 2-node 3 and ring 2-node 4, or ring 2-node 1 and ring 2-node 6.

How the line restoration is controlled when a failure occurs in the working line will be next described, focusing on a portion in which a transmission route of the optical signal is changed due to the failure.

Description will be first made of a detouring route established when a failure occurs with reference to FIG. 77. FIG. 77 is a diagram illustrating a ring at the time of failure occurrence, where a failure occurs in a ring transmission system 500 having a ring switch function. FIG. 77 shows a DCP-DCW connection, in which it is assumed that a failure occurs between a primary node (ring 2-node 1) and a secondary node (ring 2-node 6) corresponding to opposite nodes of ring 2-node 3 and ring 2-node 4, respectively. In this example, a region between DCP (own nodes) and DCW (opposite nodes) shows line restoration in a known apparatus.

When a failure occurs between ring 2-node 1 and ring 2-node 6, an optical signal transmitted from ring 3-node 4 to ring 2-node 6 is ring-bridged due to the occurrence of failure, and looped-back over a protection line on the westward round. Accordingly, the path of the optical signal is changed at ring 2-node 6.

The optical signal is next transferred to ring 2-node 3 via ring 2-node 5 and ring 2-node 4. The optical signal transferred over the protection line on the westward round (counterclockwise) is switched to a working line on the eastward round (clockwise) by a ring switch in ring 2-node 3 to be restored.

The optical signal looped-back at ring 2-node 6 and transmitted to ring 2-node 5 and ring 2-node 4 over the protection line is dropped (DTP-switch-drop-West) from ring 2-node 4, then added to ring 1-node 6. The added optical signal is further transferred to ring 1-node 1, controlled by a service selector in ring 1-node 1, transferred to ring 1-node 2 and ring 1-node 3, and dropped therefrom.

In the BLSR structure, the number of nodes in one network is limited up to 16 according to byte limitation of APS signal. Additionally, four bits are used to represent an absolute node ID in the present data link, so that all data (0 to 15) that can be expressed by four bits is used to indicate a node ID; no region for representing additional information is left therein. It is therefore impossible to use a flag or the like to transmit information in order to notify of the working line and a use span at the secondary node, so that information used to normally carry out a switching process cannot be notified.

When line setting is executed and each piece of information is notified, each node cannot recognize at which timing data on the data link is changed. It is therefore necessary for each node to recognize completion of a change in the squelch table to prevent beforehand a misconnect that may occur due to a switching. When plural pieces of information is notified in the data link, each node cannot recognize when a change in the data link is completed.

In addition, when a failure occurs while a data link is under establishment, each node cannot know that the data link is not transmitted beyond a certain node. Each node thus cannot recognize whether or not the all nodes normally receive the data link and squelch tables are created.

As a result, six problems arise as follows: First, when each node creates a squelch table and an RIP table and carries out crossconnect-setting in the DCP connection and the DTP connection, values of the data link are always varied. In this case, the terminal node has to create a squelch table without using a node ID of its own in some occasion, thus cannot clearly determine whether the data link is completed or not. The terminal node also has to create data including the protection bandwidth. The current manner has a problem that each node cannot notify of a state of setting of the protection bandwidth.

Second, the RIP table and the squelch table are incompatible although having similar features. Hardware of these optical transmitting apparatus is suited to create the squelch tables, but not suited to create the RIP table having a large amount of information. However, a new apparatus is sometimes connected to an old one in a ring system; it is impossible to newly produce the hardware.

Third, a meaningless value does not exist among values that can be expressed with four bits even when information on two or more nodes is attempted to be notified a secondary node, so that it is impossible to notify of which value indicates which in information changing momentarily. For this, the normal system operation is impossible unless the user performs various setting for each STS line. Further, when a switching occurs before squelch data is completed, the squelch operation does not normally carried out; which requires an alarm to be notified each node in order to make it known to every node. In this case, each node cannot recognize when the squelch table and the RIP table are completed, so that it is impossible to notify of occurrence or cancellation of the alarm.

Four, the system is configured in complicated operations, which requires a number of settings in order to normally operate the optical transmitting apparatus, leading to a difficult-to-use optical transmitting apparatus. If the measurement is made by changing an amount of information of the data link, it is essential to reform the hardware of the optical transmitting apparatus being now shipped, and to replace the hardware of the optical transmitting apparatus in operation.

Further, there are fifth and sixth problems.

When a failure occurs in the line restoration control shown in FIG. 75, the optical signal passes through the redundant paths, leading to transmission delay and degradation of the optical signal. The degradation of the optical signal in turn requires to increase the number of repeaters to be installed, leading to an increase in cost. For this, there is a demand for an apparatus having a function of being able to loop-back for the shortest distance. Ring 2-node 3 shown in FIG. 77 selects the optical signal transmitted from ring 2-node 4 over the protection line by switching the ring switch. The optical signal received via ring 3-node 3 (primary node), ring 2-node 1 (primary node), and ring 2-node 2 is not selected at all; an optical signal having a high quality cannot be received.

FIGS. 78 and 79 are diagrams for illustrating failures occurring in networks without the ring switch function. A failure occurs between ring 2-node 1 and ring 2-node 6 shown in FIG. 78.

An optical signal from ring 3-node 4 is ring-bridged at ring 2-node 6, transmitted over a protection line, and ring-switched at ring 2-node 1 that is a failure detecting node. The optical signal is controlled by a service selector at ring 2-node 1, sent back to ring 2-node 2, and dropped from ring 2-node 3 to ring 1-node 1. At ring 2-node 3, the optical signal received from ring 2-node 2 is unconditionally selected, and transferred to ring 1-node 1.

Fifth, when the optical signal is looped-back at the failure detecting node (ring 2-node 1) as above, the optical signal passes through a redundant path over the protection line from ring 2-node 4 to ring 2-node 1, causing degradation of quality of the optical signal.

In FIG. 79, when a failure occurs between ring 2-node 4 and ring 1-node 6, an optical signal being dropped for the shortest distance from ring 2-node 4 loses its path. Accordingly, the optical signal is outputted from ring 2-node 4, travels around almost the entire protection line of the ring 2, is looped-back at ring 2-node 1, and is dropped from ring 2-node 3 to ring 1-node 1. As a result, the optical signal passes through a redundant path in order to restore the line.

SUMMARY OF THE INVENTION

In the light of the above shortages, the first object of this invention is that, when a transmission route is switched at plural positions in a ring transmission system that can bidirectionally transmit time-division-multiplexed optical signals, a squelch table used to normally perform squelching and an RIP table necessary for each node to recognize the DCP connection or DTP connection are created automatically and with minimum setting as soon as a data link is set, whereby the ring transmission system normally operates.

The second object of this invention is to create a squelch table at a high speed using existing hardware to enable effective information transmission, and to efficiently create an RIP table having a larger information quantity than the squelch table.

The third object of this invention is to automatically generate an alarm until the above tables are created, using an information quantity possessed by a current data link without increasing the number of setting items even when the data link is established.

The fourth object of this invention is to allow each node to achieve an RIP function and a function of looping back optical signals on a working line and protection line for the shortest distance by providing a line connection table that permits central path management, and to recognize a line type and an interconnection mode between nodes used by the opposite node, whereby the coefficient of line utilization and the line failure restoration rate are improved. Further, the fourth object of this invention is to allow a terminal node adding or dropping an optical signal to loop-back the optical signal, and to allow rings of not only four nodes but also three nodes or two nodes to be connected with each other.

The fifth object of this invention is to control restoration of a special optical signal and to ring-interconnect when a special failure occurs (hereinafter referred to as a special example).

The present invention therefore provides an optical transmitting apparatus for a ring transmission system used in a ring transmission system in which a plurality of optical transmitting apparatuses are connected to one another over a bidirectional ring transmission path having a data link channel in which crossconnect information representing an add node identifier representing a node adding an optical signal and a drop node identifier representing a node dropping an optical signal is written, the optical transmitting apparatus comprising a data link reading section for reading the crossconnect information and topology information uniquely representing the order of arrangement of optical transmitting apparatuses connected in ring, a topology creating section for creating topology using the topology information read by the data link reading section, a data link writing section for writing a unique absolute node identifier given to each of the plural optical transmitting apparatuses and a relative node identifier given by relating absolute node identifiers of other nodes with the topology in the crossconnect information of the data link channel on the basis of the topology created by the topology creating section, and a squelch table creating section for creating a squelch table holding the crossconnect information written in the data link channel.

As above, it is possible to perform line setting and normally create the squelch table or the RIP table without reforming existing hardware in the case of a DCP structure or a DTP structure. Each node is informed that the squelch table is not yet created until creation of the squelch table is completed, so that possibility of occurrence of misconnect is diminished.

The present invention further provides an optical transmitting apparatus for a ring transmission system used in a ring transmission system in which a first ring transmission system in which a plurality of optical transmitting apparatuses are connected to one another over a bidirectional ring transmission path having a data link channel in which crossconnect information representing an add node identifier representing a node adding an optical signal and a drop node identifier representing a node dropping the optical signal is written is coupled with a second ring transmission system in which a plurality of optical transmitting apparatuses are connected to one another over a bidrectional ring transmission path having the data link channel, the optical transmitting apparatus comprising a data link reading section for reading the crossconnect information of the data link channel and topology information uniquely representing the order of arrangement of optical transmitting apparatuses connected in ring, a topology creating section for creating topology using the topology information read by the data link reading section, a data link writing section for writing a unique absolute identifier given to each of a plurality of optical transmitting apparatuses and a relative node identifier given by relating absolute node identifiers of other nodes with the topology in the crossconnect information of the data link channel on the basis of the topology created by the topology creating section, a squelch table creating section for creating a squelch table holding the crossconnect information written in the data link channel, an RIP table creating section for creating an RIP table holding a primary node identifier indicating a primary node transmitted the optical signal from the first ring transmission path to the second ring transmission path, a secondary node identifier indicating a secondary node adjacent to the primary node to transmit/receive the optical signal, and the drop node identifier for each of a working line and a protection line on the basis of the crossconnect information, and a node recognizing section being able to recognize from the relative node identifier of the crossconnect information read by the data link reading section which its own node is the primary node or the secondary node.

As above, various information can be automatically transmitted to an optical transmitting apparatus functioning as a secondary node, and a node cross-connecting to the working line can automatically determine a mode of the DCP connection or the DTP connection of each line.

The data link writing section may set an absolute node identifier of its own node to the add node identifier of the data link channel when its own node is the add node, and set the drop node identifier of the data link channel to a relative node identifier of its own node corresponding to the add node identifier when its own node is the drop node.

Data other than zero may be used as the relative node identifier set by the data link writing section, and the node recognizing section may recognize presence or absence of zero data in a region in which the drop node identifier of the data link channel is written to determined whether or not setting of the crossconnect information is completed.

As above, it becomes unnecessary to reform hardware and increase the information quantity of the data link, and it is possible to improve versatility of the products.

The node recognizing section may comprise an additional information determining section being able to determine which a connection mode of the first ring transmission system or the second ring transmission system is in a DCP connection in which the optical signal is dropped from the primary node while continued over the protection line or in a DTP connection in which the optical signal is continued over both of the working line and the protection line on the basis of information written in the squelch table.

The additional information determining section may determine which the first ring transmission system or the second ring transmission system is in the DCP connection or in the DTP connection from which a direction of its own node identifier indicating its own node looked from the primary node identifier is in the same direction as or in the opposite direction to the order of arrangement of nodes represented by the topology.

The squelch table creating section may be such configured as to create the same squelch table among optical transmitting apparatuses of the ring transmission system.

As above, since setting of a secondary node is automatically informed by performing the line setting and each node is informed of which node is the second node at the same time, the secondary node is not at all required to do special setting. This simplifies the operations, allows the system to operate more normally, and improves the reliability and simplification of man-machine interface.

The present invention still further provides an optical transmitting method for a ring transmission system performed in each node comprising the steps of a data link reading step of reading crossconnect information and topology information uniquely representing the order of arrangement of optical transmitting apparatuses connected in ring, a topology creating step of creating topology using the topology information read at the data link reading step, a data link writing step of writing a unique absolute node identifier given to each of a plurality of nodes and a relative node identifier given by relating absolute node identifiers of other nodes with the topology in the crossconnect information of the data link channel on the basis of the topology created at the topology creating step, and a squelch table creating step of creating a squelch table holding the crossconnect information written in the data link channel.

As above, the squelch table and the RIP table are automatically created as soon as the data link is set, whereby the system is operated more normally by minimum setting.

The present invention still further provides an optical transmitting method for a ring transmission system used in a first ring transmission system, wherein a first ring transmission system comprises a first add/drop node for receiving an optical signal transmitted from an external node over a working line and transmitting the optical signal to another node of the first ring transmission system over the working line, while receiving an optical signal transmitted from another node of the first ring transmission system over the working line, a first primary node for receiving the optical signal transmitted from the first add/drop node over the working line and transmitting the optical signal to an external ring transmission system and another node of the first ring transmission system over the working line, while receiving an optical signal transmitted from the external ring transmission system over the working line and an optical signal transmitting from another node of the first ring transmission system over a protection line, selecting either one of the received optical signals, and transmitted the selected optical signal to another node of the first ring transmission system over the working line, a first secondary node for receiving the optical signal transmitted from the first primary node over the protection line and transmitting the optical signal to the external ring transmission system over the protection line, while receiving said optical signal transmitted from the external ring transmission system over the protection line and transmitting the optical signal to the first primary node over the protection line, a second ring transmission system comprises a second seconary node for receiving the optical signal transmitted from the first secondary node of the first ring transmission system over the protection line and transmitting the optical signal to the second ring transmission system over the protection line, a second primary node for receiving an optical signal transmitted from the first primary node of the first ring transmission system over the working line and the optical signal transmitted from the second secondary node over the protection line and transmitting the optical signal to another node of the second ring transmission system over the working line, while receiving an optical signal transmitted from another node of the second ring transmission system over the working line, transmitting the optical signal to the first primary node of the first ring transmission system, and transmitting the optical signal to the second secondary node, a second add/drop node for receiving an optical signal transmitted from an external ring transmission system over the working line and transmitting the optical signal to another node of the second ring transmission system over the working line, while receiving the optical signal transmitted from another node of the second ring transmission system over the working line and transmitting the optical signal to the external ring transmission system over the working line, the optical transmitting method performed in each of the nodes comprising the steps of a data link reading step of reading the crossconnect information of the data link channel and topology information uniquely representing the order of arrangement of optical transmitting apparatuses connected in ring, a topology creating step of creating topology using the topology information read at the data link reading step, a data link writing step of writing a unique absolute node identifier given to each of a plurality of nodes and a relative node identifier given by relating absolute node identifiers of other nodes with the topology in the crossconnect information of the data link channel on the basis of the topology created at the topology crating step, a squelch table creating step of creating a squelch table holding the crossconnect information written in the data link channel, an RIP table creating step of creating an RIP table holding a primary node identifier indicating a primary node transmitting the optical signal from the first ring transmission path to the second ring transmission path, a secondary node identifier indicating a secondary node adjacent to the primary node to transmit/receive the optical signal, and the drop node identifier for each of the working line and the protection line on the basis of the crossconnect information, and a node recognizing step of recognizing from the relative node identifier of the crossconnect information read at the data link reading step which its own node is the primary node or the secondary node.

The present invention still further provides an optical transmitting method for a ring transmission system, wherein a first ring transmission system comprises a first add/stop node for receiving an optical signal transmitted from an external node over a working line, transmitting the optical signal to the first ring transmission system over the working line, and transmitting the optical signal to the first ring transmission system over a protection line, while receiving an optical signal transmitted from another node of the first ring transmission system over the working line, receiving an optical signal transmitted from another node of the first ring transmission system over the protection line, and transmitting the optical signal to an external ring transmission system over the working line, a first primary node for receiving the optical signal transmitted from the first add/drop node over the working line, and transmitting the optical signal to an external ring transmission system and another node of the first ring transmission system over the working line, while receiving an optical signal transmitted from the external ring transmission system over the working line and an optical signal transmitted from another node of the first ring transmission system over the protection line, selecting either one of the received optical signals, and transmitting the selected optical signal to another node of the first ring transmission system over the working line, a first secondary node for receiving an optical signal transmitted from the first add/drop node over the protection line, and transmitting the optical signal to a node of the external ring transmission system over the protection line, while receiving an optical signal transmitted from a node of the external ring transmission system over the protection line, and transmitting the optical signal to the first add/drop node over the protection line, a second ring transmission system comprises a second primary node for receiving the optical signal transmitted from the first primary node of the first ring transmission system over the working line, and transmitting the optical signal to another node of the second ring transmission system over the working line, while receiving an optical signal transmitted from another node of the second ring transmission system over the working line, and transmitting the optical signal to the first primary node of the first ring transmission system over the working line, a second secondary node for receiving an optical signal transmitted from the first secondary node of the first ring transmission system over the protection line, and transmitting the optical signal to another node of the second ring transmission ring over the protection line, while receiving the optical signal transmitted from another node of the second ring transmission system over the protection line, and transmitting the optical signal to the first secondary node of the first ring transmission system over the protection line, a second add/drop node for receiving the optical signal transmitted from the second primary node over the protection line, receiving the optical signal transmitted from another node of the second ring transmission system over the working line, and transmitting the optical signal to an external ring transmission system over the working line, while receiving an optical signal transmitted from the external ring transmission system over the working line, transmitting the optical signal to another node of the second ring transmission system over the working line, and transmitting the optical signal to another node of the second ring transmission system over the protection line, the optical transmitting method performed in each of the nodes comprising the steps of a data link reading step of reading the crossconnect information of the data link channel and topology information uniquely representing the order of arrangement of optical transmitting apparatuses connected in ring, a topology creating step of creating topology using the topology information read at the data link reading step, a data link writing step of writing a unique absolute node identifier given to each of a plurality of nodes and a relative node identifier given by relating absolute node identifiers of other nodes with the topology in the crossconnect information of the data link channel on the basis of the topology created at the topology creating step, a squelch table creating step of creating a squelch table holding the crossconnect information written in the data link channel, an RIP table creating step of creating an RIP table holding a primary node identifier indicating a primary node transmitting the optical signal from the first ring transmission path to the second ring transmission path, a secondary node identifier indicating a secondary node adjacent to the primary node to transmit/receive the optical signal, and the drop node identifier for each of the working line and the protection line on the basis of the crossconnect information, and a node recognizing step of recognizing from the relative node identifier of the crossconnect information read at the data link reading step which its own node is the primary node or the secondary node.

As above, it is possible to readily set the optical transmitting apparatus with a small number of setting items even if a number of setting items exist, and create the squelch table by existing hardware, leading to efficient information transmission.

At the data link writing step, data other than zero may be used as the relative node identifier. At the node recognizing step, presence or absence of zero data in a region in which the drop node identifier of the data link is written may be recognized to determine whether or not setting of the crossconnect information is completed.

As above, it is possible to establish the data link with an information quantity possessed by the current data link and without increasing the number of setting items. The secondary node automatically transmits AIS until creation of the squelch table is completed, leading to safety of the line.

The present invention still further provides an optical transmitting apparatus for a ring transmission system used in a transmission ring In which a plurality of optical transmitting apparatuses are connected to one another over a bidirectional ring transmission path comprising a connection mode recognizing section connected to the bidirectional ring transmission path to recognize a connection mode between the transmission ring and another transmission ring connected to the transmission ring, a failed span detecting section connected to the connection mode recognizing section to detect a span in which a failure occurs, and a loop-back switching control section connected to the connection mode recognizing section and the failed span detecting section to switch a transmission route on the basis of the connection mode and the span.

Accordingly, the line utilization efficiency is improved and the line restoration rate is improved. For example, ring 2-node 3 selects either one having a better quality of an optical signal received from ring 2-node 2 and an optical signal received from ring 2-node 4, and transfers the selected optical signal. Whereby, the quality of the optical signal is improved.

The connection mode recognizing section may centrally recognize information on a terminal optical transmitting apparatus connected to the bidirectional ring transmission path to add/drop the optical signal, connection mode information on the connection mode of the terminal optical transmitting apparatus, and line type information representing a working/protection line type. Alternatively, the connection mode recognizing section may recognize a DTP connection in which at lest two of the terminal optical transmitting apparatuses connected to the transmission ring continue the optical signal using both of the working line and the protection line.

Accordingly, the RIP function by the RIP table and the loop-back control function for the shortest distance are achieved to obtain information on the working line/protection line used by the opposite node, which leads to improvement of the line restoration rate at the time of failure occurrence.

The optical transmitting apparatus for a ring transmission system may further comprise a path switching section connected to the loop-back switching control section to select either one having a better quality of a first optical signal from one direction and a second optical signal from another direction on the bidirectional ring transmission path.

Accordingly, even when a special line failure occurs, restoration of optical signals can be controlled.

The present invention still further provides an optical transmitting method for a ring transmission system used in a transmission ring in which a plurality of optical transmitting apparatuses are connected to one another over a bidirectional ring transmission path, the optical transmitting method comprising the steps of a connection mode recognizing step of recognizing a connection mode between the transmission ring and another transmission ring connected to the transmission ring, a failed span detecting step of detecting a span in which a failure occurs on the basis of the connection mode recognized at the connection mode recognizing step, and a loop-back switching controlling step of switching a transmission route on the basis of the connection mode recognized at the connection mode recognizing step and the span detected at the failed span detecting step in order to minimize a loop-back distance of an optical signal in the transmission ring.

According to the above method, not only a line connection among four nodes, but also a line connection among three nodes or a line connection between two nodes is possible.

BRIEF DESCRIPTION OF THE DRAWINGS

FIG. 4(a) is a diagram showing an example of absolute node IDs given to optical transmitting apparatuses of a ring transmission system;

FIG. 4(b) is a diagram showing a relation between node IDs and a topology table;

FIG. 4(c) is a diagram showing a relation between the topology table and relative node IDs;

FIG. 13 is a diagram showing sequences as an add node according to the first embodiment;

FIGS. 19(a) and 19(b) are illustrative diagrams of node IDs according to the second embodiment of this invention;

FIG. 21 is an illustrative diagram of a network structure information table according to the second embodiment of this invention;

FIG. 22 is a diagram for illustrating basic operations of nodes in DCP according to the second embodiment of this invention;

FIG. 23 is a diagram for illustrating basic operations of nodes in DTP according to the second embodiment of this invention;

FIGS. 24(a) and 24(b) are diagrams for illustrating basic operations among nodes according to the second embodiment of this invention;

FIG. 24(c) is a diagram for illustrating a correspondence between a primary node and a secondary node according to the second embodiment of this invention;

FIGS. 26(a) through 26(c) are diagrams showing failure operation patterns in DCP-DCP according to the second embodiment of this invention;

FIGS. 31(a) through 31(h) are diagrams showing failure operation patterns in DCW-DCP according to the second embodiment of this invention;

FIGS. 34(a) through 34(h) are diagrams showing failure operation patterns in DCW-DCW according to the second embodiment of this invention;

FIGS. 35(a) through 35(c) are diagrams showing failure operation patterns in DCW-DCW according to the second embodiment of this invention;

FIG. 36 is a diagram showing a structure of a ring transmission system according to the second embodiment of this invention;

FIGS. 52(a) and 52(b) are diagrams for illustrating failure operation patterns in single-sided DCW according to the first modification of the second embodiment of this invention;

FIGS. 53(a) and 53(b) are diagrams for illustrating a failure operation pattern in DCP-DCW according to the first modification of the second embodiment of this invention;

FIGS. 54(a) and 54(b) are diagrams for illustrating a failure operation pattern in DCW-DCW according to the first modification of the second embodiment of this invention;

FIG. 58 is a schematic diagram of a UPSR structure;

FIGS. 59(a) through 59(c) are schematic diagrams of a BLSR structure;

FIG. 61 is a diagram showing a format of a data link;

FIG. 63(a) is a schematic diagram showing connected three nodes;

FIGS. 63(b) through 63(e) are diagrams showing contents of a data link at each node;

FIG. 63(f) is a diagram showing contents of squelch tables of the respective node;

FIG. 66 is a diagram for illustrating operations of a primary node and a secondary node in a DCP connection;

FIG. 69 is a diagram for illustrating operations of a primary node and a secondary node in a DTP connection;

FIG. 70 is a diagram showing a single-sided DCW;

DESCRIPTION OF THE PREFERRED EMBODIMENTS

Hereinafter, description will be made of embodiments of the present invention with reference to the drawings.

(A) Description of a First Embodiment of the Invention

Figure 1:
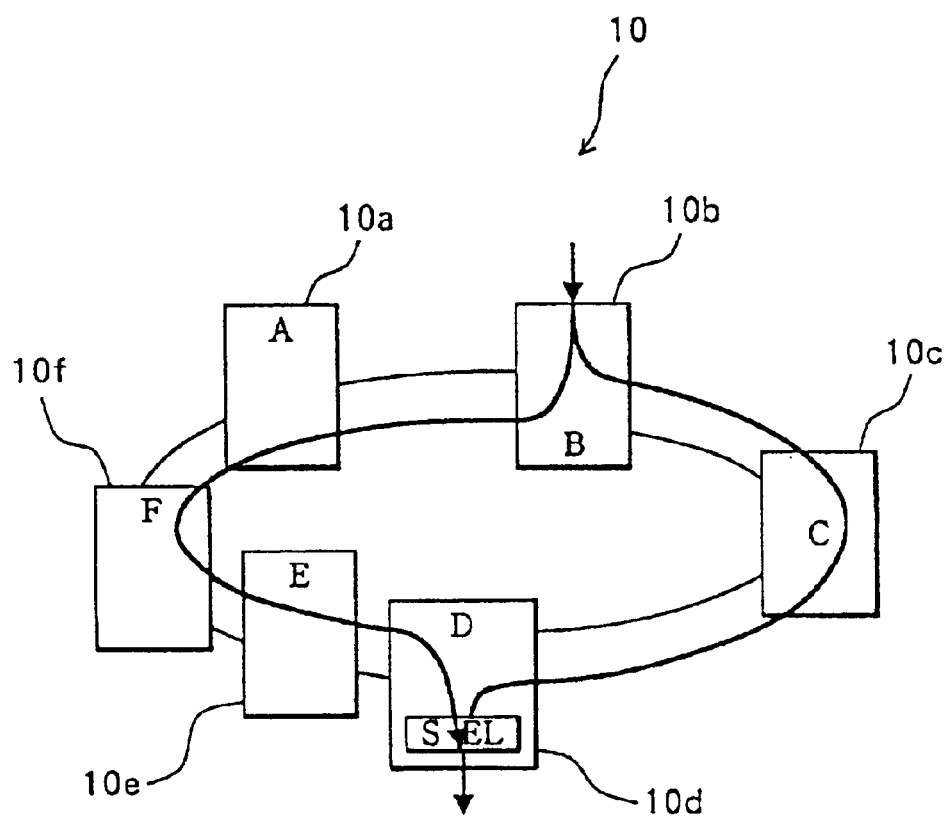
FIG. 1 is a schematic diagram of a ring transmission system according to a first embodiment of this invention.

FIG. 1 is a schematic diagram of a ring transmission system according to a first embodiment of this invention. A ring transmission system 10 shown in FIG. 1 is configured with six optical transmitting apparatuses for a ring transmission system (hereinafter referred to merely as optical transmitting apparatuses, occasionally) 10a, 10b, 10c, 10d, 10e, and 10f connected to one another over a transmission path having a data link channel (data link) in which cross-connect information representing an add node identifier (add node ID) indicating a node to which an optical signal is added, and a drop node identifier (drop node ID) indicating a node from which the optical signal is dropped is written. The transmission path is an optical fiber, over which an optical signal is transmitted through the optical transmitting apparatuses 10a, 10b, 10c, 10d, 10e, and 10f over the optical fiber, and the optical transmitting apparatuses 10a, 10b, 10c, 10d, 10e, and 10f are used for a bidirectional ring transmission path.

Figure 2:
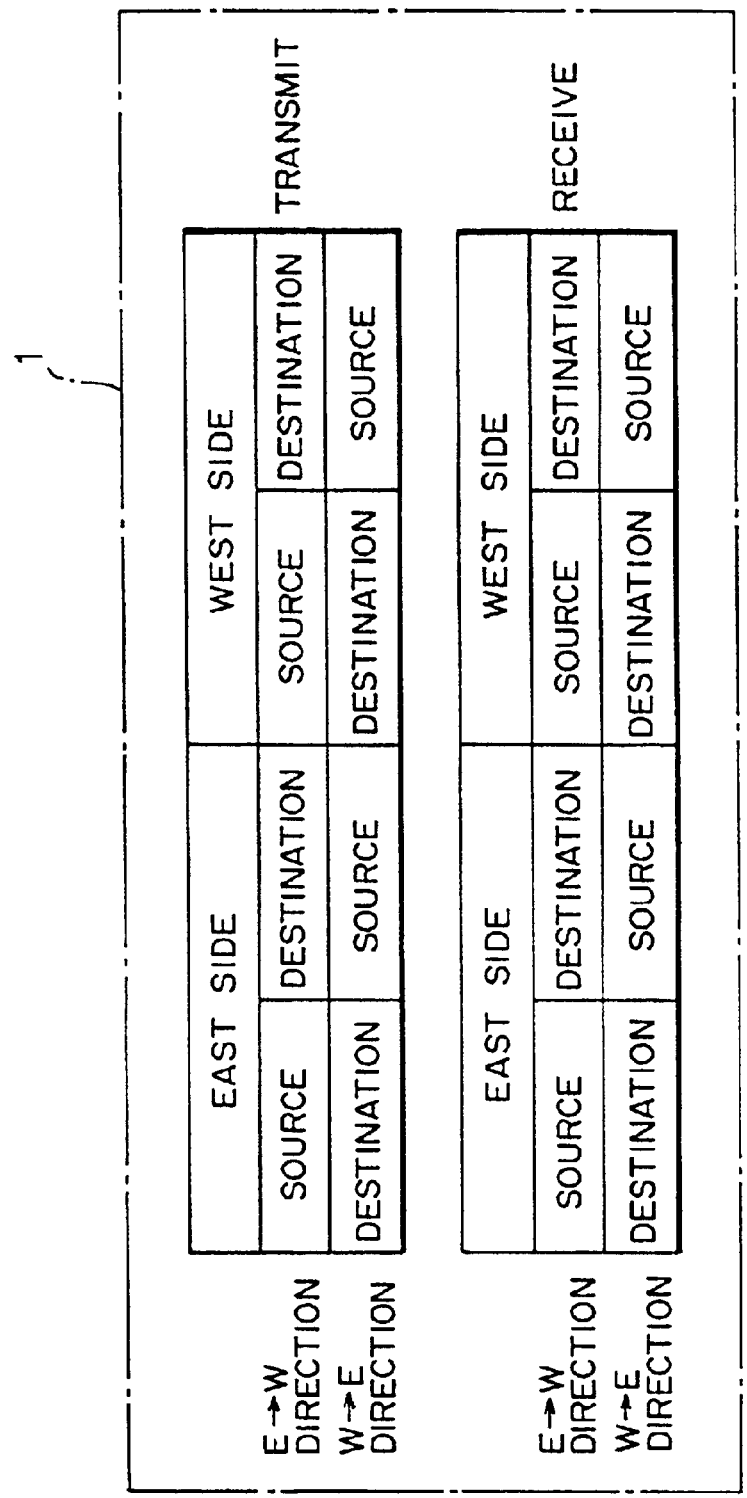
FIG. 2 is a diagram showing a format of a data link according to the first embodiment of this invention.

FIG. 2 is a diagram showing a format of a data link according to the first embodiment of this invention. A data link 1 shown in FIG. 2 is written IDs of add nodes and IDs of drop nodes therein, which has regions denoted as Source (hereinafter referred to as source node ID parts) and regions denoted as Destination (hereinafter referred to as destination node ID parts). An ID of an add node is written in the source node ID part, whereas an ID of a drop node is written in the destination node ID part. Four bits are assigned to each of the source node ID parts and the destination node ID parts.

The data link 1 further has an east side and a west side. The east side and the west side correspond to both sides of the optical transmitting apparatus 10a. The data link 1 also has an E→W direction and a W→E direction on each of the east side and the west side, and has transmit data and received data in each of the E→W direction and the W→E direction. Information on the transmission and reception is managed with data of one byte.

The ring transmission system 10 (refer to FIG. 1) performs transmission of optical signals based on SONET; the following description will be made on the basis of SONET. In concrete, OC48 is used, so that optical signals on 48 lines are optical-time-division-multiplexed. The ring transmission system 10 is in the four-fiber BLSR structure, in which one optical fiber is assigned to a working line and the other one is assigned to a protection line. The four-fiber BLSR structure permits the working line to be largely secured, thus the bandwidth of the working line can be more effectively used. The four-fiber BLSR structure allows more complex line setting and line switching than the two-fiber BLSR structure.

In the following description, the optical transmitting apparatus will be occasionally referred to as a node in relation to the modes of ring connection, but these are identical. Additionally, another node will stand for a node of another station, whereas own node will stand for a node of its own station in the following description.

Figure 3:
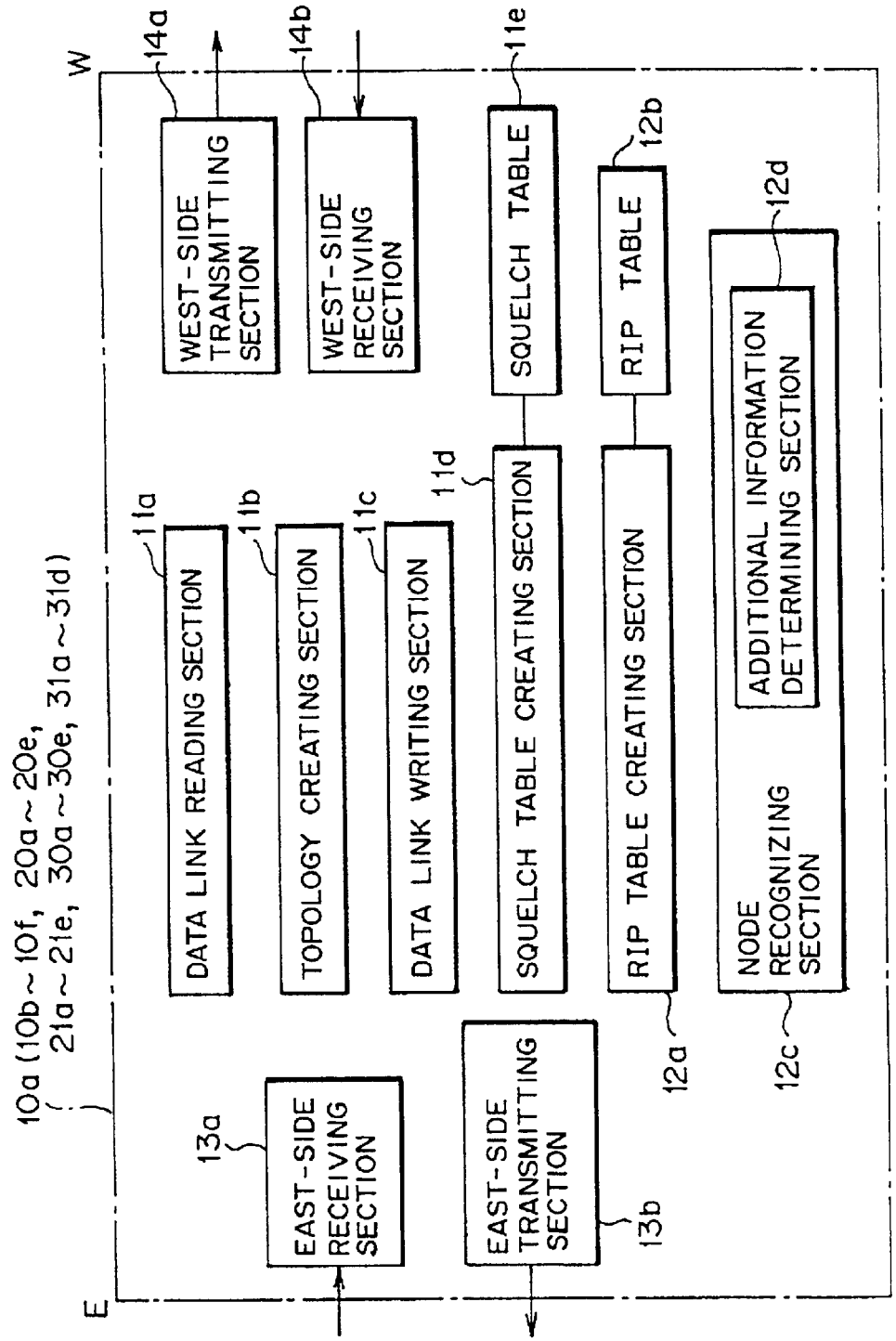
FIG. 3 is a diagram showing a structure of an optical transmitting apparatus according to the first embodiment of this invention.

FIG. 3 is a diagram showing a structure of the optical transmitting apparatus 10a according to the first embodiment of this invention. Incidentally, the other five optical transmitting apparatuses 10b, 10c, 10d, 10e, and 10f in the ring transmission system 10 have the same structure. Further, optical transmitting apparatuses 20a, 20b, 20c, 20d, 20e, 21a, 21b, 21c, 21d, 21e, 30a, 30b, 30c, 30d, 30e, 31a, 31b, 31c, 31d, and 31e to be described later have the same structure.

The optical transmitting apparatus 10a shown in FIG. 3 comprises a data link reading section 11a, a topology creating section 11b, a data link writing section 11c, a squelch table creating section 11d, a squelch table 11e, an RIP table creating section 12a, an RIP table 12b, a node recognizing section 12c, an east-side receiving unit 13a, an east-side transmitting unit 13b, a west-side transmitting section 14a, and a west-side receiving unit 14b.

The data link reading section 11a reads crossconnect information and topology information uniquely representing the order of arrangement of optical transmitting apparatuses connected in a ring. The crossconnect information is information including an add node ID indicating an add node and a drop node ID indicating a drop node dropping an optical signal, which is transmitted on the data link. On the above data link, a data link for topology differing from the crossconnect information exists, on which data link the topology information is transmitted.

The topology creating section 11b creates topology that uniquely represents the order of arrangement of the optical transmitting apparatuses 10a, 10b, 10c, 10d, 10e, and 10f connected in a ring using the crossconnect information and the topology information read by the data link reading section 11a.

The data link writing section 11c writes a unique absolute node ID of each of the six optical transmitting apparatuses 10a, 10b, 10c, 10d, 10e, and 10f and a relative node ID given by relating the absolute node IDs of the other nodes to topology on the basis of the topology created by the topology creating section 20d. The data link writing section 11c sets an absolute node ID of its own node as the add node ID of the data link when its own node is an add node. When its own node is a drop node, the data link writing section 11c sets a drop node ID of the data link to the relative node ID of its own node corresponding to the add node ID.

The squelch table creating section 11d creates the squelch table 11e. The squelch table 11e holds the crossconnect information written in the data link, which is realized by, for example, hardware. The squelch table creating section 11d creates the same squelch table as those of the optical transmitting apparatuses of the ring transmission system 10.

The east-side receiving unit 13a is a buffer holding contents of the data link received by the optical transmitting apparatus 10a, installed on the east side of the optical transmitting apparatus 10a. The east-side transmitting unit 13b is a buffer holding contents of the data link to be transmitted by the optical transmitting apparatus 10a, installed on the east side of the optical transmitting apparatus 10a.

The west-side transmitting unit 14a is a buffer holding contents of the data link to be transmitted by the optical transmitting apparatus 10a, installed on the west side of the optical transmitting apparatus 10a. The west-side receiving unit 14a is a buffer holding contents of the data link received by the optical transmitting apparatus 10a, installed on the west side of the optical transmitting apparatus 10a.

An optical transmitting method for this ring transmission system is as follows: The crossconnect information and the topology information uniquely representing the order of arrangement of nodes connected in a ring a reread at each of the above nodes (data link reading step), and topology is created using the topology information read at the data link reading step (topology creating step).

On the basis of the topology created at the topology creating step, an absolute node ID of each of a plurality of nodes and a relative node ID given by relating absolute node IDs of other nodes to the topology are written in the crossconnect information of the data link (data link writing step). At the data link writing step, data other than zero is used as the relative node ID. Following that, a squelch table for holding the crossconnect information written in the data link is created (squelch table creating step).

These functions are realized by software or hardware. Description of other structural members of the optical transmitting apparatus 10a are omitted. The RIP table creating section 12a, the RIP table 12b, and the node recognizing section 12c shown in FIG. 3 relate to the DCP connection and the DTP connection; these will be described later in connection with DCP connection and the DTP connection.

Next, a relation between the topology and relative node IDs will be described with reference to FIGS. 4(a) through 4(c). FIG. 4(a) is a diagram showing an example of absolute node IDs given to the optical transmitting apparatuses 10a, 10b, 10c, 10d, 10e, and 10f of the ring transmission system 10. To the optical transmitting apparatuses 10a, 10b, 10c, 10e, and 10e, 1, 3, 5, 6, 8, and 2 are given as node IDs, respectively.

FIG. 4(b) is a diagram showing a relation between node IDs and topology tables. The topology shown in FIG. 4(b) is that node IDs of the optical transmitting apparatuses installed in the clockwise direction are arranged with its own node ID in the lead. For instance, topology of the optical transmitting apparatus 10a (whose node ID is "1") is 1, 3, 5, 6, 8, and 2.

FIG. 4(c) is a diagram showing a relation between a topology table and relative node IDs, in 7q which nodes recognized by a node (Node 1, Node 3, Node 5, Node 6, Node 8, or Node 2) in each row are indicated by values of relative node IDs. These relative node IDs are numbered in the clockwise direction from "1" in order with its own node being "0". The relative node IDs are given numbers with no space without lacking the number unlike absolute node IDs. For example, a relation between relative node IDs and nodes with respect to the optical transmitting apparatus 10b (whose node ID is "3") is as follows: Namely, a relative node ID "0" represents an absolute node ID 3, relative node IDs 1, 2, 3, 4, and 5 represent absolute node IDs 5, 6, 8, 2, and 1 in the similar manner.

An optical transmitting apparatus indicated by a relative node ID differs from one optical transmitting apparatus 1a, 10b, 10c, 10d, 10e, or 10f to another. Since a relative node ID 0 indicates own node, "0" value is not written in the data link. In other words, by giving a special meaning to "0" data, each of the optical transmitting apparatus 10a, 10b, 10c, 10d, or 10e can determine that the node is not used when "0" value exists.

When every node uses a relative node ID, each node differently recognizes which node is indicated by a relative node ID in that node. Therefore, as a basis for definition of relative node IDs, a drop-crossconnected node sets a relative node ID looked from an absolute node ID set by an add-crossconnected node.

The optical transmitting apparatus has, as a node, eight patterns of crossconnect carried out in the four-fiber BLSR. The patterns will be next described with reference to FIGS. 5(a) through 7(b).

Figures 5A, 5B, 5C, 5D:
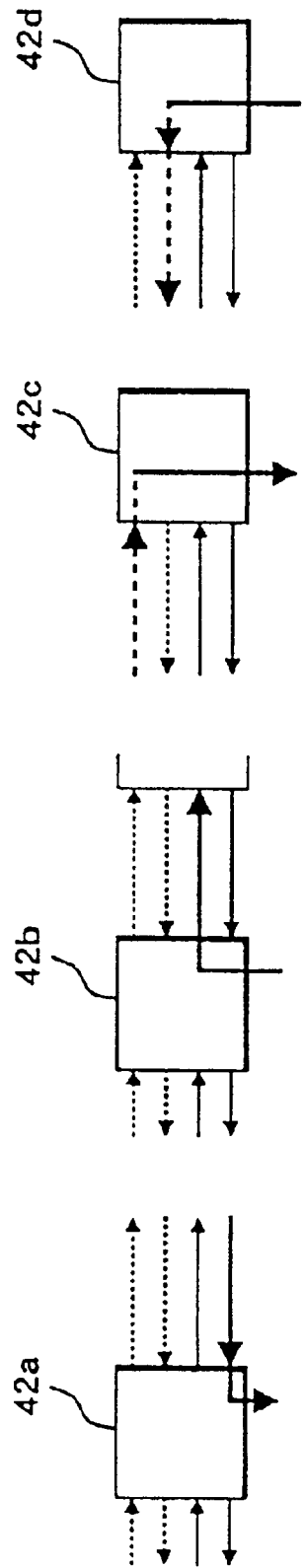
FIG. 5(a) is a schematic diagram of a node performing only "drop" on a working line.
FIG. 5(b) is a schematic diagram of a node performing only "add" on the working line.
FIG. 5(c) is a schematic diagram of a node performing only "drop" on a protection line.
FIG. 5(d) is a schematic diagram performing only "add" on the protection line.

FIG. 5(a) is a schematic diagram of a node performing only dropping on the working line. A node 42a enters a relative node ID of its own looked from a source node ID part of a received data link into a destination node ID of a transmitting unit (the east-side transmitting unit 13b or the west-side transmitting unit 14a) for the working line. Data in which this relative node ID is written is transmitted.

FIG. 5(b) is a schematic diagram of a node only adding on the working line. A node 42b enters an absolute node ID of its own into a transmitting unit (the east-side transmitting unit 13b or the west-side transmitting unit 14a) for the working line.

FIG. 5(c) is a schematic diagram of a node only dropping on the protection line. A node 42c enters a relative node ID of its own looked from a received source node ID into a transmitting unit (the east-side transmitting unit 13b or the west-side transmitting unit 14a) for the protection line when a received destination node ID is other than "0". The node 42c enters "1 (request flag)" into the source node ID part of the transmitting unit (the east-side transmitting unit 13b or the west-side transmitting unit 14a) for the protection line when having additional information, whereby other nodes can recognize completion of the acceptance.

FIG. 5(d) is a schematic diagram of a node only adding on the protection line. A node 42d enters an absolute node ID of its own into a transmitting unit (the east-side transmitting unit 13b or the west-side transmitting unit 14a) for the protection line. This node enters "1 (request flag)" into the transmitting unit (the east-side transmitting unit 13b or the west-side transmitting unit 14a) for the protection line when a received destination node ID is other than "0". Accordingly, depending on whether a received destination node ID is "0" or "1", this node can recognize completion of acceptance of additional information when having the additional information.

Figure 6B:
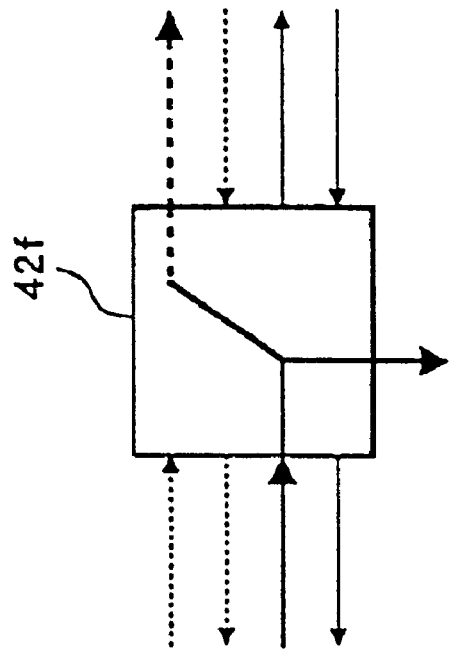
FIG. 6(b) is a schematic diagram of a node transmitting an optical signal coming in from one direction to two directions.
Figure 6A:
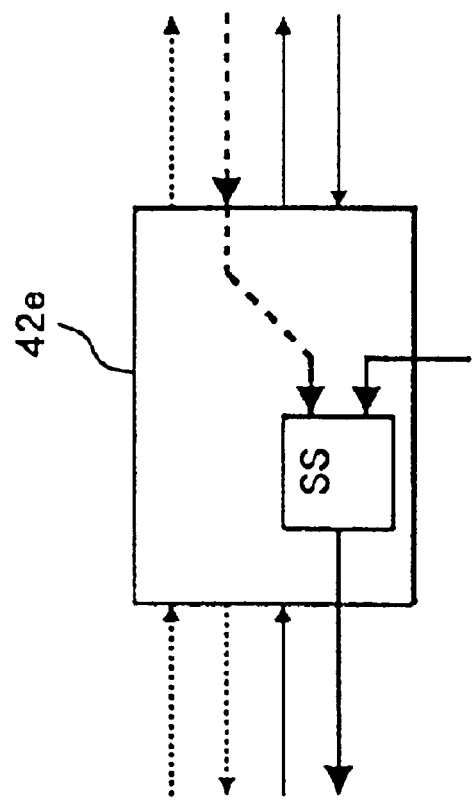
FIG. 6(a) is a schematic diagram of a node selecting either one of optical signals coming in from two directions and adding the selected one.

FIG. 6(a) is a schematic diagram of a node selecting either one of optical signals coming in from two directions and adding the selected optical signal. A node 42e receives an optical signal inputted over the protection line and an optical signal from the outside (ADD signal), selects either one having a better quality by a service selector SS, and adds the selected optical signal to the working line. The node 42e enters a source node ID received over the protection line into the source node ID part of a transmitting unit (the east-side transmitting unit 13b or the west-side transmitting unit 14a) for the working line. The node 42e enters a relative node ID of its own looked from the source node ID received over the protection line into the transmitting unit (the east-side transmitting unit 13b or the west-side transmitting unit 14a) for the protection line when a destination node ID received over the working line is other than "0".

When the destination node ID received over the working line is other than "0", the node 42e enters that destination node ID into the destination node ID part of a transmitting unit (the east-side transmitting unit 13b or the west-side transmitting unit 14a) for the protection line. At the same time, the node 42e enters a relative node ID of its own looked from the source node ID of a receiving unit (the east-side receiving unit 13a or the west-side receiving unit 14b) for the protection line into the source node ID part of a transmitting unit (the east-side transmitting unit 13b or the west-side transmitting unit 14a) for the protection line. When the destination node ID received over the protection line is "1" and the source node ID received over the protection line is other than "0", the node 42e enters the source node ID received over the working line into the source node ID part of the transmitting unit (the east-side transmitting unit 13b or the west-side transmitting unit 14a) for the protection line.

The node 42e performs "data transfer" to distribute optical signals by the service selector SS in the following fashion. The node 42e receives one time slot among a plurality of time slots transmitted over the working line, copies contents of that time slot to another time slot on the working line, and copies the same contents to one time slot on the protection line, thereby transferring the data. Transferring in the reverse direction is carried out in the similar fashion. The node 42e receives contents of a time slot transmitted over the protection line from another node (not shown) and other contents of a time slot transmitted over the working line from still another node (not shown), and copies the contents of these in one time slot on the working line to transfer the data. This data transferring fashion is the same even in the DTP connection (refer to node 3 in FIG. 11(a)) to be described later. The service selector SS is shown in the drawings other than FIG. 6(a); all the service selectors SS perform the above data transferring.

FIG. 6(b) is a schematic diagram of a node transmitting an optical signal coming in from one direction to two directions. A node 42f receives an optical signal over the working line, and drops the optical signal while transmitting the same over the protection line. The node 42f enters a source node ID received over the working line in the source node ID part of a transmitting unit (the east-side transmitting unit 13b or the west-side transmitting unit 14a) for the protection line, and enters a relative node ID of its own looked from the received source node ID in the destination node ID of a transmitting unit (the east-side transmitting unit 13b or the west-side transmitting unit 14a) for the protection line. When the destination node ID received over the protection line is other than "0" the node 42f enters the destination node ID received over the protection line in the destination node ID of a transmitting unit (the east-side transmitting unit 13b or the west-side transmitting unit 14a) for the working line, and enters the relative node ID of its own received over the working line in the source node ID part of a transmitting unit (the east-side transmitting unit 13b or the west-side transmitting unit 14a) for the working line.

Figure 7B:
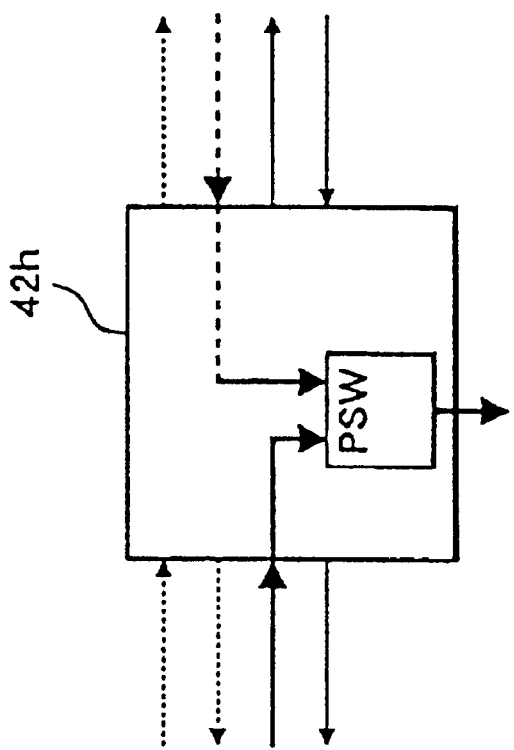
FIG. 7(b) is a schematic diagram of a node selecting either one of optical signals coming in from two directions and dropping the selected one.
Figure 7A:
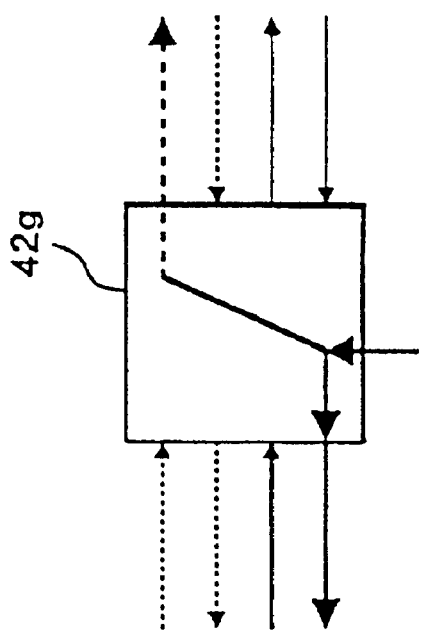
FIG. 7(a) is a schematic diagram of a node transmitting an optical signal coming in from one direction to two directions.

FIG. 7(a) is a schematic diagram of a node transmitting an optical signal coming in from one direction in two directions. A node 42g sends out an added optical signal over the working line and the protection line. The node 42g enters an absolute node ID of its own in the source node ID part of a transmitting unit (the East-side transmitting unit 13b or the west-side transmitting unit 14a) for the working line, and enters the absolute node ID of its own in the source node ID part of a transmitting unit (the east-side transmitting unit 13b or the west-side transmitting unit 14a) for the protection line, as well. When a destination ID received over the working line is other than "0", the node 42g enters the destination node ID received over the working line in the destination node ID part of the transmitting unit (the east-side transmitting unit 13b or the west-side transmitting unit 14a) for the protection line. Similarly, when the destination node ID received over the protection line is other than "0", the node 42g enters that data in the destination node ID of the transmitting unit (the east-side transmitting unit 13b or the west-side transmitting unit 14a) for the working line.

FIG. 7(b) is a schematic diagram of a node selecting either one of optical signals coming in from two directions and dropping the selected one, where either one of the optical signals on the working line and the protection line is selected by a switch PSW (Path Switch), and the selected one is dropped.

A node 42h enters a relative node ID of its own looked from a source node ID received over the working line in the destination node ID part of a transmitting unit (the east-side transmitting unit 13b or the west-side transmitting unit 14a) for the working line. Further, the node 42h converts a source node ID received over the protection line into a relative node ID looked from the source node ID received over the working line, and enters the converted ID in the transmitting part (the east-side transmitting unit 13b or the west-side transmitting unit 14a) for the working line. Additionally, the node 42h enters the relative node ID of its own looked from the source node ID received over the protection line in a transmitting unit (the east-side transmitting unit 13b or the west-side transmitting unit 14a) for the protection line. The node 42h converts the source node ID received over the working line into a relative source node ID looked from the source node ID received over the protection line, and enters the converted ID in the transmitting unit (the east-side transmitting unit 13a or the west-side transmitting unit 14a) for the protection line.

The switch PSW is shown in drawings other than FIG. 7(b); all of which perform the above "data selection and dropping".

As above, a drop node enters a relative node ID in a destination node ID, whereas an add node receives that data and recognizes that the destination node ID is other than "0". Whereby, the add node and the drop node can recognize completion of setting of the crossconnect. Each node can determine completion of data transmission-reception in the data link.

Each node can recognize setting of crossconnect even if transmission and reception are not the same data. Each node is not required to enter data in both a source node ID part and a destination node ID part. In consequence, the destination node ID part comes to have a margin of four bits in each of the E→W direction and the W→E direction, so that each node can communicate additional information using these four bits.

Figure 8:
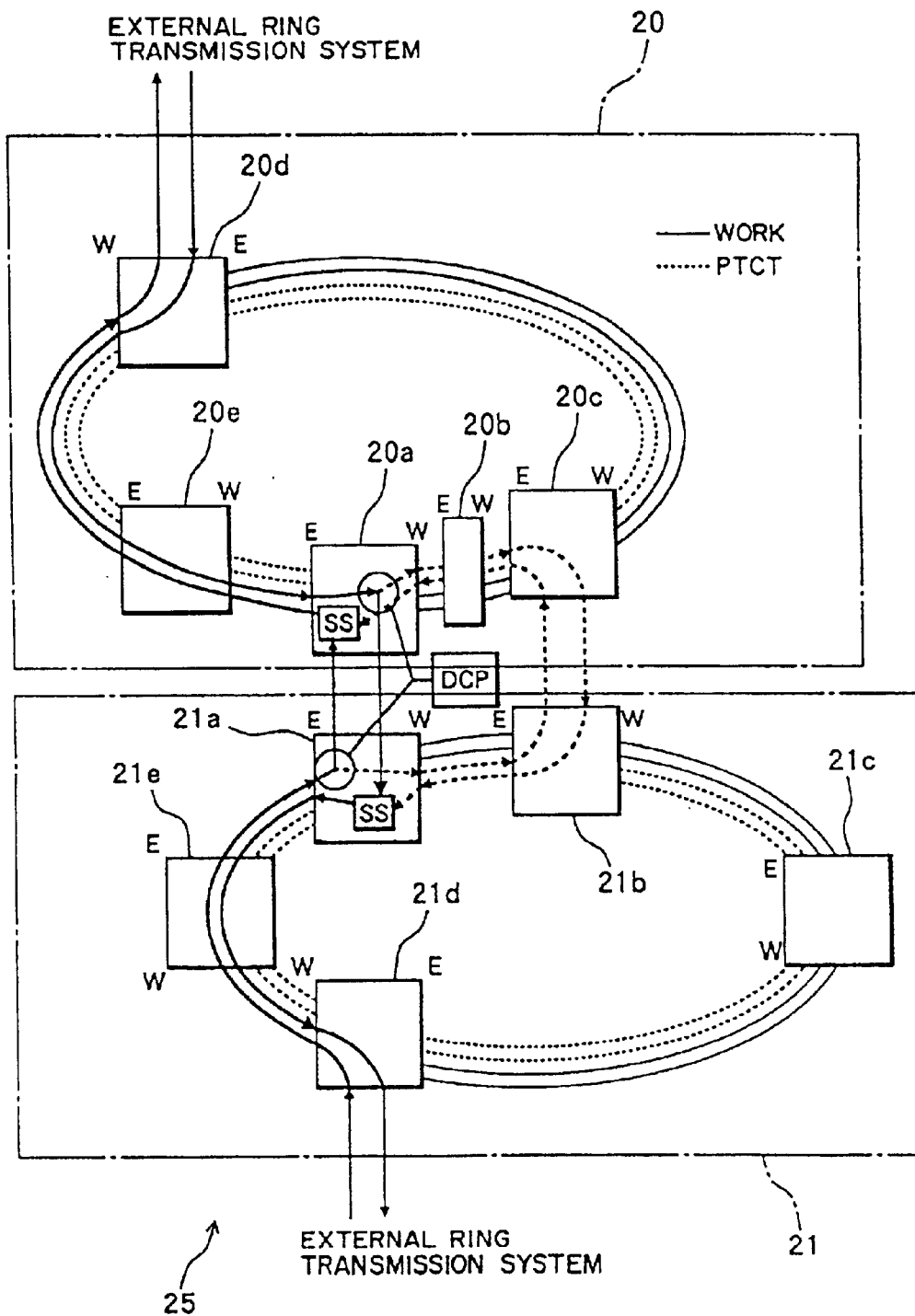
FIG. 8 is a schematic diagram of a DCP-connected ring transmission system according to the first embodiment of this invention.

Next, description will be made of the DCP connection with reference to FIGS. 8 and 9, and the DTP connection with reference to FIGS. 10 and 11 in the case where two or more ring transmission systems are connected. FIG. 8 is a schematic diagram of a DCP-connected ring transmission system according to the first embodiment of this invention. A ring transmission system 25 shown in FIG. 8 is configured with a first ring transmission system 20 and a second ring transmission system 21 coupled to each other, in which nodes along a ring transmission path are coupled to one anther, whereby optical signals can be transmitted over the ring transmission path. Solid lines shown in FIG. 8 represent working lines (denoted as "Work"), whereas broken lines represent protection lines (denoted as "PTCT").

The first ring transmission system 20 is configured with five optical transmitting apparatuses for a ring transmission system (optical transmitting apparatuses) 20a, 20b, 20c, 20d, and 20e connected to one another over a bidirectional ring transmission path having a data link in which crossconnect information representing an add node ID and a drop node ID is written.

The optical transmitting apparatus 20d receives an optical signal transmitted from an external node over the working line, transmits the optical signal to the optical transmitting apparatus 20e over the working line, while receiving an optical signal transmitted from the optical transmitting apparatus 20e over the working line, which functions as a first add/drop node. The optical transmitting apparatus 20e is installed between the optical transmitting apparatus 20d and the optical transmitting apparatus 20a. E denoted in the vicinity of each of these optical transmitting apparatuses 20a, 20b, 20c, 20d, and 20e represents the east side of the node, and W represents the west side of the node.

The optical transmitting apparatus 20a receives an optical signal transmitted from the optical transmitting apparatus 20e over the working line, transmits the optical signal to the external ring transmission system 21 and the optical transmitting apparatus 20b of the first ring transmission system 20 over the working line, while receiving an optical signal transmitted from the external ring transmission system 21 over the working line and an optical signal transmitted from the optical transmitting apparatus 20b of the first ring transmission system 20 over the protection line, selecting either one of the received optical signals, and transmitting the selected optical signal to the optical transmitting apparatus 20e over the working line, which functions as a first primary node.

The optical transmitting apparatus 20b is installed between the optical transmitting apparatus 20a and the optical transmitting apparatus 20c to transmit a received optical signal to the optical transmitting apparatus 20a in a direction of the transmission without changing the contents of the optical signal. Hereinafter, such function will be referred to as "through" occasionally.

The optical transmitting apparatus 20c receives an optical signal transmitted from the optical transmitting apparatus 20a (first primary node) over the protection node, transmits the optical signal to the external ring transmission system 21 over the protection line, while receiving an optical signal transmitted from the external ring transmission system 21 over the protection line, and transmitting the optical signal to the optical transmitting apparatus 20d over the protection line, which functions as a first secondary node.

A route of the optical signal added to the optical transmitting apparatus 20*d* is as follows: Namely, the optical signal is added to the optical transmitting apparatus 20*d*, passed through the optical transmitting apparatus 20*e* over the working line, dropped from the optical transmitting apparatus 20*a*, while passed through the optical transmitting apparatus 20*b* over the protection line and dropped from the optical transmitting apparatus 20*c*.

A route in the opposite direction is similar. An optical signal is added from the second ring transmission system 21 to the optical transmitting apparatus 20*c*, and passed through the optical transmitting apparatus 20*b* over the protection line. At the optical transmitting apparatus 20*a*, either one having a better quality of the optical signal from the optical transmitting apparatus 20*b* and an optical signal transmitted from the second ring transmission system 21 is selected, and the selected signal is transmitted over the working line. The optical signal on the working line is dropped from the optical transmitting apparatus 20*d*.

On the other hand, the second ring transmission system 21 is configured with five optical transmitting apparatuses 21*a*, 21*b*, 21*c*, 21*d*, and 21*e* connected to one another over a bidirectional ring transmission path having a data link.

The optical transmitting apparatus 21*b* receives an optical signal transmitted from the optical transmitting apparatus 20*c* of the first ring transmission system 20 over the protection line, and transmits the optical signal to the second ring transmission system 21 over the protection line, which functions as a second secondary node.

The optical transmitting apparatus 21*a* receives an optical signal transmitted from the optical transmitting apparatus 20*a* of the first ring transmission system 20 over the working line and an optical signal transmitted from the optical transmitting apparatus 21*b* over the protection line, transmits either one of the optical signals to the optical transmitting apparatus 21*e* over the working line, while receiving an optical signal transmitted from the optical transmitting apparatus 21*e* over the working line, transmitting the optical signal to the optical transmitting apparatus 20*a* of the first ring transmission system 20 and the optical transmitting apparatus 21*b*, which functions as a second primary node. The optical transmitting apparatus 21*e* is installed between the optical transmitting apparatus 21*a* and the optical transmitting apparatus 21*d* to perform "through".

The optical transmitting apparatus 21*d* receives an optical signal transmitted from an external ring transmission system (not shown) over the working line, transmits the optical signal to the optical transmitting apparatus 21*e* over the working line, while receiving an optical signal transmitted from the optical transmitting apparatus 21*e* over the working line, and transmitting the optical signal to the external ring transmission system over the working line, which functions as a second add/drop node.

In each of the optical transmitting apparatus 20*a* and the optical transmitting apparatus 21*a*, there is depicted a service selector SS. In order to clearly express DCP connection, the DCP is indicated.

An optical signal from the first ring transmission system 20 is added to the optical transmitting apparatus 21*b*, while an optical signal from the first ring system 20 is added to the optical transmitting apparatus 21*a*. Either one having a better quality of these optical signals coming in from two directions is selected at the optical transmitting apparatus 21*a*, and the selected optical signal is transmitted over the working line. The optical signal is then passed through the optical transmitting apparatus 21*e*, and dropped to the external ring transmission system from the optical transmitting apparatus 21*d*.

On the other hand, an optical signal added to the optical transmitting apparatus 21*d* is passed through the optical transmitting apparatus 21*e*, and dropped from the optical transmitting apparatus 21*a* to be transmitted to the first ring transmission system 20. At the same time, the optical signal is transmitted over the protection line, further transmitted to the first ring transmission system 20 from the optical transmitting apparatus 21*b* over the protection line.

At the optical transmitting apparatus 20*a* of the first ring transmission system 20, the optical signal transmitted from the optical transmitting apparatus 21*b* via the optical transmitting apparatus 20*c* and the optical transmitting apparatus 20*b*, and the optical signal directly transmitted from the optical transmitting apparatus 21*a* are compared, and either one having a better quality of the optical signals coming in from the two directions is selected. The selected optical signal is transmitted over the working line, passed through the optical transmitting apparatus 20*e*, and dropped from the optical transmitting apparatus 20*d* to the external ring transmission system.

The optical transmitting apparatuses 20*a*, 20*b*, 20*c*, 20*d*, and 20*e*, and the optical transmitting apparatuses 21*a*, 21*b*, 21*c*, 21*d*, and 21*e* are used in the first ring transmission system 20 and the second ring transmission system 21, respectively. Each of these optical transmitting apparatus is shown in detail in FIG. 3. FIG. 3 is the diagram showing the structure of the optical transmitting apparatus according to the first embodiment of this invention. The RIP table creating section 12*a* of the optical transmitting apparatus 20*a* creates the RIP table 12*b* W for each of the working line and the protection line on the basis of the crossconnect information. The RIP table 12*b* holds a primary node ID indicating a primary node sending an optical signal from a first ring transmission path to a second ring transmission path, a secondary node ID indicating a secondary node transmitting/receiving an optical signal, and a drop node ID.

The node recognizing section 12*c* can recognize from a relative node ID of the crossconnect information read by the data link reading section whether its own node is a primary node or not, which comprises an additional information determining section 12*d*.

The additional information determining section 12*d* determines on the basis of information written in the squelch table whether a connection mode of the first ring transmission system 20 or the second ring transmission system 21 is the DCP connection where an optical signal is dropped from the primary node while being continuously transmitted over the protection line, or the DTP connection where an optical signal is continuously transmitted over both the working line and the protection line.

The additional information determining section 12*d* determines which the first ring transmission system 20 and the second ring transmission system 21 are in the DCP connection or the DTP connection on the basis of which a direction of its own node ID indicating its own node looked from a primary node ID is in the same direction as the order of arrangement of nodes represented by the topology or in the opposite direction.

An optical transmitting method for a ring transmission system for use in the first ring transmission system 20 and the second ring transmission system 21 is as follows: Namely, the first ring transmission system 20 has a first add/drop node, a first primary node, and a first secondary node, whereas the second ring transmission system 21 has a second seconary node, a second primary node, and a second add/drop node, wherein the crossconnect information of a data link and the topology information uniquely representing the order of arrangement of the optical transmitting apparatuses connected to one another in a ring are read out at each of the above nodes (data link reading step), and topology is created using the topology information read out at the data link reading step (topology creating step).

Following that, a unique absolute node ID of each of plural nodes and a relative node ID given by relating absolute node IDs of other nodes to the topology are written in the crossconnect information of the data link on the basis of the topology created at the topology creating step (data link writing step). At the data link writing step, data of a relative node ID that is other than zero is used.

The squelch table holding the crossconnect information written in the data link is created (squelch table creating step). An RIP table holding an ID indicating a primary node transmitting an optical signal from the first ring transmission path to the second ring transmission path, a secondary node ID indicating a secondary node adjacent to the primary node for receiving/transmitting the optical signal, and a drop node ID is created for each of the working line and the protection line on the basis of the crossconnect information (RIP table creating step).

From a relative node ID of the crossconnect information read out at the data link reading step, it is recognized which own node is a primary node or a secondary node (node recognizing step).

By recognizing, at the node recognizing step, presence or absence of zero data in a region in which a drop node ID of the data link is written, it is determined whether setting of the crossconnect information is completed or not. By recognizing, at the node recognizing step, presence or absence of zero data in a region in which a drop node ID of the data link is written, it is determined whether setting of the crossconnect information is completed or not.

In the case of the DCP connection or the DTP connection in the four-fiber BLSR, a complicated squelch table involving the protection line is created for each node. An RIP table is also created for each node. Each node can recognize on the basis of information of the RIP table in which section the working line is used, and whether or not itself is defined as a secondary node in the DCP connection or the DTP connection. Accordingly, each node can comply with a switching in a complex structure and manage switching of each line.

In the DCP or DTP connection, even if the number of nodes relating to a ring transmission path increases, each node can recognize the crossconnect information along with the above squelch table.

Additionally, a secondary node in the DCP connection or the DTP connection can change a line switching operation according to a span in which a failure occurs.

The setting is done for each line. When the user sets, the setting is done for each STS line unit and for each direction.

Figures 9A, 9B:
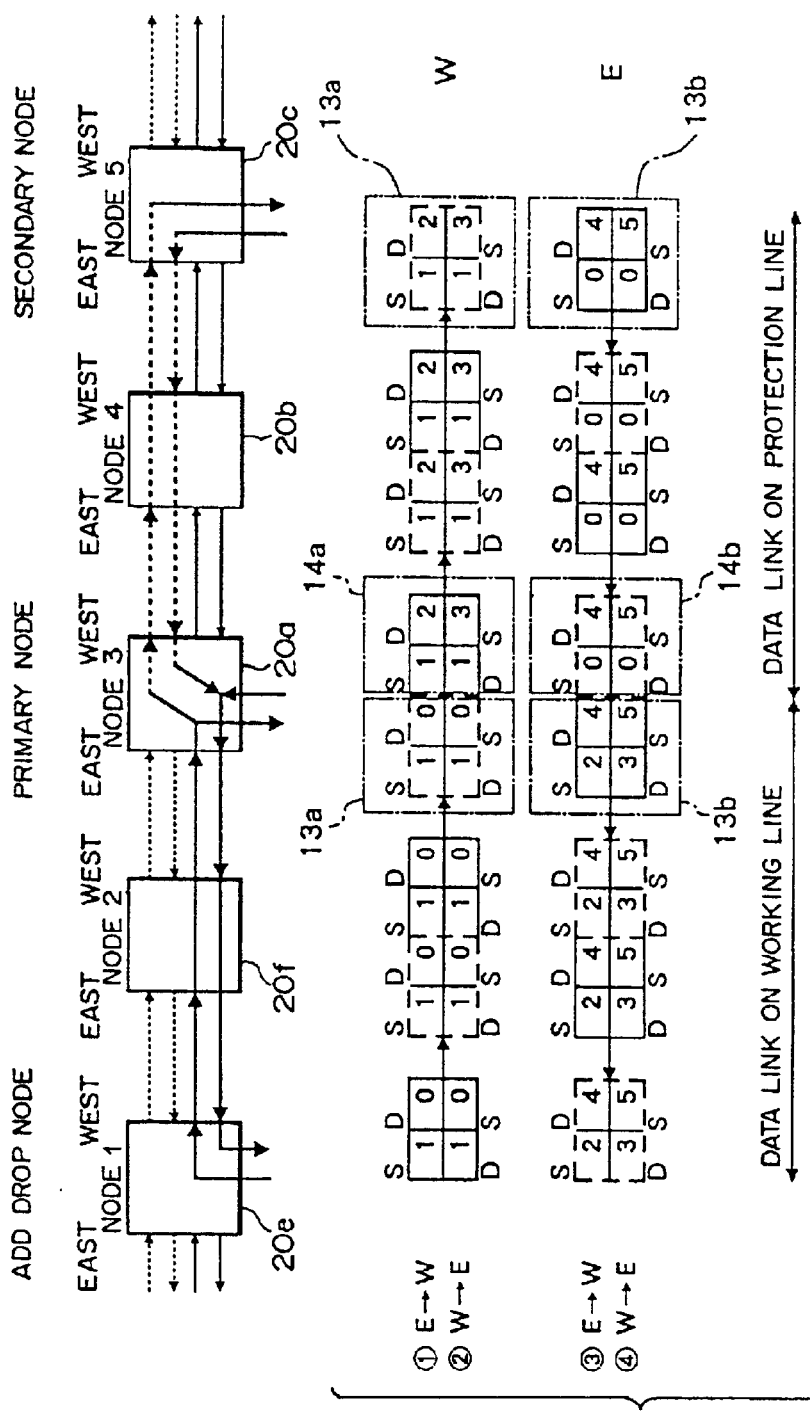
FIG. 9(a) is, a schematic diagram for illustrating a DCP connection mode.
FIG. 9(b) is a diagram showing contents of a data link at each node in a DCP connection.
Figure 10:
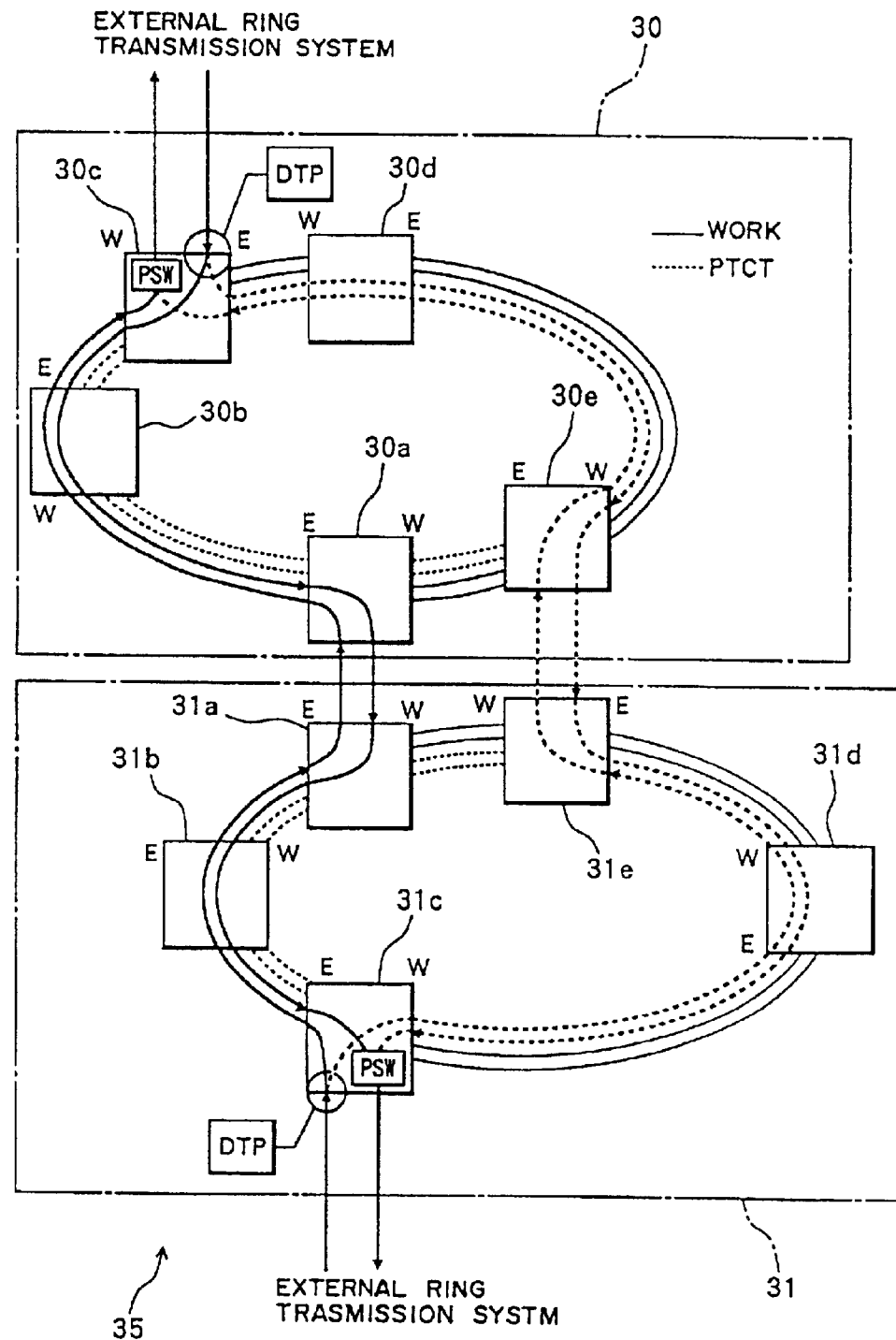
FIG. 10 is a schematic diagram of a DTP-connected ring transmission system according to the first embodiment of this invention.

FIG. 9(a) is a schematic diagram for illustrating a DCP connection mode, where solid lines represent working lines, whereas broken line represent protection lines. An optical transmitting apparatus 20a (also referred to as a node 3, occasionally) drops data transmitted from an optical transmitting apparatus 20e (also referred to as a node 1, occasionally) over a working line to the outside, while transmitting the data to an optical transmitting apparatus 20b (also referred to as a node 4, occasionally) over a protection line, thereby transferring the data. Incidentally, an optical transmitting apparatus 20c and the optical transmitting apparatus 20e are connected, but their connection is omitted.

FIG. 9(b) is a diagram showing contents of a data link at each node in the DCP connection. Nodes shown in FIG. 9(b) correspond to the respective nodes shown in FIG. 9(a), each of which is arranged below a corresponding one.

The node 3, for example, has an east-side receiving unit 13a, an east-side transmitting unit 13b, a west-side transmitting unit 14a, and a west-side receiving unit 14b. In other words, the node 3 has the E→W direction and the W→E direction, separately, and has transmit data and received data in each of these directions. Information on transmission and reception is managed with data of one byte. ① and ③ show flows of data links transmitted in the E→W direction, whereas ② and ④ show flows of data links transmitted in the W→E direction. Namely, the E→W direction and the W→E direction each has line transmitting data links in two systems. Further, contents of a data link transmitted from the west side are stored in the west-side transmitting unit 14a, whereas contents of a data link received on the west side are stored in the west-side receiving unit 14b.

Each direction of the data links and a relation between a source node ID and a destination node ID therein are decided in the following manner: Namely, in a flow in the W direction ① in the E→W direction, each node writes an ID of a terminal node in the source node ID part and an ID of a repeating node in the destination node ID part. In the flow in the E direction ③ in the E→W direction, each node writes a repeating node in the source node ID part, and a terminal node in the destination node ID part. Here, the repeating node stands for a primary node such as the node 3 performing DCP connection.

In a flow in the W direction ② in the W→E direction, each node writes an ID of a repeating node in the source node ID part, and a terminal node in the destination node ID part. In a flow in the E direction ④ in the W→E direction, each node writes an ID of a terminal node in the source node ID part and a repeating node in the destination node ID part.

Each node compares a relation between a primary node and a terminal node with a relation of the arrangement shown in the topology table, thereby distinguishing between the DCP connection and the DTP connection according to whether the repeating node is situated on the inner side than the terminal node or not (in the forward direction or the backward direction). Using this method, each node can automatically distinguish between the DCP connection and the DTP connection to recognize it.

Data 13a received by the node 5 shown in FIG. 9(b) is that the source node ID is "1" (absolute node ID), and the destination node ID is "2" (relative node ID). Since the destination node ID is other than zero data, the node 5 can recognize that itself is the secondary node. Applying a relation of the flow ④, the node 5 recognizes from the source node ID that the terminal node is the node 1 (absolute node ID), and recognizes from the destination node ID that the primary node is "3" (absolute node ID).

The node 5 can recognize the DCP connection since the primary node exists between itself (node 5) and the terminal node.

Accordingly, the additional information determining section 12d determines that the first ring system 20 and the second ring system 21 are in the DCP connection since a direction of its own node ID ("5") indicating its own node looked from the primary node ID ("3") is in the same direction (forward direction) as the order of arrangement of the nodes (1, 2, 3, 4, and 5) represented by the topology.

Since a span used by the working line is between the node 1 and the node 3, the node 5 can create the RIP table 12b so as to acquire all information necessary for itself as the secondary node.

Since the optical signal is repeated at the node 3 and dropped from the node 1, "3"(relative node ID) that is a repeating node is entered in "S", and "1" (relative node ID) that is a terminal node is entered in "D", the optical signal is thereby transmitted in the W→E direction. Nodes indicated by relative node IDs "1" and "3" are the first and the third nodes when looked from the adding node 5 in the E→W direction with the node 5 being "0", which correspond to the node 1 and the node 3.

The node 3 finds that the optical signal is added from the node 5 since "S" in the west-side receiving unit 14b is "5" and "S" in the west-side transmitting unit 14a is "3".

The node 1 enters "1" that is its own absolute node ID in the column of the source node ID in the W direction ① in the W→E direction, while entering "0" in the column of the destination ID, and transmits them. There is also shown that the source node ID in the E direction ③ in the E→W direction is "2" (relative node ID) and the destination node ID is "4" (relative node ID), where the destination node ID indicates a terminal node, whereas the source node ID indicates a repeating node. These are relative node IDs. In consequence, the node 1 can determine that the repeating node is situated on the inner side than the terminal node (forward direction), and the connection mode is DCP.

When recognizing the DCP connection, the node 1 recognizes that the optical signal is added to the node 1 and dropped from the node 5 since the source node ID in the West direction ① in the E→W direction is "0" and the destination node ID in the East direction ③ in the E→W direction is "4". The node 1 additionally receives a source node ID "5" (absolute node ID) in the E direction ④ in the W→E direction, and a destination node ID "3" (relative node ID of its own looked from "5" received from the node 3 over the protection line) in the E direction ④ in the W→E direction. At the node 1, the destination node ID is "1" and the source node ID is "0" in the W direction ② in the W→E direction.

As above, each node can create the squelch table 11e. The drop node writes data in the data link using relative node IDs, so that no "0" data is entered as a relative node ID in the squelch table 11e so set. Conversely, when "0" is entered as a relative node ID, it is recognized that the line setting is not done (unset).

As above, it is possible to insert special additional information in a portion in which reply data is heretofore inserted to notify of information on a node other than the terminal node, or use it as a flag part. In the case of the DCP connection or the DTP connection, each node can independently and automatically recognize creation of the squelch table 11e, creation of the RIP table, notification of various information for ensuring an operation as the secondary node, and distinction between the DCP connection and the DTP connection.

Since each of the optical transmitting apparatuses carries out the crossconnect setting, as 10S above, each optical transmitting apparatus can operate complying with the DCP connection or the DTP connection. This enables automatic creation of the squelch table 11e and the RIP table, further automatic recognition of completion of each of the tables.

At the secondary node 5, the source node ID of the data link in the W direction indicates "1" (absolute node ID) and the destination node ID indicates "2" (relative node), it is thus found that data other than "0" is entered in the destination node ID part. The secondary node 5 can recognize from the above that itself is the secondary node, recognize from the source node ID that the terminal node is the node 1, and recognize from the destination node ID that the repeating node is the node 3. Similar to the case of the E→W direction, since the repeating node exists on the inner side than the terminal node (forward direction), the node 5 can recognize that the connection mode is the DCP connection, and that a span using the working line is between the node 1 and the node 3. Whereby, the node 5 can create the RIP table, and obtain all information necessary for itself as the secondary node.

As above, between the node 1 and the node 3, node IDs on the both ends of the DCP-connected path are set as the source node ID and the destination node ID. Namely, nodes required to set the squelch tables 11e are only ones between the node 1 and the node 3 through which the working line passes; no squelch table 11e is set between the node 4 and the node 5 through which the protection line is used. Additionally, a node functioning as the secondary node always uses the protection line to execute the crossconnect among the optical transmitting apparatuses, and enters data in the protection line. Each node can thereby recognize that itself is the secondary node, and create the RIP table necessary for itself as the secondary node.

When a failure occurs in the ring transmission system, a measurement thereto depends on whether the failure position involves the primary node or not. Namely, when a failure occurs in the working line involving the primary node, the secondary node executes the add/drop control on the protection line in a direction opposite to the primary node, and writes AIS in the protection line on the primary node's side.

When a failure occurs in the working line not involving the primary node, the primary node for bits "continue" of the optical signal, and fixes the service selector to the add node's side. The secondary node executes "drop" and "continue" of the optical signal on the protection line in a direction toward the primary node to transmit the optical signal to the primary node. In addition, the secondary node sets the service selector SS to the protection line toward the terminal node.

When a failure occurs in the protection line or in a span through which no optical signal passes, the primary node forbids "continue", and fixes the service selector SS to the add node. The secondary node forbids "add/drop crossconnect" using the protection line.

The primary node and the secondary node automatically perform the line setting, independently, as above. The secondary node automatically transmits AIS until the squelch table 11e is created, which leads to improvement of safety of the line. In addition, the secondary node is not at all required to perform special setting, which enables simple operation. This allows the system to operate more normally, improves the reliability thereof, and improves simplification of the man-machine interface.

Next description will be made of a ring transmission system in the DTP connection. FIG. 10 is a schematic diagram of a ring transmission system DTP-connected according to the first embodiment of this invention. A ring transmission system 35 shown in FIG. 10 is configured with a first ring transmission system 30 and a second ring transmission system 31 coupled to each other, wherein nodes on respective ring transmission paths are coupled, whereby optical signals are transmitted over the ring transmission paths.

The first ring transmission system 30 is configured with five optical transmitting apparatuses 30a, 30b, 30c, 30d, and 30e coupled to one another over a bidirectional ring transmission path having a data link in which crossconnect information representing an add node ID and a drop node ID is written.

The optical transmitting apparatus 30c receives an optical signal transmitted from an external optical transmitting apparatus (not shown) over a working line, transmits the optical signal to the first ring transmission system 30 over the working line, and transmits the optical signal to the first ring transmission system 30 over a protection line, while receiving an optical signal transmitted from the optical transmitting apparatus 30b of the first ring transmission system 30 over the working line, receiving an optical signal transmitted from the optical transmitting apparatus 30d of the first ring transmission system 30 over the protection line, and transmitting the optical signal to an external ring transmission system (not shown) over the working line, which functions as a first add/drop node.

The optical transmitting apparatus 30b functions as a node allowing optical signals to pass through.

The optical transmitting apparatus 30a receives the optical signal transmitted from the optical transmitting apparatus 30c (first add/drop node) over the working line, and transmits the optical signal to an optical transmitting apparatus 31a of the second ring transmission system 31 over the working line, while receiving an optical signal transmitted from the optical transmitting apparatus 31a of the second ring transmission system 31 over the working line, and transmitting the optical signal to the optical transmitting apparatus 30b of the first ring transmission system 30 over the working line, which functions as a first primary node. The optical transmitting apparatus 30d functions as a node allowing optical signals to pass through.

The optical transmitting apparatus 30e receives an optical signal transmitted from the optical transmitting apparatus 30d over the protection line, and transmits the optical signal to the optical transmitting apparatus 31e of the second ring transmission system 31 over the protection line, while receiving an optical signal transmitted from the optical transmitting apparatus 31e of the second ring transmission system 31 over the protection line, and transmitting the optical signal to the optical transmitting apparatus 30d over the protection line, which functions as a first secondary node.

Similarly, the second ring transmission system 31 is configured with five optical transmitting apparatuses 31a, 31b, 31c, 31d, and 31e connected to one another over a bidirectional ring transmission path having a data link in which crossconnect information representing an add node ID and a drop node ID is written.

The optical transmitting apparatus 31a receives an optical signal transmitted from the optical transmitting apparatus 30a of the first ring transmission system 30 over the protection line, and transmits the optical signal to the optical transmitting apparatus 31b of the second ring transmission system 31 over the working line, while receiving an optical signal transmitted from the optical transmitting apparatus 31b of the second ring transmission system 31 over the working line, and transmitting the optical signal to the optical transmitting apparatus 30a of the first ring transmission system 30 over the working line, which functions as a second primary node.

The optical transmitting apparatus 31e receives an optical signal transmitted from the optical transmitting apparatus 30e of the first ring transmission system 30 over the protection line, and transmits the optical signal to the optical transmitting apparatus 31d of the second ring transmission system 31 over the protection line, while receiving an optical signal transmitted from the optical transmitting apparatus 31d of the second ring transmission system 31 over the protection line, and transmitting the optical signal to the optical transmitting apparatus 30e of the first ring transmission system 30 over the protection line, which functions as a second secondary node.

The optical transmitting apparatus 31b and the optical transmitting apparatus 31d function as nodes permitting optical signals to pass through.

The optical transmitting apparatus 31c receives an optical signal transmitted from the optical transmitting apparatus 31e over the protection line, receives an optical signal transmitted from the optical transmitting apparatus 31b of the second ring transmission system 31 over the working line, and transmits the optical signal to an external ring transmission system (not shown) over the working line, while receiving an optical signal transmitted from the external ring transmission system over the working line, transmitting the optical signal to the optical transmitting apparatus 31b over the working line, and transmitting the optical signal to the optical transmitting apparatus 31d over the protection line, which functions as a second add/drop node.

Incidentally, in each of the optical transmitting apparatus 30c and the optical transmitting apparatus 31c, a switch PSW is shown. There is also shown DTP in order to clearly indicate the DTP connection.

An optical signal is added to the optical transmitting apparatus 30c of the first ring transmission system 30. The optical signal is split into two on the working line and the protection line. One of the split optical signals on the working line is passed through the optical transmitting apparatus 30b, and dropped from the optical transmitting apparatus 30a. The dropped optical signal is received by the optical transmitting apparatus 31a of the second ring transmission system 31, outputted from the optical transmitting apparatus 31a over the working line, passed through the optical transmitting apparatus 31b, and dropped from the optical transmitting apparatus 31c.

The other of the optical signals split at the optical transmitting apparatus 30c of the first ring transmission system 30 is passed through the optical transmitting apparatus 30d, and dropped from the optical transmitting apparatus 30e. The dropped optical signal is received by the optical transmitting apparatus 31e of the second ring transmission system 31, outputted from the optical transmitting apparatus 31e over the protection line, passed through the optical transmitting apparatus 31d, and dropped from the optical transmitting apparatus 31c.

The opposite direction is similar. An optical signal is added to the optical transmitting apparatus 31c of the second ring transmission system 31, and is split into two on the working line and the protection line. One of the split optical signals on the working line is passed through the optical transmitting apparatus 31b, and dropped from the optical transmitting apparatus 31a. The dropped optical signal is received by the optical transmitting apparatus 30a of the first ring transmission system 30, outputted from the optical transmitting apparatus 30a over the working line, passed through the optical transmitting apparatus 30b, and dropped from the optical transmitting apparatus 30c.

The other of the optical signals split at the optical transmitting apparatus 31c of the second ring transmission system 31 on the protection line is passed through the optical transmitting apparatus 31d, and dropped from the optical transmitting apparatus 30e. The dropped optical signal is received by the optical transmitting apparatus 30e of the first ring transmission system 30, outputted from the optical transmitting apparatus 30e over the protection line, passed through the optical transmitting apparatus 30d, and dropped from the optical transmitting apparatus 30c.

Similarly to the case of the DCP connection, in order to grasp crossconnect information coping with an increase in number of nodes relating to the ring transmission path, create more complex squelch tables 11e and manage switching of each line, an RIP table is created in each node to cope with switching in a complex structure. The setting is necessary for each line. When the user sets, the setting has to be done for each STS line and direction.

An optical transmitting method for a ring transmission system carried out in the first ring transmission system 30 and the second ring transmission system 31 is as follows: Namely, the first ring transmission system 30 comprises a first add/drop node, a first primary node, and a first secondary node, whereas the second ring transmission system comprises a second primary node, a second secondary node, and a second add/drop node. In each of the above nodes, crossconnect information of a data link and topology information uniquely representing the order of arrangement of nodes connected in a ring are read out (data link reading step). Using the topology information read out at the data link reading step, topology is created (topology creating step).

On the basis of the topology created at the topology creating step, an absolute node ID of each of plural nodes and a relative node ID given by relating absolute node IDs of other nodes and the topology is written in the crossconnect information of the data link (data link writing step). At the data link writing step, data of a relative node ID whose value is not zero is used.

Further, a squelch table holding the crossconnect information written in the data link is created (squelch table creating step). An RIP table holding an ID indicating a primary node transmitting an optical signal from a first ring transmission path to a second ring transmission path, a secondary node ID indicating a secondary node adjacent to the primary node to transmit/receive the optical signal, and a drop node ID is created for each of a working line and a protection line on the basis of the crossconnect information (RIP table creating step).

Following that, on the basis of a relative node ID of the crossconnect information read out at the data link reading step, it is recognized which itself is the primary node or the secondary node (node recognizing step).

Figures 11A, 11B:
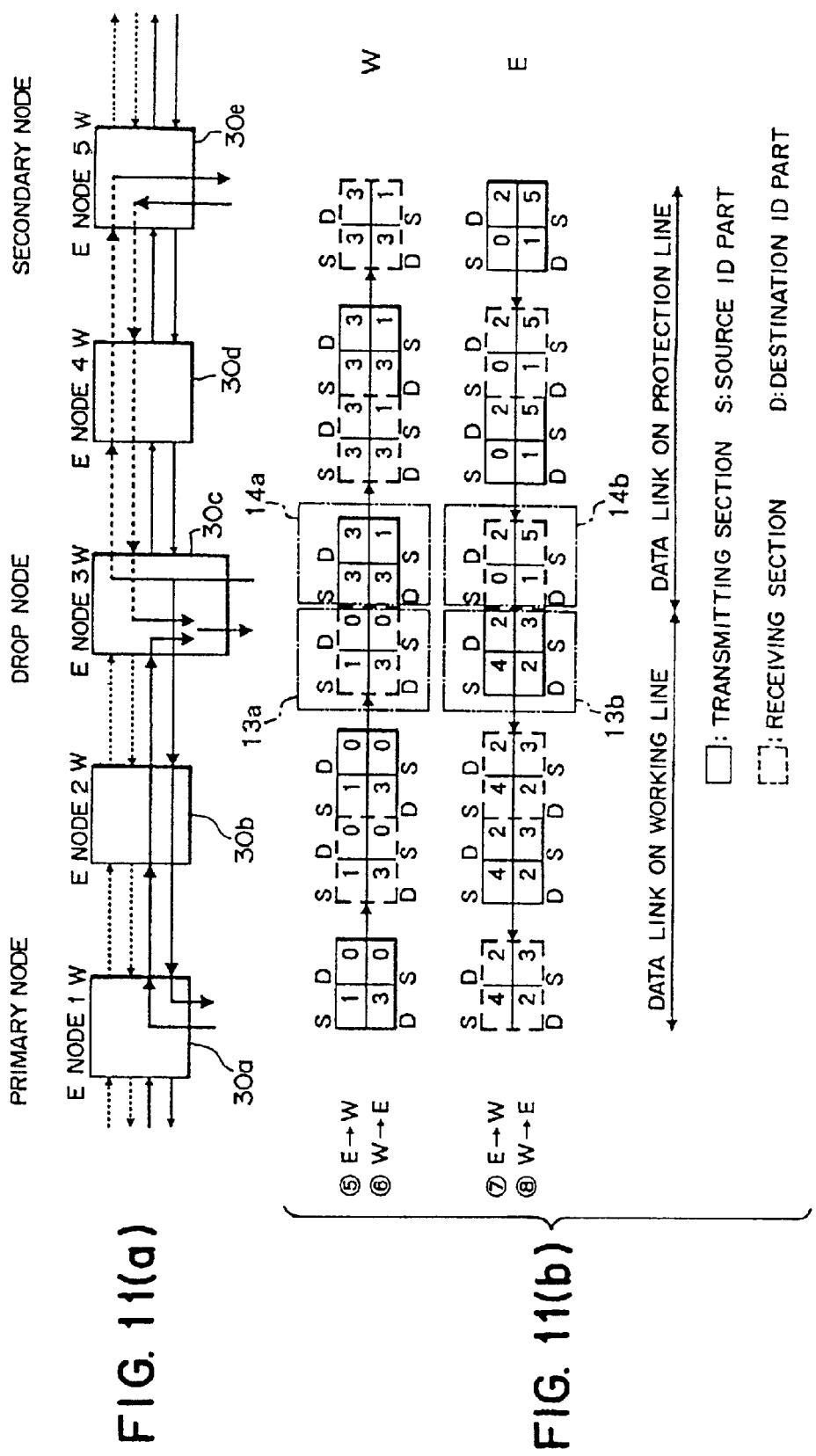
FIG. 11(a) is a schematic diagram for illustrating a DTP connection mode.
FIG. 11(b) is a diagram showing contents of a data link at each node in a DTP connection.

FIG. 11(a) is a schematic diagram for illustrating a DTP connection mode, wherein an optical signal transmitted from an optical transmitting apparatus 30a over a working line and an optical signal transmitted from an optical transmitting apparatus 30e over a protection line are received by an optical transmitting apparatus 30c, and dropped therefrom. Incidentally, solid lines represent the working lines, whereas broken lines represent the protection lines. The optical transmitting apparatus 30a and the optical transmitting apparatus 30e are connected, but their connection is omitted.

FIG. 11(b) is a diagram showing contents of data links at each node in the DTP connection. FIG. 11(b) corresponds to the nodes shown in FIG. 11(a), each part of which is arranged directly below a corresponding node.

For instance, a node 3 (optical transmitting apparatus 30c) has an east-side receiving unit 13a, an east-side transmitting unit 13b, a west-side receiving unit 14a, and a west-side transmitting unit 14b. Namely, the node 3 separately has an E→W direction and a W→E direction, and has transmit data and received data in each of these directions. Information about transmission and reception is managed with data of one byte.

⑤ and ⑦ show data links transmitted in the E→W direction, whereas ⑥ and ⑧ show data links transmitting in the W→E direction. In other words, the E→W direction and the W→E direction each has lines transmitting data links in two systems. Contents of a data link transmitting from the west side are stored in the west-side transmitting unit 14a, whereas contents of a data link received on the west side are stored in the west-side receiving unit 14b.

Similar to the above ① to ④, a relation between each direction of the data link (E→W direction, W→E direction), and a source node ID and a destination node ID therein is determined in the following manner.

In a flow in the W direction ⑤ in the E→W direction, each node writes a terminal node in the source node ID part, and an ID of a repeating node in the destination node ID part. In a flow in the E direction ⑦ in the E→W direction, each node writes a repeating node in the source node ID part, and a terminal node in the destination node ID part. Here, the repeating node is a primary node that is a node 1 between the node 3 and a node 5. Between the node 1 and the node 3, it means a secondary node that is the node 5.

In a flow in the W direction ⑥ in the W→E direction, each node writes an ID of a repeating node in the source node ID part, and a terminal node in the destination node ID part. In a flow of the E direction ⑧ in the W→E direction, each node writes an ID of a terminal node in the source node ID part, and a repeating node in the destination node ID part.

In the similar manner, each node compares a relation between the repeating node and the terminal node, and a relation of arrangement looked from the topology table to determine whether the primary node situates on the inner side of a region between itself and the terminal node, thereby discriminating between the DCP connection and the DTP connection.

First, the node 1 (optical transmitting apparatus 30a) receives a data link in the E direction ⑦ in the E→W direction. Here, the destination node ID is "2" (relative node ID) and the source node ID is "4" (relative node ID). The terminal node thus indicates the node 3, and the primary node indicates the node 5. In this case, there is no repeating node (whose node ID is "5") between the node 1 and the terminal node (whose node ID is "3"), so that the node 1 can recognize the DTP connection.

The additional information determining section 12d therefore determines that the first ring system 30 and the second ring transmission system 31 are in the DPT connection, since a direction of its own node ID ("1") showing its own node looked from the primary node ID ("5") is opposite to the arrangement of the nodes (1, 2, 3, 4, and 5) represented by the topology.

In a data link in the E direction ⑧ in the W→E direction, the source node ID indicates "3" (absolute node ID), and the destination node ID indicates "2". From this, it is recognized that the terminal node is the node 3, and the repeating node is the node 5. Therefore, the node 3 is a drop node, whereas the node 5 is an add node. A reason of this is that it is the source node ID part, to the last. Squelch of the working line in this case is required to be configured with data in the W direction; the squelch table 11e in this case is created according to the same rule.

Consequently, the node 1 determines that it is the DTP connection since there is no repeating node between itself and the terminal node (opposite direction), similar to the case of the E→W direction.

The node 5 determines that itself is the secondary node since a value other than "0" returns as the destination node ID in each direction.

Data other than zero is used as a relative node ID set by the data link writing section, and the node recognizing section recognizes presence or absence of zero data in a region in which a drop node ID of the data link is written, whereby completion of the setting of crossconnect information is determined.

Namely, the node 5 can recognize the DTP connection since there is no repeating node 2 between the node 5 and the terminal node 3 when looking a relation between the terminal node and the repeating node, and can recognize a span in which the working line is used from each received data link, thereby creating an RIP table.

When a failure occurs in the ring transmission system 35, measurement is as follows: When a failure occurs in the working line involving the primary node, the secondary node continuously performs the add/drop control on the protection line.

On the other hand, when a failure occurs in the working line not involving the primary node, the primary node carries out the normal switching operation. When the primary node allows optical signals to only pass through, the primary node operates as a through node. The secondary node performs "drop and continue" of the optical signals on the protection line in the direction toward the primary node to transmit the optical signal to the primary node. Additionally, the secondary node sets the service selector SS to the protection line toward the terminal node.

When a failure occurs in the protection line, or when a failure occurs in a span through which no optical signal passes, the primary node carries out the normal switching operation. When the primary node allows the optical signals to only pass through, the primary node operates as a through node. The secondary node inhibits add/drop-crossconnect using the protection line.

When a failure occurs in the working line or the protection line involving the terminal node, the primary node carries out the normal switching operation. When the primary node allows the optical signals to only pass through, the primary node operates as a through node. The secondary node inhibits add/drop-crossconnect using the protection line, as well.

Figure 12:
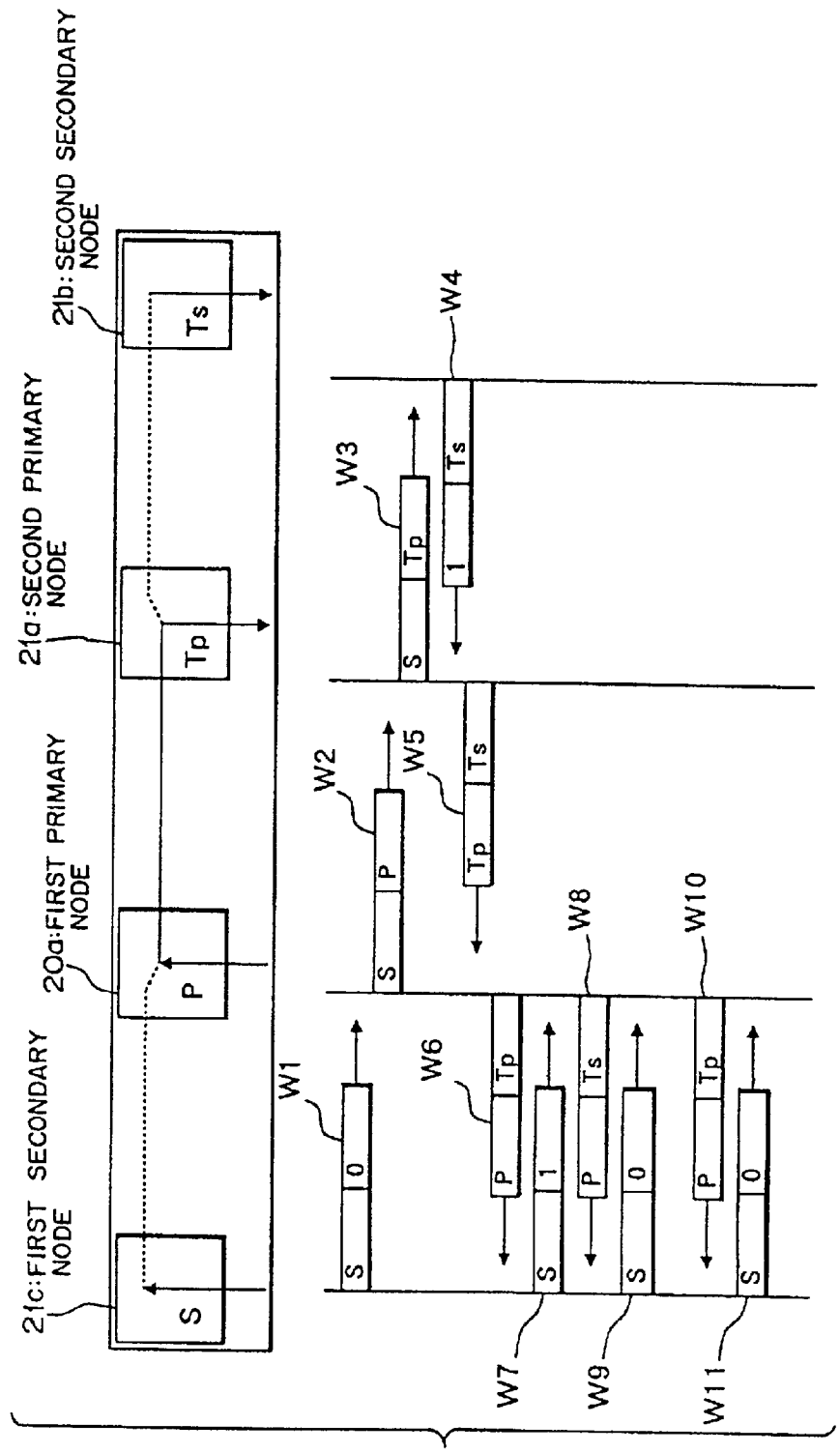
FIG. 12 is a diagram showing an optical signal transmission sequence in add setting according to the first embodiment of this invention.

With the above structure, each optical transmitting apparatus transmits optical signals in a different mode depending on the DCP connection or the DTP connection. FIG. 12 is a diagram showing an optical signal transmission sequence at the time of add setting according to the first embodiment of this invention in the case of DCP connection. In the upper part in FIG. 12, there are shown an optical transmitting apparatus (first secondary node) 20*c*, an optical transmitting apparatus (first primary node) 20*a*, an optical transmitting apparatus (second primary node) 21*a*, and an optical transmitting apparatus (second secondary node) 21*b* arranged from left to right. There are also shown contents of transmitting-receiving sequences of optical signals among these nodes. The contents of the optical signals are denoted by data links W1 to W11.

For transmission of optical signals, it is sufficient to know operations of four nodes located between a first ring transmission system 20 and a second ring transmission system 21; nodes other than these four nodes are not shown.

First, the optical transmitting apparatus 20*c* transmits a data link W1 in which a source node ID is entered and "0" (unset) is set as a destination node ID to a west-side transmitting unit 14*a*. The optical transmitting apparatus 20*a* transmits a data link W2 in which the source node is unchanged and the destination node ID is set to "P" (a relative node ID of the optical transmitting apparatus 20*a*) to the optical transmitting apparatus 21*a*. The optical transmitting apparatus 21*a* transmits a data link W3 in which the source node ID is unchanged and the destination node ID is set to "Tp" (a relative node ID of the optical transmitting apparatus 21*a*) to the optical transmitting apparatus 21*b*.

The optical transmitting apparatus 21*b* transmits a data link W4 in which the source node ID is set to "Ts" (an absolute node ID of the optical transmitting apparatus 21*b*) and the destination node ID is set to "1" to the optical transmitting apparatus 21*a*. The optical transmitting apparatus 21*a* rewrites the destination node ID to "Tp" in the data link W4, and transmits a data link W5. The optical transmitting apparatus 20*a* transmits a data link W6 in which the source node ID is set to "Tp" and the destination node ID is set to "P" to the optical transmitting apparatus 20*c*.

Next, transmission and reception of optical signals are performed between the optical transmitting apparatus 20*c* and the optical transmitting apparatus 20*a*. Namely, the optical transmitting apparatus 20*c* transmits a data link W7 in which the source node ID is "S" and the destination node ID is 1, and the optical transmitting apparatus 20*a* transmits a data link W8 in which the source node ID is "Ts" and the destination node ID is "P". Further, a data link W9 in which the source node ID is "S" and the destination node ID is "0" is transmitted, a data link W10 in which the source node ID is "Tp" and the destination node ID is "P" is transmitted, and a data link W11 in which the source node ID is "S" and the destination node ID is "0" is transmitted.

FIG. 13 is a diagram showing sequences as an add node according to the first embodiment of this invention, in which received values received by the optical transmitting apparatus 20*c* from the adjacent node, and transmit values transmitted to the adjacent nodes are shown. A section denoted by A1 shown in FIG. 13 is a section until a crossconnect is set. In the section A1, the optical transmitting apparatus 20*c* transmits a data link W20 in which the source node ID and the destination node ID are empty, and keeps receiving an empty data link W20 transmitted from the adjacent node. The optical transmitting apparatus 20*c* transmits the data link W1 in which the source node ID is "S" and the destination node ID is "0" when deciding that an optical signal is added over the protection line (PT). The data link "W1" is the same as the data link W1 in FIG. 12.

The other optical transmitting apparatuses receive the data link W1, set the crossconnect, and transmit a data link W21 to notify of completion of the setting. In the data link W21, the source node ID is "S'" and the destination node ID is "0". The optical transmitting apparatus 20*c* recognizes from the data link W21 that the optical signal is dropped over the protection line. Meanwhile, the optical transmitting apparatus 20*c* keeps transmitting the data link W1 in the section denoted by A in FIG. 13, while keeping receiving the data link W21.

The optical transmitting apparatus 20*c* recognizes from the data link W6 (a section denoted by A2) that setting of the crossconnect is completed, and transmits the data link W7. The optical transmitting apparatus 20*c* receives a data link W22 in which the source node ID is "0" and the destination node ID is "P", whereby the crossconnect in the DCP connection is completed. Incidentally, the data links W6 and W7 are the same as those in FIG. 12.

In a section denoted by B1, the optical transmitting apparatus 20c keeps transmitting the data link W1 in which the source node ID is "S" and the destination node ID is "0", and keeps receiving the data link W10 in which the source node ID is "Tp" and the destination node ID is "P".

When a request to cancel the crossconnect setting is transmitted in a section denoted by B2, the optical transmitting apparatus 20c receives a data link W21 in which the source node ID is "S'" and the destination node ID is "0", thereby recognizing this effect. The optical transmitting apparatus 20c thereby cancels the crossconnect on the protection line. After that, the optical transmitting apparatus 20c keeps transmitting and receiving the empty data link W1.

As above, the optical transmitting apparatus 20c can set the crossconnect as an add node by transmitting and receiving data links. In the case of the DTP connection, the above procedure is the same; sequences of which are omitted.

Figure 14:
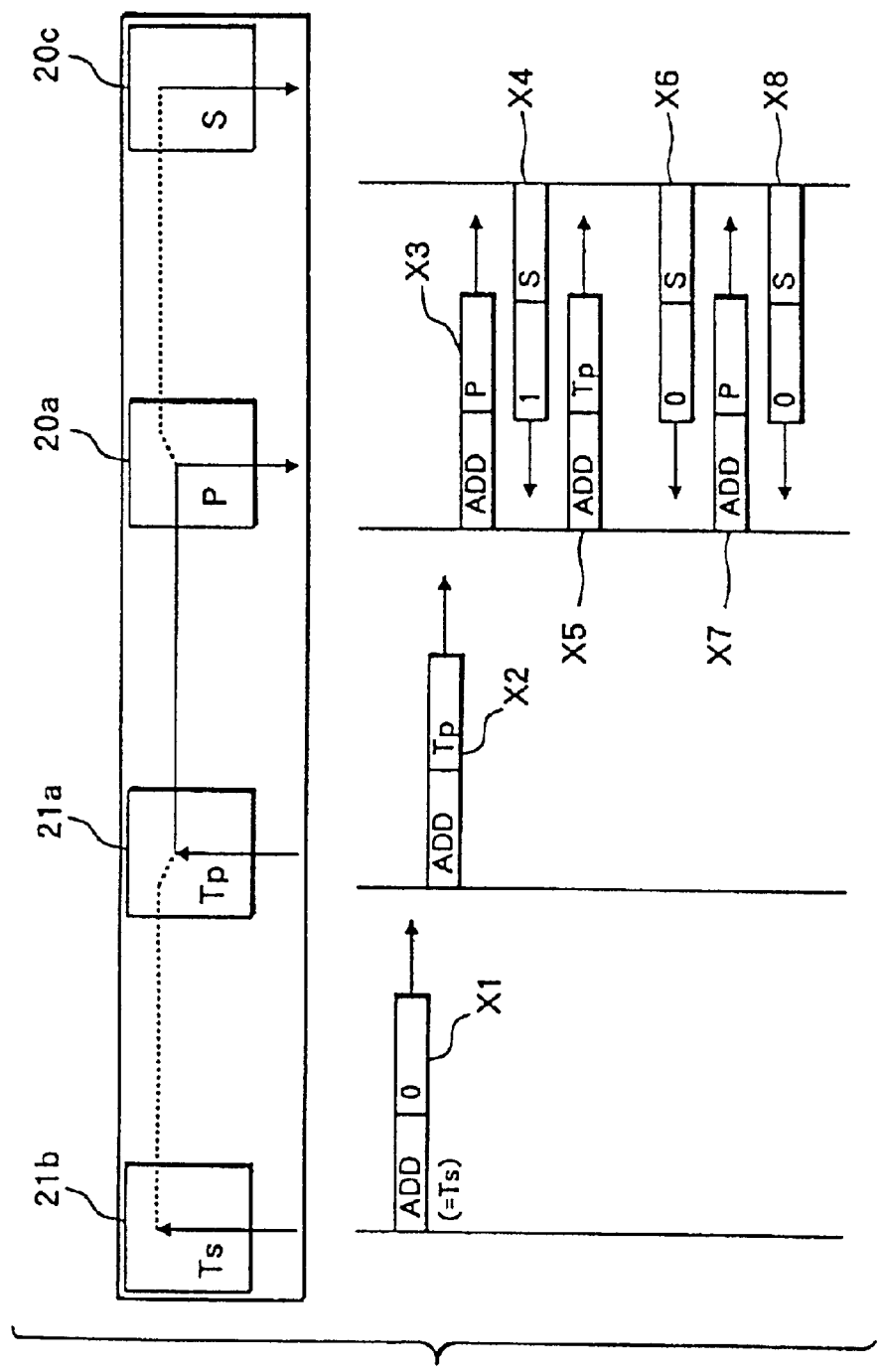
FIG. 14 is a diagram showing an optical signal transmission sequence in drop setting according to the first embodiment of this invention.

Setting of a crossconnect with the optical transmitting apparatus 20c as a drop node will be next described with reference to FIGS. 14 and 15. FIG. 14 is a diagram showing an optical signal transmission sequence at the time of drop setting in the case of the DCP connection according to the first embodiment of this invention. In the upper part in FIG. 14, optical transmitting apparatus (second secondary node) 21b, an optical transmitting apparatus (second primary node) 21a, an optical transmitting apparatus (first primary node) 20a, and an optical transmitting apparatus (first secondary node) 20c arranged from left to right are shown. There are also shown contents of the optical signal transmitting-receiving sequence among these nodes. Contents of optical signals are denoted by data links X1 to X8.

First, the optical transmitting apparatus 21b transmits a data link X1 in which the source node ID is set to ADD (corresponding to "Ts") indicating an add node and the source node ID is set to "0" (unset). The destination node ID in the data link X1 is rewritten to "Tp" (a relative node ID of the optical transmitting apparatus 21a) at the optical transmitting apparatus 21a, and the data link X1 is transmitted as a data link X2. Similarly, the destination node ID is written to "P" (a relative node ID of the optical transmitting apparatus 20a) of the data link X2 at the optical transmitting apparatus 20a, and the data link X2 is transmitted as a data link X3.

The optical transmitting apparatus 20c that has received the data link X3 transmits a data link X4 in which the source node ID is set to "S" and the destination node ID is set to "1" to the optical transmitting apparatus 20a. The optical transmitting apparatus 20a rewrites the destination node ID in the data link X3 to "Tp", and transmits a data link X5. The optical transmitting apparatus 20c transmits a data link X6 in which the source node ID is rewritten to "S" and the destination node ID is rewritten to "0" to the optical transmitting apparatus 20a. The optical transmitting apparatus 20a transmits a data link X7 in which the source node ID is an add node (ADD) and the destination node ID is "P". The optical transmitting apparatus 20c transmits a data link X8 in which the source node ID is rewritten to "S" and the destination node ID is set to "0" to the optical transmitting apparatus 20a.

Figure 15:
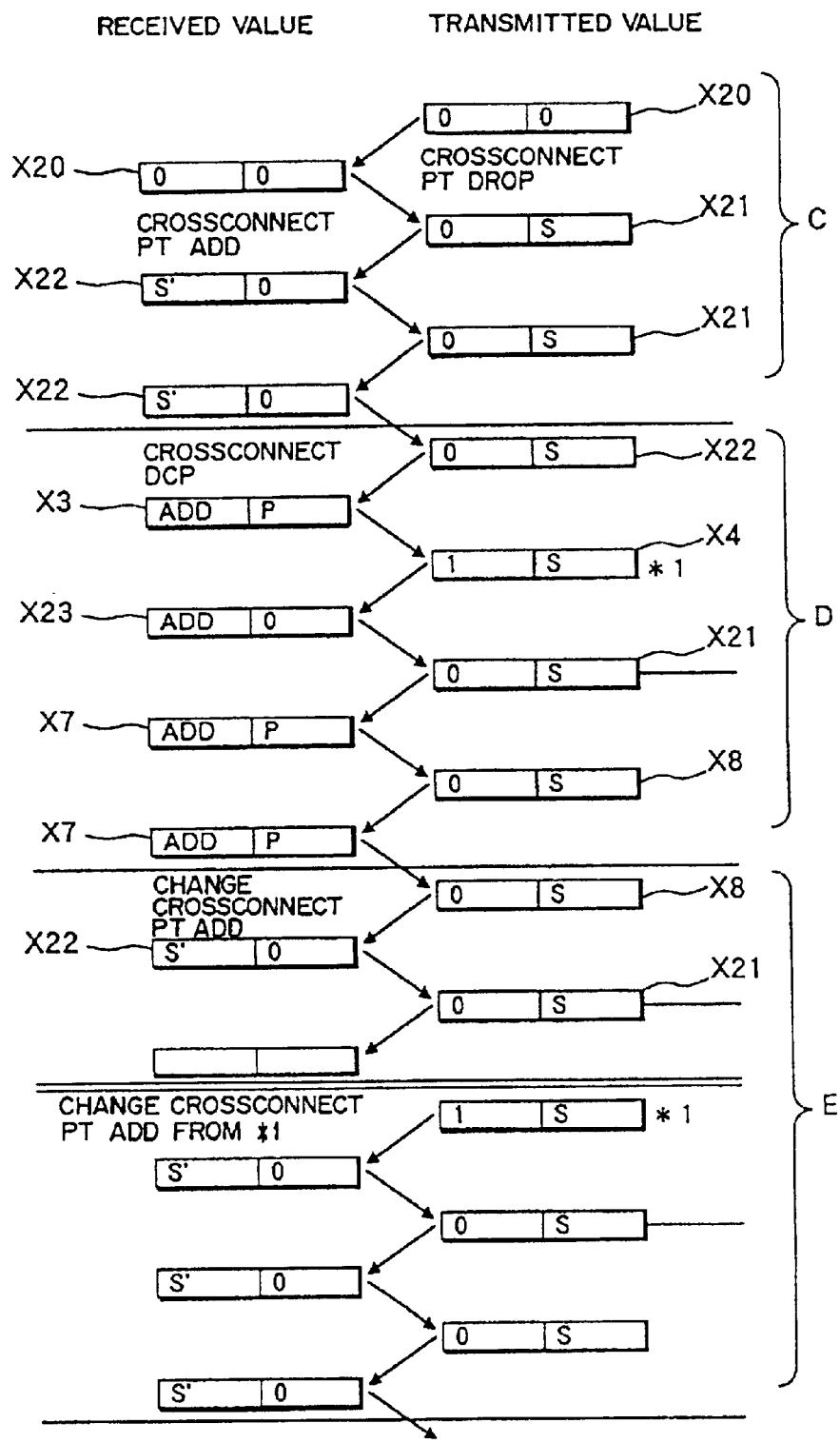
FIG. 15 is a diagram showing sequences as a drop node according to the first embodiment of this invention.

FIG. 15 is a diagram showing sequences as a drop node according to the first embodiment of this invention, in which received values received by the optical transmitting apparatus 20c from the adjacent node and transmit values transmitted to the adjacent node are shown. A section denoted by C in FIG. 15 is a section until crossconnect is set. In the section C, the optical transmitting apparatus 20c keeps transmitting a data link X20 in which the source node ID and the destination node ID are both empty, while keeping receiving the empty data link X20 transmitted from the adjacent node.

When an optical signal is decided to be dropped over the protection line (PT), the optical transmitting apparatus 20c transmits a data link X21 in which the source node ID is "S" and the destination node ID is set to "0".

The other optical transmitting apparatuses receive the data link X21, set a crossconnect, and transmit a data link X22 to notify of completion of the setting. In the data link X22, the source node ID is set to "S" and the destination node ID is set to "0". In a remaining part of the section C, similar sequence is repeated.

In a section denoted by D, when receiving a data link X3 in which an add node ID (ADD) is set in the source node ID and "P" is set in the destination node ID, the optical transmitting apparatus 20c recognizes that setting of the crossconnect is completed. The optical transmitting apparatus 20c transmits a data link X4 in which the source node ID is set to "S" and the destination node ID is "1". The optical transmitting apparatus 20c keeps receiving a data link X23 in which the destination node ID is empty transmitted from the other optical transmitting apparatus, besides transmitting an empty data link X21. The optical transmitting apparatus keeps transmitting the data link X21 until receiving a reply from the adjacent node. Incidentally, the data links X3 and X4 are the same as those in FIG. 14.

The optical transmitting apparatus 20c receives a data link X7 in which "ADD" is set in the source node ID and "P" is set in the destination node ID to recognize that the crossconnect in the DCP connection is completed, and keeps transmitting a data link X8 in which "S" is set in the source node ID and "0" is set in the destination node ID. Incidentally, the data links X7 and X8 are the same as those in FIG. 14.

In a section denoted by E, the optical transmitting apparatus 20c performs the similar process to that shown by the sequence in the section C, further description of which is thus omitted.

As above, the optical transmitting apparatus 20c can set the crossconnect as a drop node by transmitting and receiving the data links. Incidentally, procedure in the case of the DTP connection is similar, sequences of which are thus omitted.

Even if switching of the transmission path occurs in plural positions in the ring transmission system 25 or 35, the squelch table 11e and the RIP table 12b can be automatically created as soon as data links are set, so that the system can be normally operated by minimum setting. Even when there are a number of set items, setting of the optical transmitting apparatus can be readily done with the setting items still in a small number.

The squelch table 11e is created at a high speed using existing hardware; effective information transmission is possible, which in turn improves versatility of the products.

As above, data links can be configured without increasing an information quantity possessed by the current data links, and without increasing the number of setting items. Additionally, the secondary node automatically transmits AIS until the squelch tables 11e are created, so that safety of the line is increased.

(A1) Description of a Modification of the First Embodiment of the Invention

The present invention is not limited to the above example, but can be modified in various ways without departing from a scope of the invention.

In the above embodiment, optical transmission is performed between two ring transmission systems. However, the above embodiment is similar even when a larger number of ring transmission systems are connected. The number of optical transmitting apparatus possessed by one ring transmission system is not limited to 5 or 6, but a larger number is possible.

Figure 16:
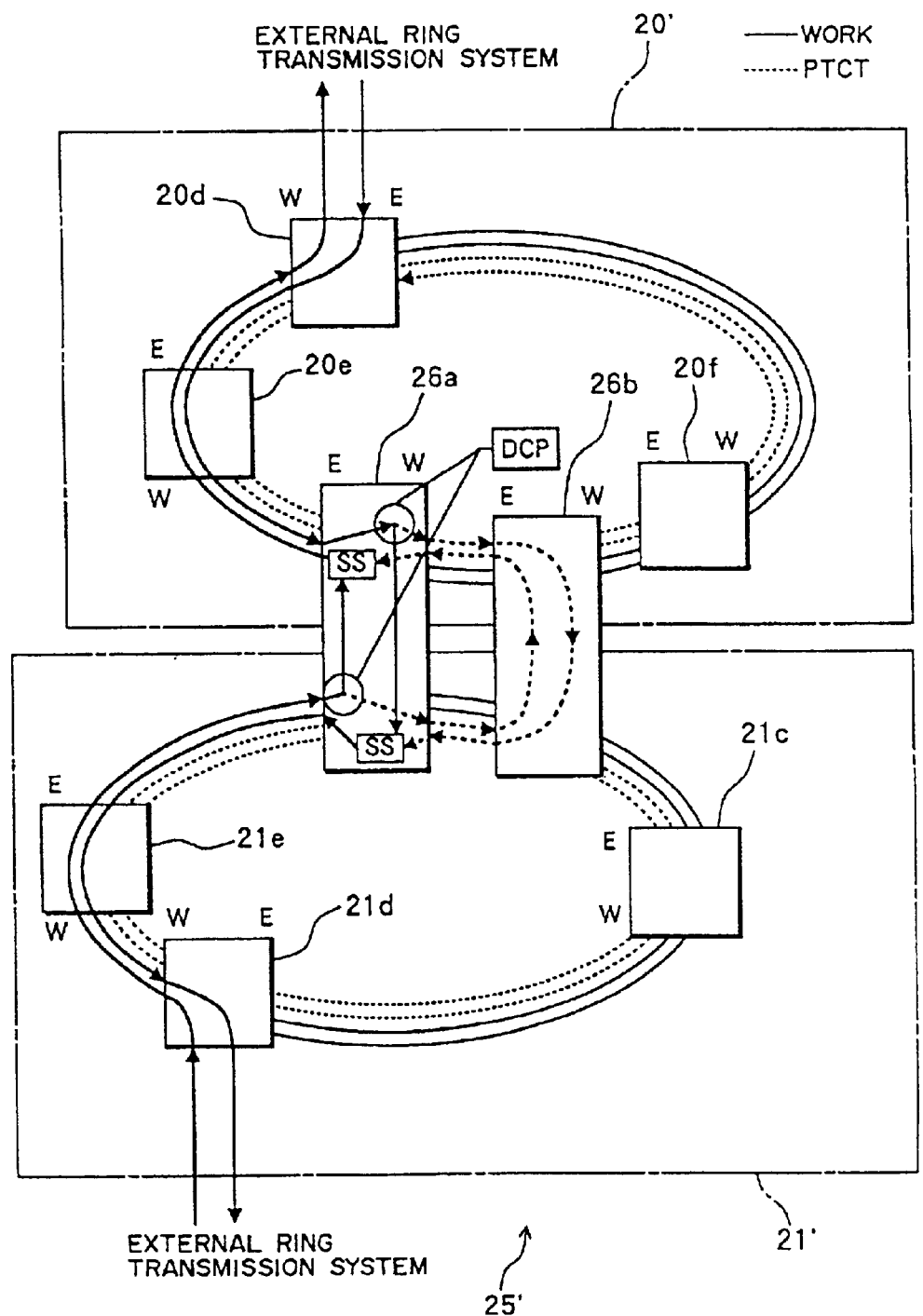
FIG. 16 is a schematic diagram of a ring transmission system in the case where nodes are unified according to a modification of the first embodiment of this invention.

Since each node can manage a plurality of ring transmission systems, the first primary node and the second primary node can be unified, whereas the first secondary node and the second secondary node can be unified. FIG. 16 is a schematic diagram of a ring transmission system whose nodes are unified according to a modification of the first embodiment of this invention. A ring transmission system 25' shown in FIG. 16 is configured with a first ring transmission system 20' and a second ring transmission system 21' coupled to each other. By coupling nodes along a ring transmission path, optical signals can be transmitted over the ring transmission path. The ring transmission system 25' is in the DCP connection.

The first ring transmission system 20' is configured with five optical transmitting apparatuses 20d, 20e, 26a, 26b, and 20f connected to one another over a bidirectional ring transmission path having a data link in which crossconnect information representing an add node ID and a drop node ID is written. The second ring transmission system 21' shares the optical transmitting apparatuses 26a and 26b with the ring transmission system 20', and optical transmitting apparatuses 21c, 21d, and 21e are connected to one another. The optical transmitting apparatus 20f is a through node. The optical transmitting apparatuses 20d and 20e, and the optical transmitting apparatuses 21c, 21d, and 21e are the same as those described above, further description of which is thus omitted.

The optical transmitting apparatus 26a has a function combining functions of the above first primary node and second primary node. Similarly, the optical transmitting apparatus 26b has a function combining functions of the above first secondary node 20c and second secondary node 21b. These optical transmitting apparatus 26a and 26b have the same functions as those described above, further description of which is thus omitted.

As above, two ring transmission systems can share a primary node and a secondary node, improving the economy. Although not shown, the nodes can be unified even in the DTP connection.

The number of optical fibers for connecting the optical transmitting apparatuses is four, but two or four optical fibers may be adapted since this invention is irrelevant to the physical layer. The number of types of crossconnects in the two-fiber BLSR is eight as same as the number of types of crossconnects in the four-fiber BLSR.

In the above embodiment, values of node IDs are only examples, not limited to the above setting. For example, the optical transmitting apparatus may be named node A, node B, node C, node D, node E, and node F.

The above example may be adapted in systems other than SONET.

Figure 64:
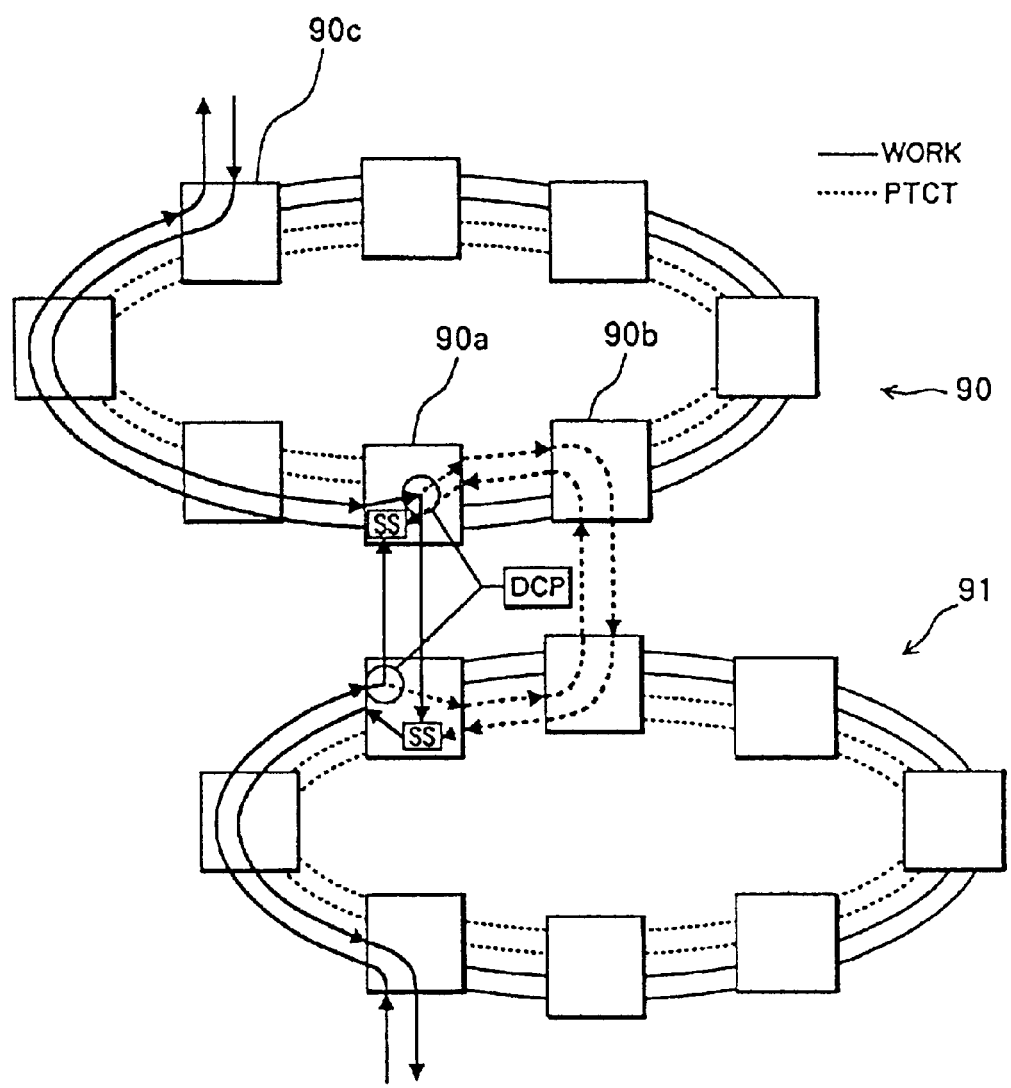
FIG. 64 is a schematic diagram of a DCP connection.
Figures 65A, 65B:
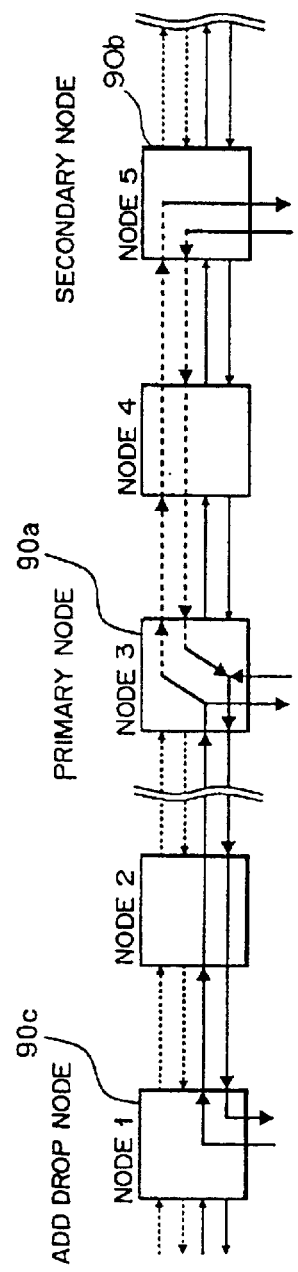
FIG. 65(a) is a diagram showing a structure of a DCP connection.
FIG. 65(b) is a diagram for illustrating squelch tables of respective nodes DCP-connected.
Figure 67:
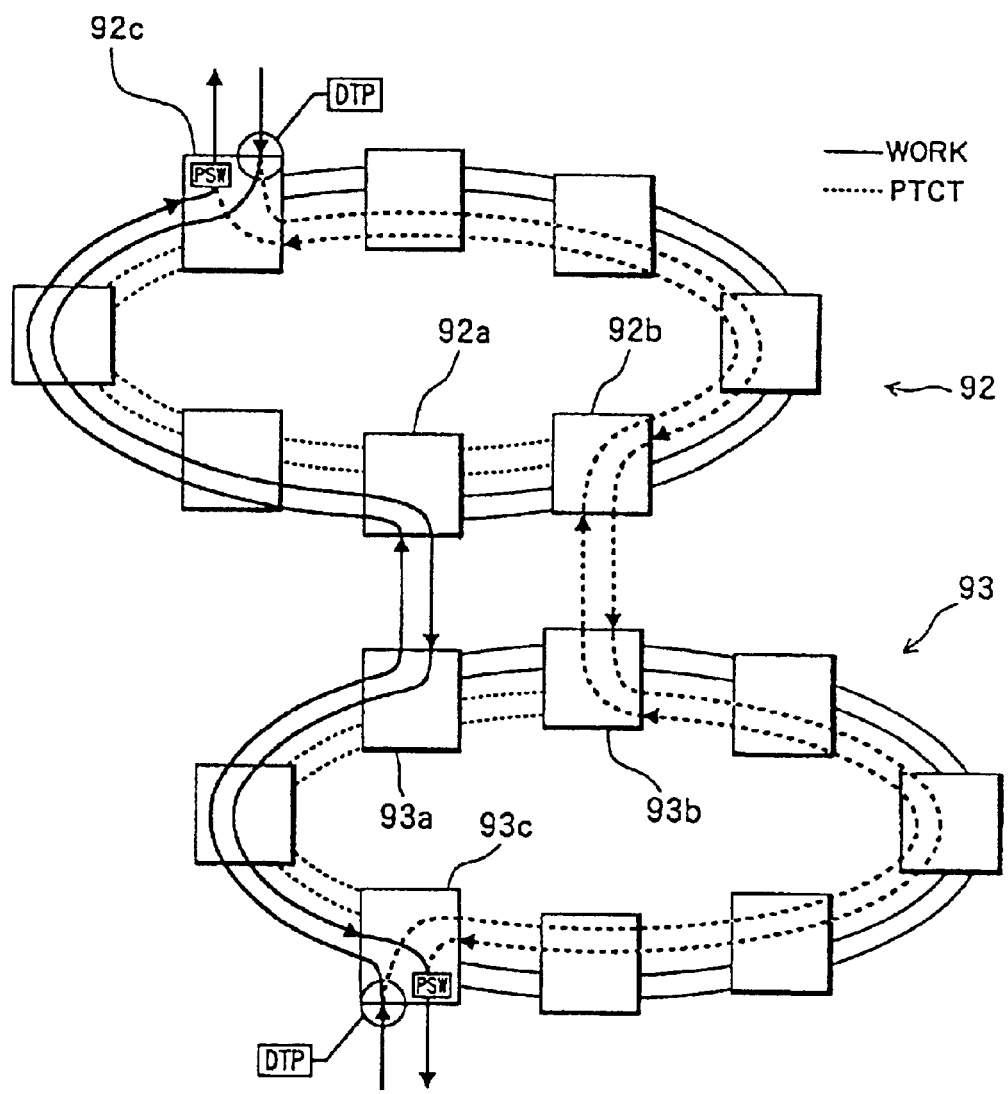
FIG. 67 is a schematic diagram of a DTP connection.
Figures 68A, 68B:
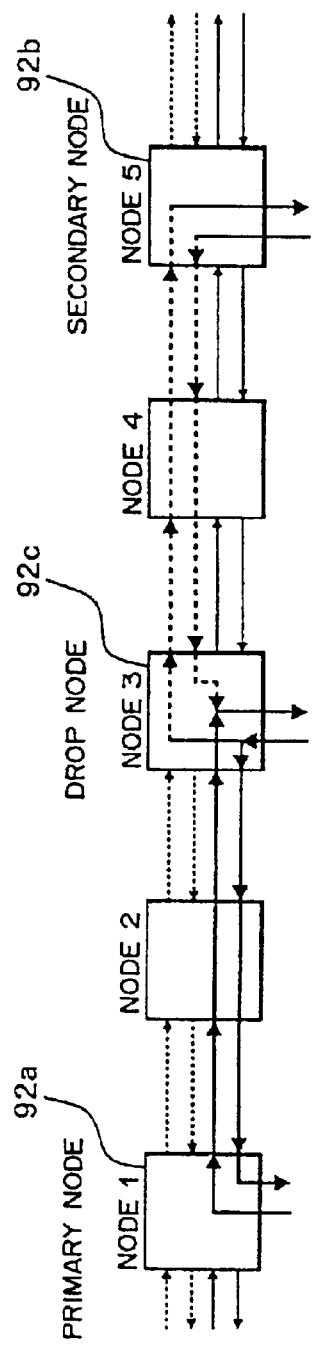
FIG. 68(a) is a diagram showing a structure of a DTP connection.
FIG. 68(b) is a diagram for illustrating squelch tables of respective nodes DTP-connected.
Figure 71:
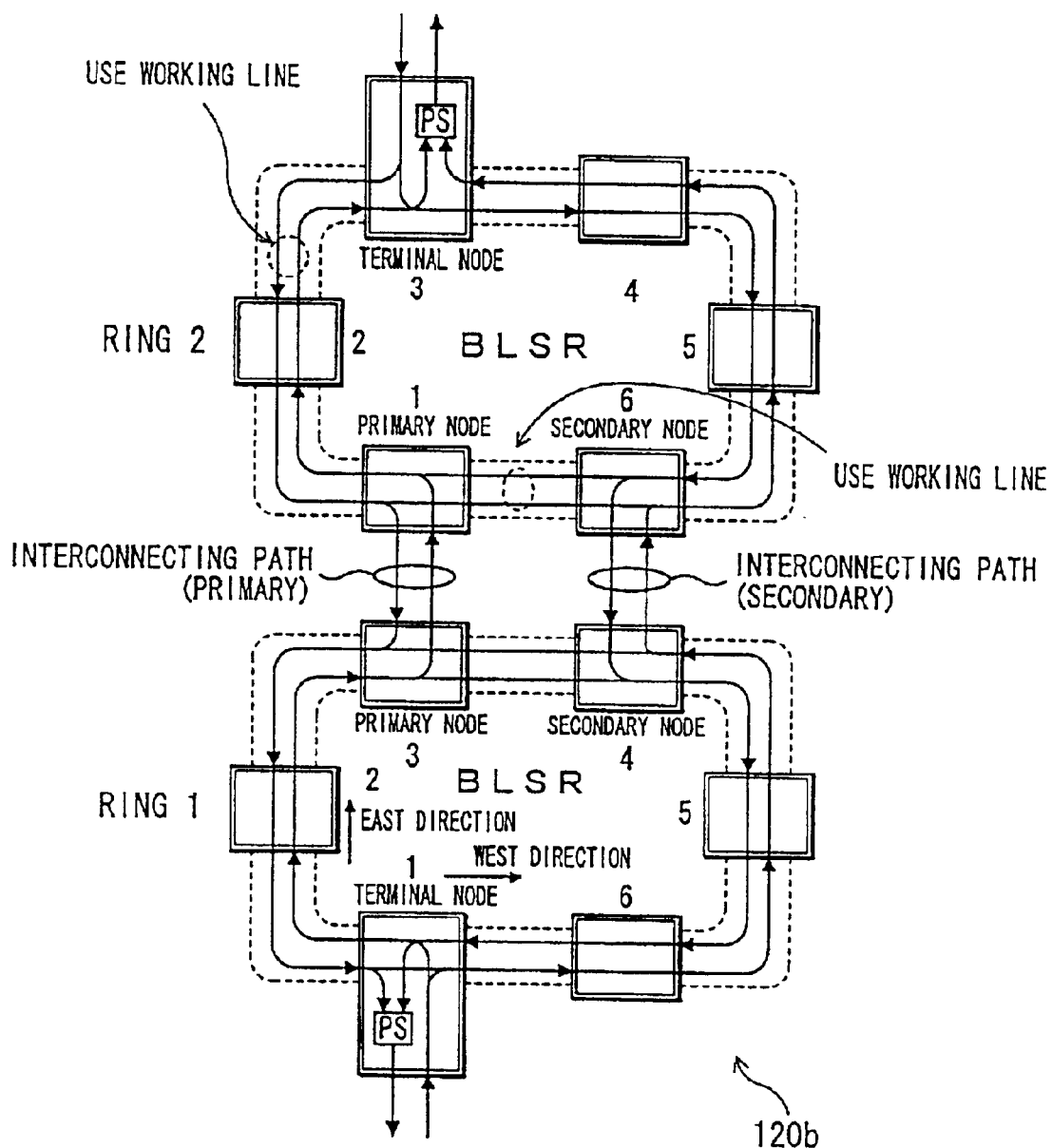
FIG. 71 is a diagram showing a structure of DTW.

In the optical transmitting apparatuses 20a and 21a shown in FIG. 8, a square denoted by DCP represents that the connection mode is the DCP connection. In this case, the service selectors SS operate in the DCP connection. These are the same as those in FIG. 64. In the optical transmitting apparatuses 92c and 93c shown in FIG. 67, a square denoted by DTP represents that the connection mode is the DTP connection. In this case, the switches PSW operate in the DTP connection.

(B) Description of a Second Embodiment of the Invention

SONET system is standardized as one of so-called new synchronous networks in the North America, as stated above. An example of this network, 16 nodes (that are optical transmitting apparatuses referred to as stations, occasionally) are connected in ring to configure a transmission ring.

The transmission ring is classified into two-fiber BLSR in which nodes are connected by two optical fibers, and four-fiber-BLSR in which nodes are connected by four optical fibers. A bidirectional ring transmission path is formed with a pair or pairs of optical fibers. In the four-fiber BLSR, with two optical fibers as a pair, optical signals are transmitted clockwise over one pair of the optical fibers, while optical signals are transmitted counterclockwise over the other pair, similarly to the two-fiber BLSR.

In the transmission ring, 16 nodes, for example, are connected to one another over the bidirectional ring transmission path, optical signals are transmitted clockwise over one pair of optical fibers, whereas optical signals are transmitted counterclockwise over the other pair.

Lines are classified into two types, a working line and a protection line. These lines stand for predetermined time slots among time slots transmitted over the optical fibers, in concrete.

When a failure such as line cut or the like occurs, optical signals transmitted over the working line in one pair of optical fibers are looped back to the protection line of the other pair, so that communications having a high quality (line quality) can be maintained.

In the following description, "loop-back" includes both "ring bridge" and "ring switch" when no proviso is given. "Ring bridge" is that nodes on the both sides of a failure position become switching nodes to switch the working line to the protection line. For example, channel 1 on the working line is switched to channel 25 on the protection line.

"Ring switch" is to switch the protection line to the working line. For example, channel 25 on the protection line is switched to channel 1 on the working line. Meanwhile, passing through optical signals as they are is called a through control.

Figure 17:
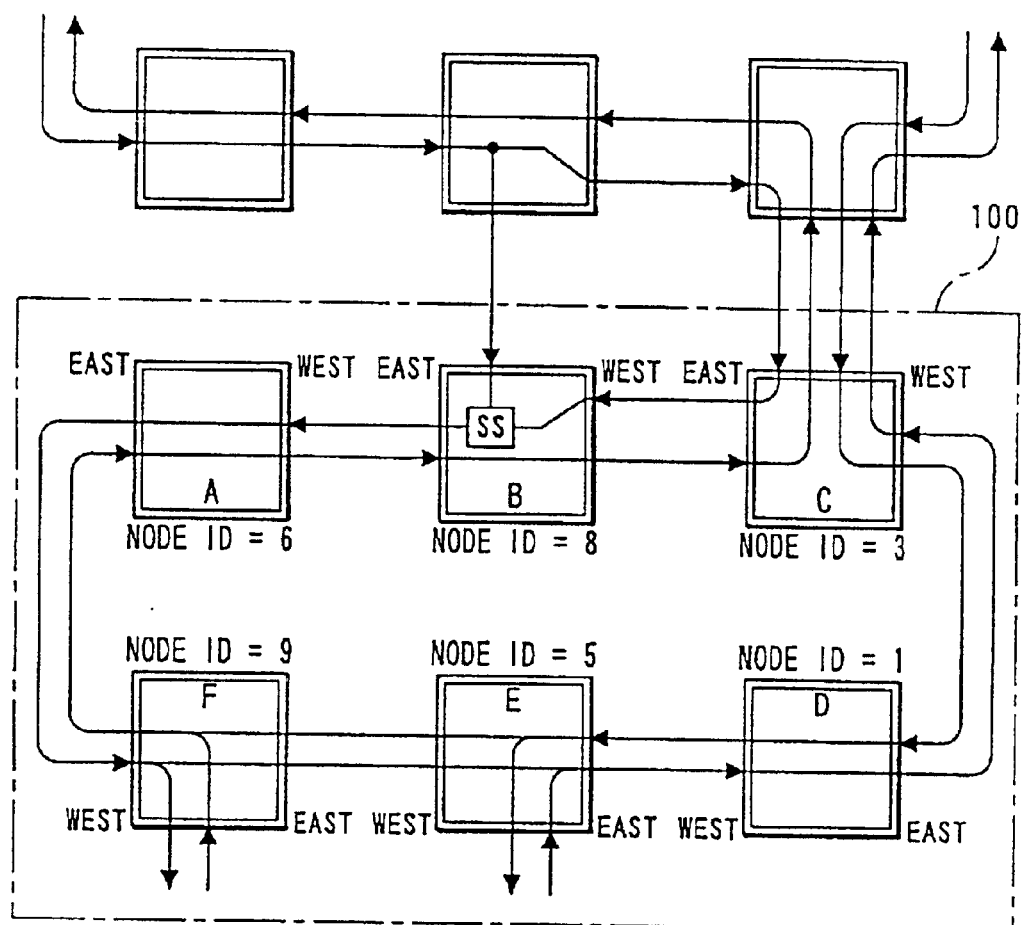
FIG. 17 is a schematic diagram of a structure of a ring transmission system according to a second embodiment of this invention.

FIG. 17 is a schematic diagram of a ring transmission system according to a second embodiment of this invention. A ring transmission system 100 shown in FIG. 17 is configured with six nodes A, B. C, D, E, and F (a plurality of optical transmitting apparatuses) connected to one another over an optical fiber transmission path (bidirectional ring transmission path). The nodes B, C, E, and F function as terminal nodes.

Meanwhile, the ring transmission system 100 stands for one ring, or plural, say, two, three or more plural rings connected to one another. In the following description, the ring transmission system will be referred to merely as a transmission ring, or a ring, occasionally. Additionally, the node B, for example, will be referred to as B station, occasionally. These represent the same as those described above. Within a range not leading to confusion, inscriptions of the node B or C will be simplified to merely B or C, occasionally.

Figure 18:
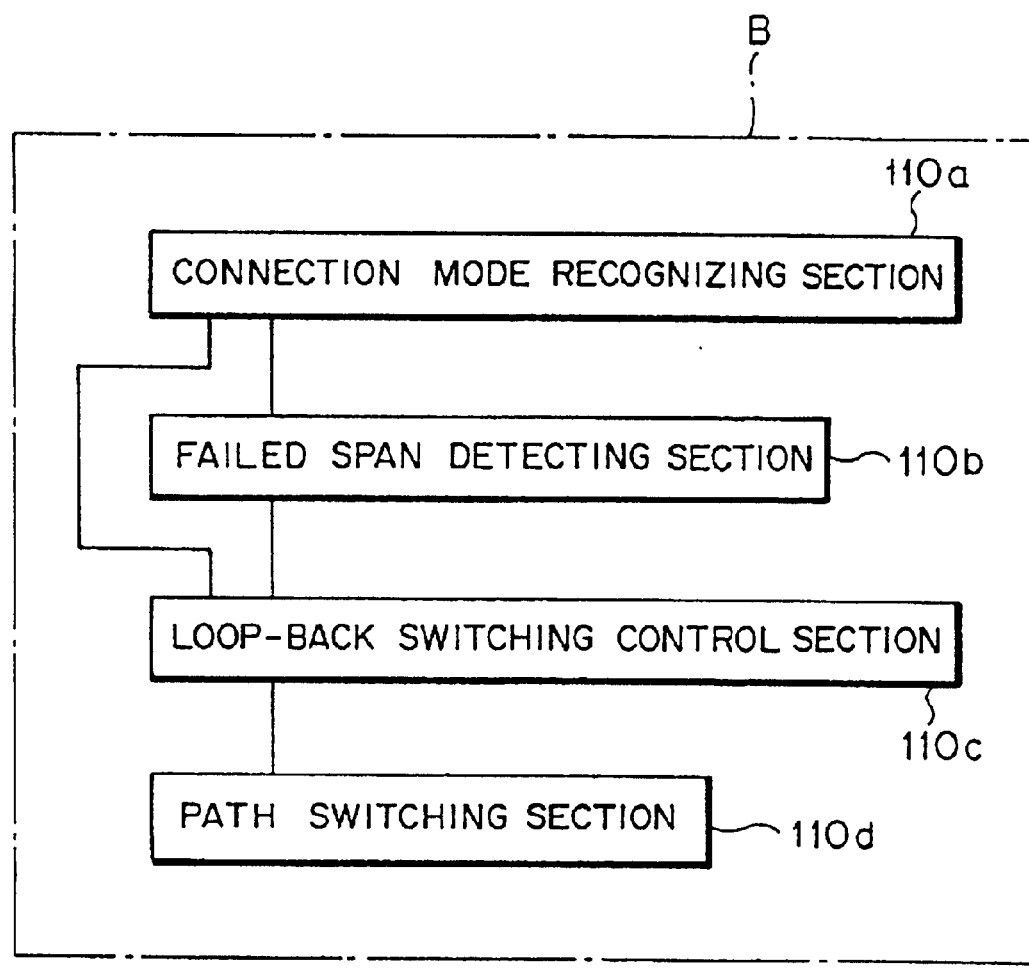
FIG. 18 is a diagram showing a structure of a node according to the second embodiment of this invention.

FIG. 18 is a diagram showing a structure of the node B according to the second embodiment of this invention. The node B shown in FIG. 18 is an optical transmitting apparatus for a ring transmission system, which comprises a connection mode recognizing section 110a, a failed span detecting section 110b, a loop-back switching control section 10c, and a path switching section 10d.

The connection mode recognizing section 110a is connected to the bidirectional ring transmission path to recognize a connection mode between its own transmission ring and another transmission ring connected to its own transmission ring. The failed span detecting section 110b is connected to the connection mode recognizing section 110a to detect a span in which a failure occurs.

The loop-back switching control section 110c is connected to both the connection mode recognizing section 110a and the failed span detecting section 110b to switch a transmission path on the basis of the connection mode and the span. The transmission path stands for a channel on the working line or the protection line, which is a time slot time-division-multiplexed on the transmission path.

These functions are accomplished by software and the like. Incidentally, the path switching section 10d will be described in a second modification of the second embodiment to be described later.

The connection mode recognizing section 110a and the failed span detecting section 100b receive optical signals in the transmission ring 100 to create a topology table. Namely, line connection information is informed the adding/dropping (adding or dropping) nodes B, C, E, and F in the transmission ring 10 over the working line and the protecting line. Each of the nodes receives the information to recognize its own line connection state.

Another node in the following description has the same structure as the node B shown in FIG. 18 when no special comment is given, duplicated description of which is thus omitted. Another node in another modification to be described later is the same.

FIGS. 19(a) and 19(b) are diagrams for illustrating node IDs according to the second embodiment of this invention. Each of the nodes has a ring map (topology table) shown in FIGS. 19(a) or 19(b). Each of these ring maps uniquely represents topology of a corresponding node configuring the transmission ring.

For example, the node B (indicated as B node) finds the other nodes as if they are arranged in the clockwise direction in the order of C, D, E, F, and A. This is the same as the node C shown in FIG. 19(b). Each of the nodes in the ring holds node IDs of all the nodes configuring the ring. Each node can thereby recognize topology in the ring.

Figure 20:
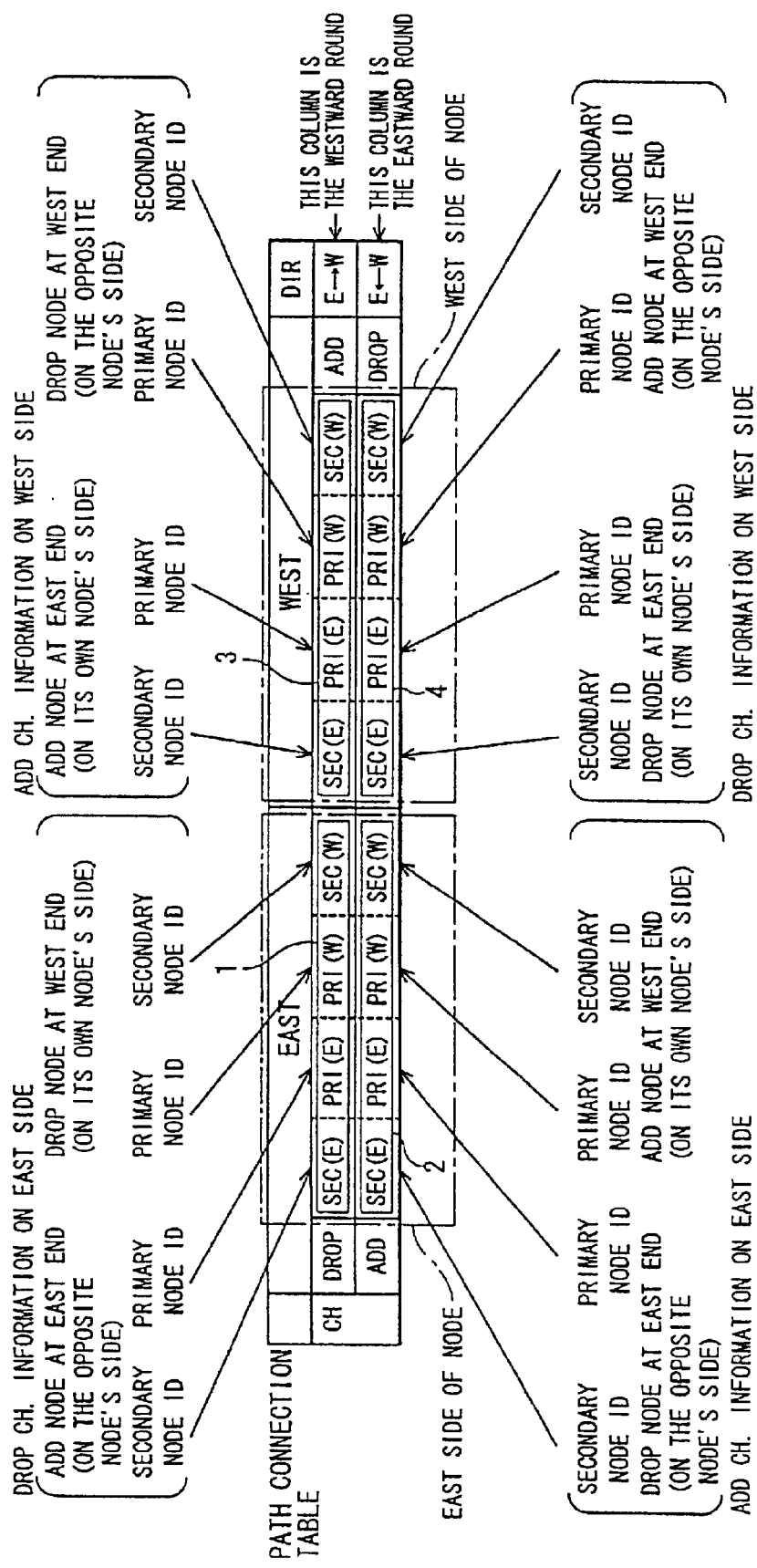
FIG. 20 is an illustrative diagram of a path connection table according to the second embodiment of this invention.

FIG. 20 is a diagram illustrating a path connection table according to the second embodiment of this invention, showing a line connection table (hereinafter referred to merely as a table, occasionally) when a certain channel is focused in a certain node. The table is also used in modifications of the second embodiment to be described later.

The table shown in FIG. 20 has a column denoted as "East" and a column denoted as "West". The column denoted as "East" stands for an east side of a node, including a column denoted by 1 and a column denoted by 2. The column denoted as "West" stands for a west side of the same node, including a column denoted by 3 and a column denoted by 4. This notation differs from meanings of the eastward round (clockwise round) or the westward round (counterclockwise round).

Bidirectional ring transmission path is categorized into one transmitting clockwise and the other transmitting counterclockwise. In the lower columns (denoted by 2 and 4) of the table, the eastward round represents a clockwise transmission path. In the upper columns (denoted by 1 and 3) of the table, the westward round represents a counterclockwise transmission path.

In one node, "add" and "drop" (East in the uppermost column of the table) are performed on the east side, besides "add" and "drop" (West in the uppermost column of the table) are performed on the west side.

When attention is paid to the east side, information on an add node on the opposite node's side [denoted by Sec(E) and Pri(E) in column 1] and information on a drop node on its own node's side [denoted by Pri(W) and Sec(W) in column 1] are set with respect to optical signals on the westward round. With respect to optical signals in the eastward round, information on an add node on its own node's side [denoted by Pri(W) and Sec(W) in column 2] and information on a drop node on the opposite node's side [denoted by Sec(E) and Pri(E) in column 2] are provided.

Similarly, when attention is paid to the west side, information on an add node on its own node's side [denoted by Sec(E) and Pri(E) in column 3] and information on a drop node on the opposite node's side [denoted by Pri(W) and Sec(W) in column 3] are set with respect to optical signals on the westward round. With respect to optical signals, information on an add node on the opposite node's side [denoted by Pri(W) and Sec(W) in column 4] and information on a drop node on its own node's side [denoted by Sec(E) and Pri(E) in column 4] are provided.

Information on a structure of the network represents a connection type of a ring interconnection of the channel. Therefore, the information on each channel on each of the eastward round and the westward round is given to each add/drop node.

With node IDs, line connection information on each transmission path is given. Whereby, each node (add node/drop node) configuring a ring such as DCW or the like centrally manages nodes in each ring, at which optical signals on each of the eastward round or the westward round are added or dropped.

FIG. 21 is an illustrative diagram of a network structure information table according to the second embodiment of this invention. The network structure information table shown in FIG. 21 shows connections of DCP, DTP, DCW, or DTW. This network structure information table is also used in modifications of the second embodiment to be described later.

The network structure information table shown in FIG. 21 has a column denoted as "East" and a column denoted as "West". "East" represents information on the east side of the node, whereas "West" represents information on the west side of the node. This table also has two columns; "E→W (west direction)" in the upper column and "W→E (east direction)" in the lower column.

With respect to optical signals in the column of the E→W direction on the east side, a column denoted by 11 represents a connection of an add node on the opposite node's side, and a column denoted by 14 represents a connection of a drop node on its own node's side. With respect to optical signals in the W→E direction, a column denoted by 13 represents a connection of an add node on its own node's side, and a column denoted by 12 represents a connection of a drop node on the opposite node's side.

In other words, with respect to the eastward round, there is recorded setting of a line connection between a primary node and a secondary node of a node adding optical signals in the W→E direction and a node dropping optical signals in the W→E direction. With respect to the westward round, there is set a line connection mode between a primary node and a secondary node of a node adding optical signals in the E→W direction and a node dropping optical signals in the E→W direction.

Similarly, with respect to optical signals in the E→W direction on the west side, a column denoted by 17 represents a connection of an add node on its own node's side, and a column denoted by 15 represents a connection of a drop node on the opposite node's side. With respect to optical signals in the W→E direction, a column denoted by 16 represents a connection of an add node on the opposite node's side, and a column denoted by 18 represents a connection of a drop node on its own node's side.

In other words, with respect to the westward round, there is recorded setting of a line connection mode between a primary node and a secondary node of a node adding optical signals in the E→W direction and a node dropping optical signals in the E→W direction. With respect to the eastward direction, there is set a line connection mode between a primary node and a secondary node of a node adding optical signals in the W→E direction and a node dropping optical signals in the W→E direction.

Therefore, the connection mode recognizing section 110a (refer to FIG. 18) can centrally recognize information on a terminal node (terminal optical transmitting apparatus) connected to a bidirectional ring transmission path to add/drop optical signals, connection mode information about a connection mode of nodes, and line type information indicating a working line or a protection line.

The failed span detecting section 110b shown in FIG. 18 detects a failure position using information on the above line connection table and a control of APS (Automatic Protection Switching) showing failure information. The APS showing failure information is information indicating a failure position in the ring, referred to as an APS code. This information is transferred in the ring using section overhead K1 or K2 byte of SDH. The APS control is based on the standard using K1/K2 byte in an SONET frame or SDH frame. This APS control is performed on a node connecting rings. Incidentally, this standard is a known technique as standard (CCITT recommendation standard) such as Generic Requirements or the like of Bellcore, detailed description of which is thus omitted.

The loop-back switching control section 110c shown in FIG. 18 performs line switching as a primary node or a secondary node when a failure occurs.

When the loop-back switching control section 110c performs switching as, particularly, a secondary node, the loop-back switching control section 110c performs the following basic operation (1) and operations in (2-α) to (2-δ) below. The basic operation and the operations (2-α) to (2-δ) will be referred in the description of a node operation to be described later.

(1) Basic Operation

The loop-back switching control section 110c rejects all accesses to the protection line when a failure occurs in the ring. This basic operation is commonly performed in any connection of DCP, DTP, and submarine BLSR, triggered by a node state of the ring switch.

In a switching operation by the loop-back switching control section 10c as a primary node at the time of occurrence of a failure, the loop-back switching control section 110c drops optical signals transmitted over the working line, and switches to the protection line to transmit optical signals to the adjacent secondary node.

(2-α) When optical signals reaches the opposite node by accessing to the protection line, "add" and "drop" are performed. In the case of DCP, the "add" and "drop" are performed in the opposite direction.

(2-β) When its own node operates as a switching node and ring-bridging generates, the loop-back switching control section 110c cancels the bridge of the channel.

(2-β) When optical signals reach a primary node with which own node makes a pair, the loop-back switching control section 110c actuates the service selector SS for optical signals on the adding side, in addition to the above operation, and performs "drop" and "continue" on optical signals on the dropping side.

(2-δ) When optical signals reach the opposite node (secondary node) by accessing to the protection line in a manner other than the above (2-α) to (2-γ) the loop-back switching control section 110c performs "add" and "drop".

In the case other than the above (2-α) to (2-δ), the loop-back switching control section 110c stops accesses to the protection line. The opposite node signifies a terminal node terminating the working line, a primary node, or a secondary node. The primary node signifies a node that makes a pair with its own node (secondary node), and accesses to the same optical signal, not a primary node for the opposite node.

FIG. 22 is a diagram illustrating basic operations of nodes in DCP according to the second embodiment of this invention. When a failure detection pattern a (described as failure in working line including primary node) shown in FIG. 22 occurs, the primary node performs only "drop", and stops the service selector SS, whereas the secondary node accesses to the protection line in the opposite direction. This operation corresponds to the above basic operation (2-α). To cope with other failures than the above, basic operations as shown in FIG. 22 are performed.

FIG. 23 is a diagram illustrating basic operations of nodes in DTP according to the second embodiment of this invention. When a failure detection pattern a (indicated as failure in working line including primary node) shown in FIG. 23 occurs, the terminal node stops "bridging" to the protection line, and stops path switching, whereas the secondary node accesses to the protection line in the forward direction. This failure detection pattern a corresponds to the above basic operation (2-α). To cope with other failures, the basic operations shown in FIG. 23 are performed.

FIGS. 24(*a*) and 24(*b*) are diagrams illustrating basic operations among nodes according to the second embodiment of this invention. There are shown operations performed among three nodes; a secondary node, a terminal node, and a primary node. FIG. 24(*a*) shows operating positions of the basic operations (2-α), (2-β), and (2-γ) shown in FIG. 22. FIG. 24(*b*) shows operating positions of the basic operations (2-α), (2-β), and (2-γ) shown in FIG. 22.

FIG. 24(*c*) is a diagram illustrating correspondence between the primary node and the secondary node according to the second embodiment of this invention. The secondary node (Sec-1) shown in FIG. 24(*c*) chooses a primary node (Pri-1) as a primary node that is to make a pair therewith. The secondary node 2 (Sec-2) chooses a primary node 2 (Pri-2) as a primary node that is to make a pair therewith.

Next, failure operation patterns among four nodes will be described with reference to FIGS. 25 through 35, and failure operation patterns among three nodes will be described with reference to FIGS. 36 through 39. Incidentally, a failure operation pattern will be occasionally referred to as merely a pattern, hereinafter.

Figure 25:
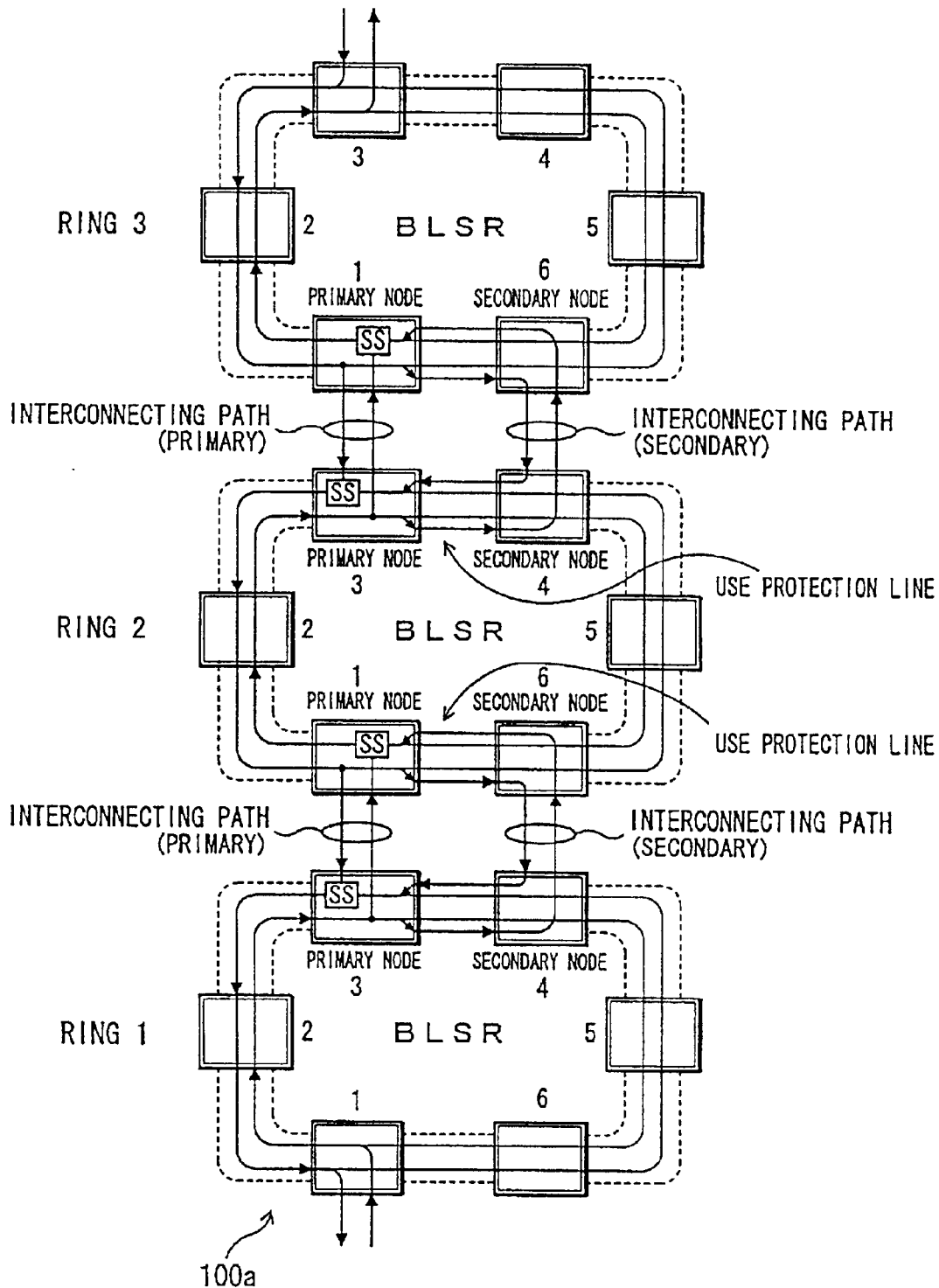
FIG. 25 is a diagram showing a structure of a ring transmission system according to the second embodiment of this invention.

FIG. 25 is a diagram showing a structure of a ring transmission system according to the second embodiment of this invention. A ring transmission system 100a shown in FIG. 25 is in DCP-DCP (double-sided DCP). A ring 2 of the ring transmission system 100a shown in FIG. 25 is DCP-connected to a ring 1 and a ring 3. The ring 2 is connected to the two adjacent rings at two terminal nodes at two positions (two pairs of primary node and secondary node).

Specifications of single-sided DCP, DTP and the like are standardized in the standard of GR-1230 of Bellcore, but a double-sided ring using protection lines to interconnect rings is not documented.

Nodes shown in FIG. 25 each has the connection mode recognizing section 110a (refer to FIG. 18). The connection mode recognizing section 110a recognizes that two nodes among the nodes connected to the transmission ring are in DCP connection to "continue" optical signals over both the working line and the protection line.

The intermediate ring (a ring connected to the ring 2) may be in DTP, or a UPSR. Further, although not shown, another node may be installed between the primary node and the second node (two positions existing in the ring 2).

FIGS. 26(a) through 26(c) and FIGS. 27(a) through 27(c) are diagrams showing failure operation patterns in DCP-DCP according to the second embodiment of this invention. Four nodes shown in FIG. 26(a) are nodes (denoted by reference characters 4, 3, 1, and 6) in, for example, the ring 2 shown in FIG. 25. Sec-2, Pri-2, Pri-1, and Sec-1 correspond to the nodes 4, 3, 1, and 6 in this order. A pair of Sec-1 and Pri-1 is a pair on its own node's side. A pair of Sec-2 and Pri-2 is a pair on the opposite node's side. A pair of Sec-2, Pri-2 are DCP-connected to the adjacent ring, whereas a pair of Sec-1 and Pri-1 are DCP-connected to another adjacent ring.

Four nodes shown in FIGS. 26(b) and 26(c), and FIGS. 27(a) through 27(c) are similar to those shown in FIG. 26(a).

A pattern in FIG. 26(a) shows a normal operation, while patterns in FIGS. 26(b) and 26(c) show operations at the time of failure occurrence.

Here, a range in which a failure occurs is classified as below, for the sake of convenience. Considering Sec-1 as a reference, line connection positions are named N1, N2, N3, and N4 as abbreviations representing failure positions between the rings in the order in which the nodes are arranged from right to left with Sec-1 as the lead.

N1: a protection line failure on its own node's side in the forward direction.

N2: a working line failure in the forward direction.

N3: a protection line failure on the opposite node's side in the forward direction.

N4: another line failure in the forward direction.

R1: another line failure in the opposite direction.

R2: a protection line failure on the opposite node's side in the opposite direction.

R3: a working line failure in the opposite direction.

R4: a protection line failure on its own node's side in the opposite direction.

When a failure occurs, a node at which the failure occurs transfers failure information on it in the ring using APS information. In each of the primary node and the secondary node interconnecting the rings, a failure position, N1, N2, N3, N4, R1, R2, R3, or R4 at which the failure has occurred is specified from a path connection table and APS information.

The number of patterns shown in FIGS. 26(a) through 26(c) and FIGS. 27(a) through 27(c) are 16 including failures at plural positions when the ring is connected on the both sides. By analyzing operations of the primary node and the secondary node separately, the number of patterns can be grouped. For this, there are shown only patterns in which each node operates among 16 patterns on the basis of a result of the grouping.

Types of operations of Sec-1 (refer to ring 2-node 6 shown in FIG. 25) show in FIGS. 26(a) through 26(c) and FIGS. 27(a) through 27(c) can be grouped into four types, (1-1) to (1-4):

(1-1) Default State

As an operation on an optical signal in the east direction (W→E), Sec-1 adds an optical signal to the protection line in the forward direction. As an operation on an optical signal in the west direction (E→W), Sec-1 drops an optical signal in the forward direction to an optical signal being transmitted over the protection line. Incidentally, the forward direction stands for the original (default) direction, whereas the opposite direction stands for a direction in which an access is made in a direction opposite to the default direction. Accordingly, the forward direction/opposite direction differs from the E→W/W→E direction.

(1-2) Full Stop State

Sec-1 stops "add", and sends AIS instead of "drop" (this operation is called drop-AIS).

(1-3) Opposite Direction Access

Sec-1 stops adding the optical signal to the forward direction line in the default state, and adds the optical signal to the protection line of the opposite direction line. Sec-1 also stops dropping the optical signal from the forward direction line in the default state, and drops the optical signal to an optical signal being transmitted over the protection line of the opposite direction line.

(1-4) Access in the Opposite Direction, Service-Select, and Continue

Sec-1 adds an optical signal to the protection line of the opposite direction line, and forms a service selector SS. Sec-1 also drops an optical signal from the opposite direction line to an optical signal being transmitted over the protection line, and continues the optical signal.

Types of operations of Pri-1 (primary node) shown in FIG. 26(a) are grouped into three; (2-1) to (2-3), as follows:

(2-1) Default State

Pri-1 adds an optical signal to the forward direction line, and forms a service selector SS. Pri-1 drops an optical signal from the forward direction line, and continues the optical signal on the protection line.

(2-2) Full Stop State

When operating as a switching node, Pri-1 squelches to perform "drop-AIS". Incidentally, Pri-1 sometimes operates similarly to that in a partly stop state (2-3).

(2-3) Partly Stop State

Pri-1 only adds an optical signal to the forward direction line. Pri-1 only drops an optical signal from the forward direction line.

An optical signal added to Sec-1 from the right side in FIG. 26(a) passes through N1 (protection line), and reaches Pri-1. At Pri-1, the optical signal is united with an optical signal added to Pri-1 under the service-selector control, passed through N2 (working line), and transferred to Pri-2.

Looping back at a failed node, and adding to the working line and dropping from the working line are, in practice, carried out by squelching at a failed node without stopping transmission of optical signals. This is the same as in FIG. 26, as well as in diagrams illustrating other failure operation patterns.

The optical signal received over N2 by Pri-2 is dropped therefrom, while being continued. The optical signal is then passed through N3 (working line), and transferred to Sec-2. From Sec-2, the optical signal transmitted over N3 is dropped.

A control on an optical signal added to Sec-2 and transmitted in the opposite direction differs from the above in only that the passing path is R2 (working line), R3 (working line), and R4 (protection line), the other parts are the same; redundant description of which is here omitted.

The above is an operation in DCP-DCP in the normal conditions.

A pattern shown in FIG. 26(b) is at the time of a failure occurring in another span, wherein the above basic operation (1) is performed. When a failure occurs at one point in N4-R1 shown in FIG. 26(b), the failure position looked from Sec-1 is between N4 and R1 (between the right hand of Sec-1 and the left hand of Sec-2), so that communication over N1 (protection line) between Sec-1 and Pri-1 is stopped.

A reason of this is that it is necessary to restore a working line when, for example, Sec-1 and the opposite node facing each other with the failure position therebetween communicate with each other over that working line. At the time of an RIP control thereon, Sec-1 operates to stop "add" and insert AIS to "drop". Incidentally, AIS is known, description of which is thus omitted. A pattern shown in FIG. 26(c) is exceptional, corresponding to the above basic operation (2-γ).

In this example, the protection lines on the both sides are failed, so that other working lines cannot be restored by loop-back. Communication using the protection line is continued by accessing in the opposite direction.

Figure 27A:
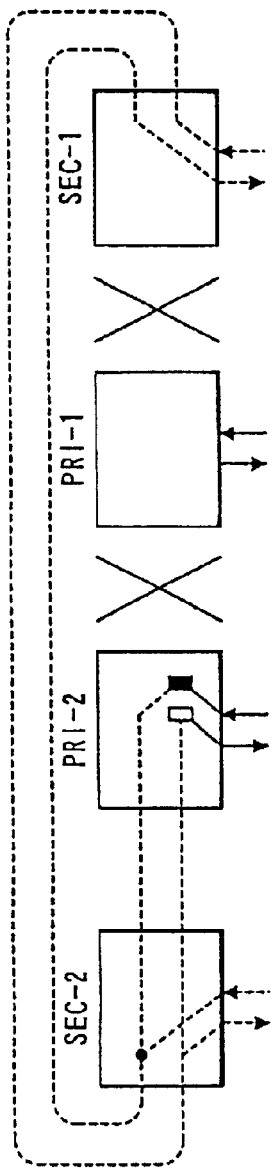
FIGS. 27(a) through 27(c) are diagrams showing failure operation patterns in DCP-DCP according to the second embodiment of this invention.

A pattern shown in FIG. 27(a) shows an example where failures occur in the working line including the primary node. In this case, the above basic operation (2-α) is performed. This pattern is that failures occur in N1-R4 (between the left hand of Sec-1 and the right hand of Pri-1) and in N2-R3 (between the left hand of Pri-1 and the right hand of Pri-2) when looked from Sec-1.

Incidentally, a black dot represents a service selector SS, a black rectangle a ring bridge, and a white rectangle a ring switch. These symbols are common in other drawings.

In this case, Sec-1 drops an optical signal in the opposite direction. Sec-2 drops an optical signal received over R1 (protection line) in the opposite direction, while continuing it on R2 (protection line). Pri-2 ring-switches the optical signal received over R2 (protection line) in the opposite direction to drop it.

Pri-2 ring-bridges optical signals added to Sec-1 and Pri-2 to transfer them over N3 (protection line). Sec-2 service-selects an optical signal received over N3 and an optical signal added thereto in the opposite direction to transfer the optical signals over N4 (protection line).

Even when failures occur, optical signals are added or dropped in the opposite direction over the protection line at Sec-1, whereby the failures are avoided.

Figure 27B:
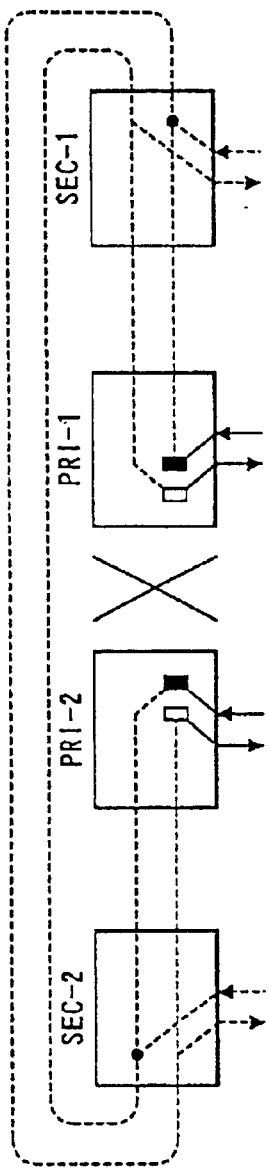

A pattern shown in FIG. 27(b) is that a failure occurs in the protection line not including the primary node, corresponding to a case where the failure position looked from Sec-1 is only in N2-R3. In this case, Sec-2 and Pri-1 perform the above basic operation (2-γ).

Figure 27C:
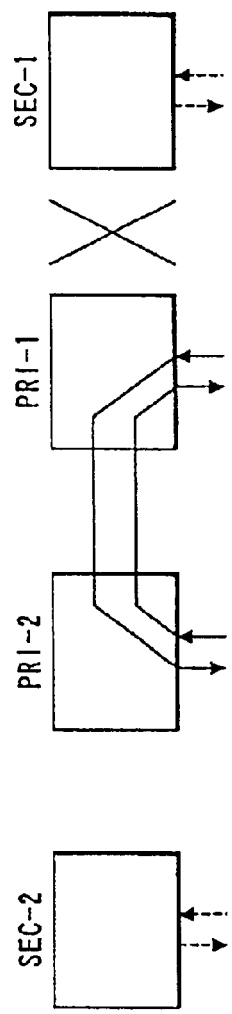

A pattern shown in FIG. 27(c) is that a failure occurs in the protection line. In this case, the same operation as above is performed; description of which is omitted in order to avoid duplication.

With respect to an optical signal added to Sec-1 and an optical signal added to Pri-1, Pri-1 ring-bridges the added optical signal to transfer it over R4 (protection line), and Sec-1 service-selects the optical signal received over R4 and the optical signal to be added in the opposite direction, and transfers the selected optical signal over R1. With respect to optical signals to be dropped from Sec-1 and Pri-1, the optical signal is dropped from Sec-1, at the same time, continued at Sec-1. After that, the optical signal is ring-switched at Pri-1, and dropped therefrom.

As above, optical signals are added and dropped in the opposite direction at Sec-1, while optical signals received over the protection line by Pri-1 are subjected to the service-selector control.

Meanwhile, the ring-bridge operation at a failure detecting node differs from line connection information in the normal BLSR. Namely, the ring-bridge operation at Pri-1 at the time of occurrence of failures in N3-R3 and N2-R3 (not shown) is performed by a failure detecting node (not shown) adjacent to the Pri-1 node. In other words, the failure detecting node ring-bridges although the node is not Pri-1 interconnected to another ring.

If there are plural connection modes in one ring, it is possible to reduce the modes to the above states by grouping patterns at each node. The above operations are performed for each type, whereby the line restoration control is carried out.

Figure 28:
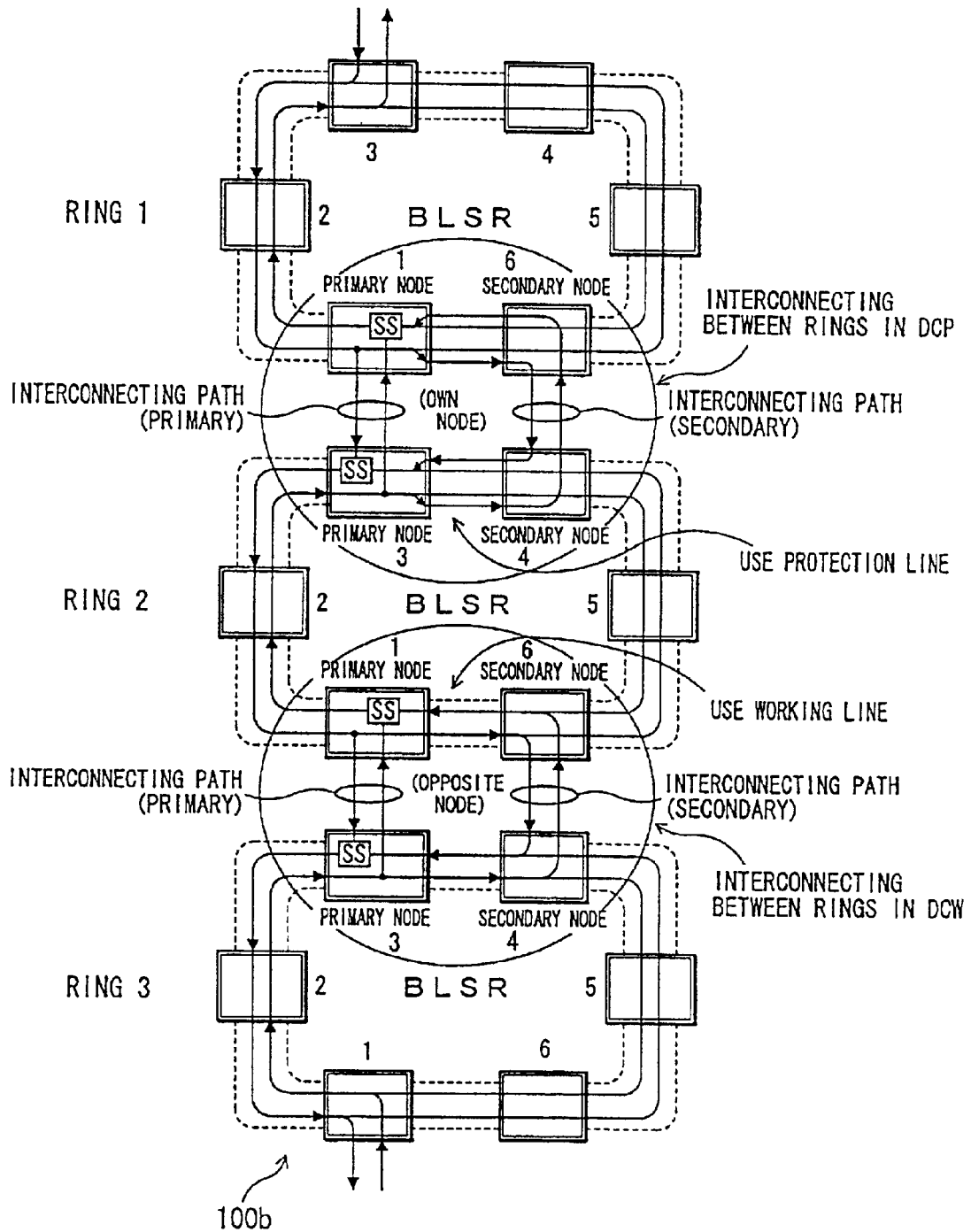
FIG. 28 is a diagram showing a structure of a ring transmission system according to the second embodiment of this invention.
Figure 29A:
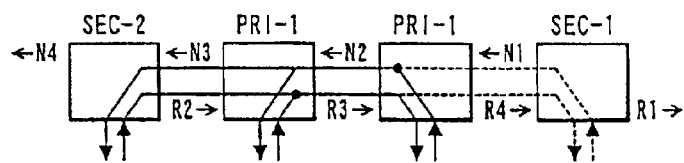
FIGS. 29(a) through 29(e) are diagrams showing failure operation patterns in DCP-DCW according to the second embodiment of this invention.
Figure 29B:
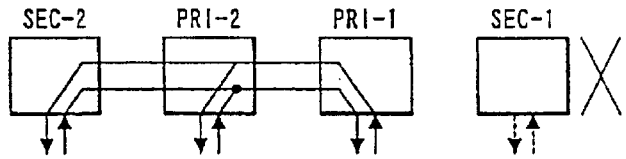
Figure 29C:
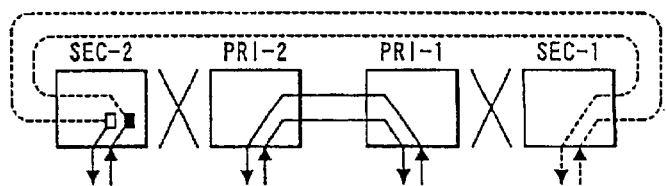
Figure 29D:
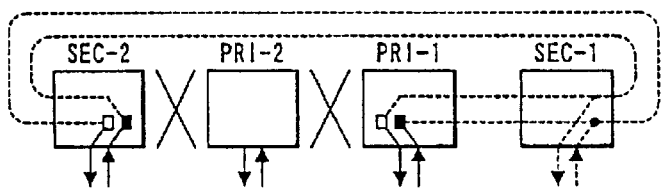
Figure 29E:
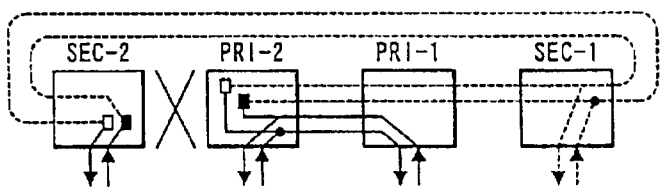
Figure 30A:
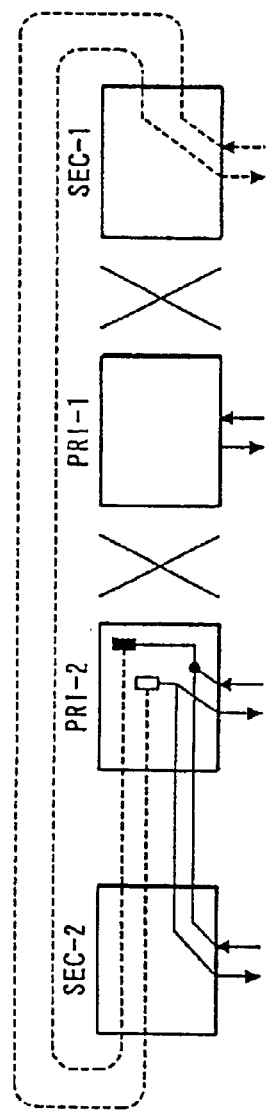
FIGS. 30(a) through 30(c) are diagrams showing failure operation patterns in DCP-DCW according to the second embodiment of this invention.
Figure 30B:
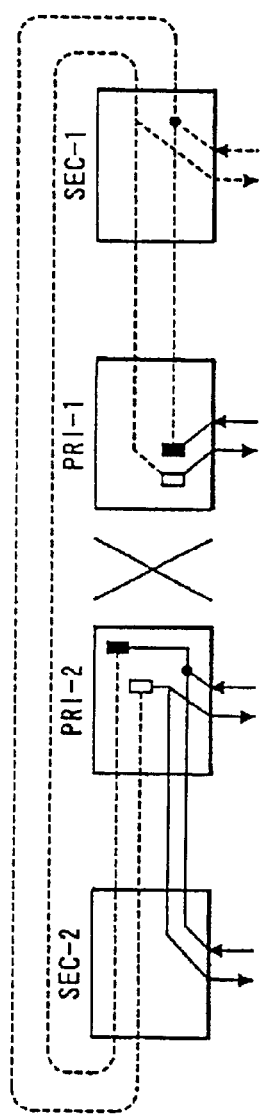
Figure 30C:
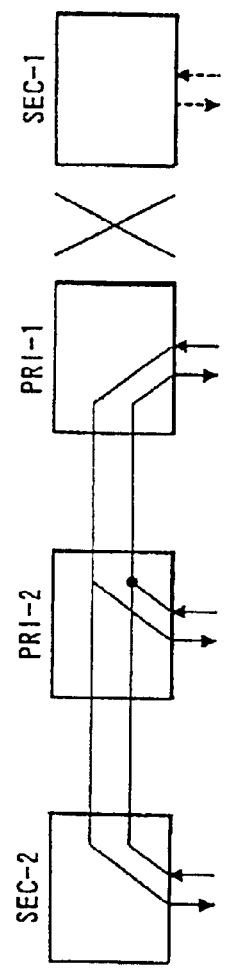
Figure 32A:
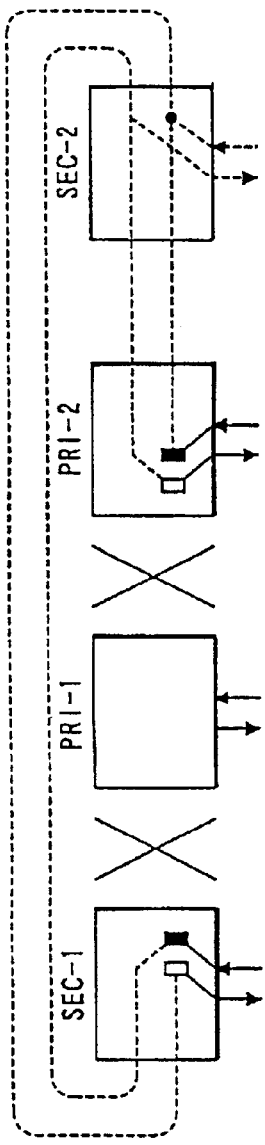
FIGS. 32(a) through 32(c) are diagrams showing failure operation patterns in DCW-DCP according to the second embodiment of this invention.
Figure 32B:
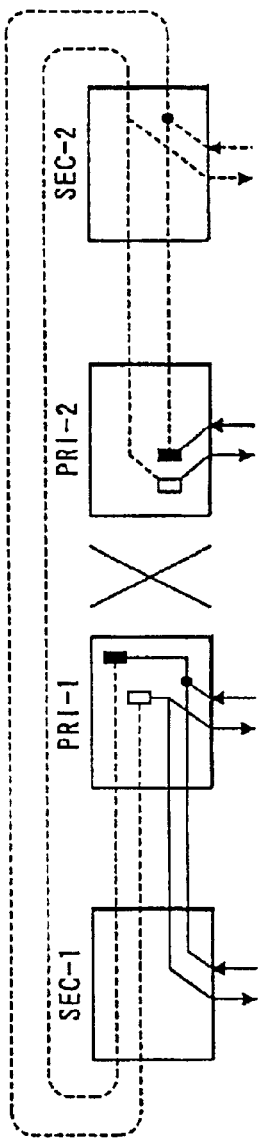
Figure 32C:
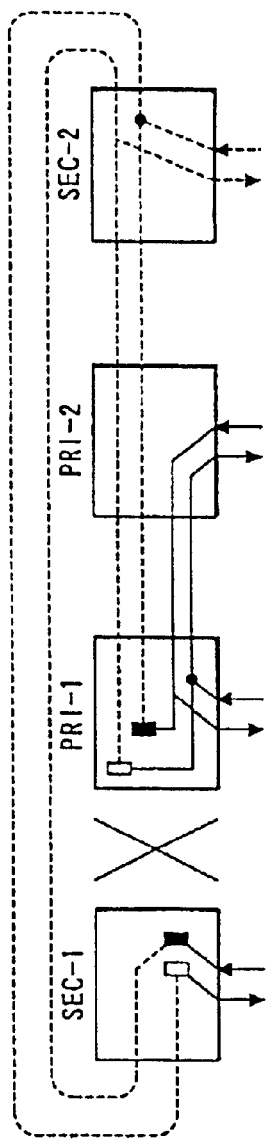

Next, failure operation patterns in DCP-DCW (normal BLSR) will be described. FIG. 28 is a diagram showing a structure of a ring transmission system according to the second embodiment of this invention. A ring transmission system 100b shown in FIG. 28 is in the DCP-DCW structure. FIGS. 29(a) through 29(e) and FIG. 30(a) through 30(c) are diagrams showing failure operation patterns in DCP-DCW according to the second embodiment of this invention. Hereinafter, the failure operation pattern will be referred to merely a pattern, occasionally.

Types of operations of Sec-1, types of operations of Pri-1, and methods of restoration with respect thereto are similar to those at the time of grouping in the above DCP-DCP (normal BLSR). Namely, although a line restoration connection mode as an whole BLSR ring is different depending on information on which the working line or the protection line is used at each of a failure position and the opposite node, Sec-1 and Pri-1 both perform line restoration control operations similar to those at the time of collection in DCP-DCP.

Next, failure operation patterns in DCW-DCP (normal BLSR) will be described. FIGS. 31(a) through 31(h) and FIGS. 32(a) through 32(c) are diagrams showing failure operation patterns in DCW-DCP according to the second embodiment of this invention.

Types of operations of Sec-1, types of operations of Pri-1, and methods of restoration with respect thereto are similar to those at the time of grouping in the above DCP-DCP (normal BLSR). Namely, although a line restoration connection mode as an whole BLSR ring is different depending on information on which the working line or the protection line is used at a failure position and the opposite node, Sec-1 and Pri-1 both perform line restoration control operations similar to those at the time of grouping in DCP-DCP.

Figure 33:
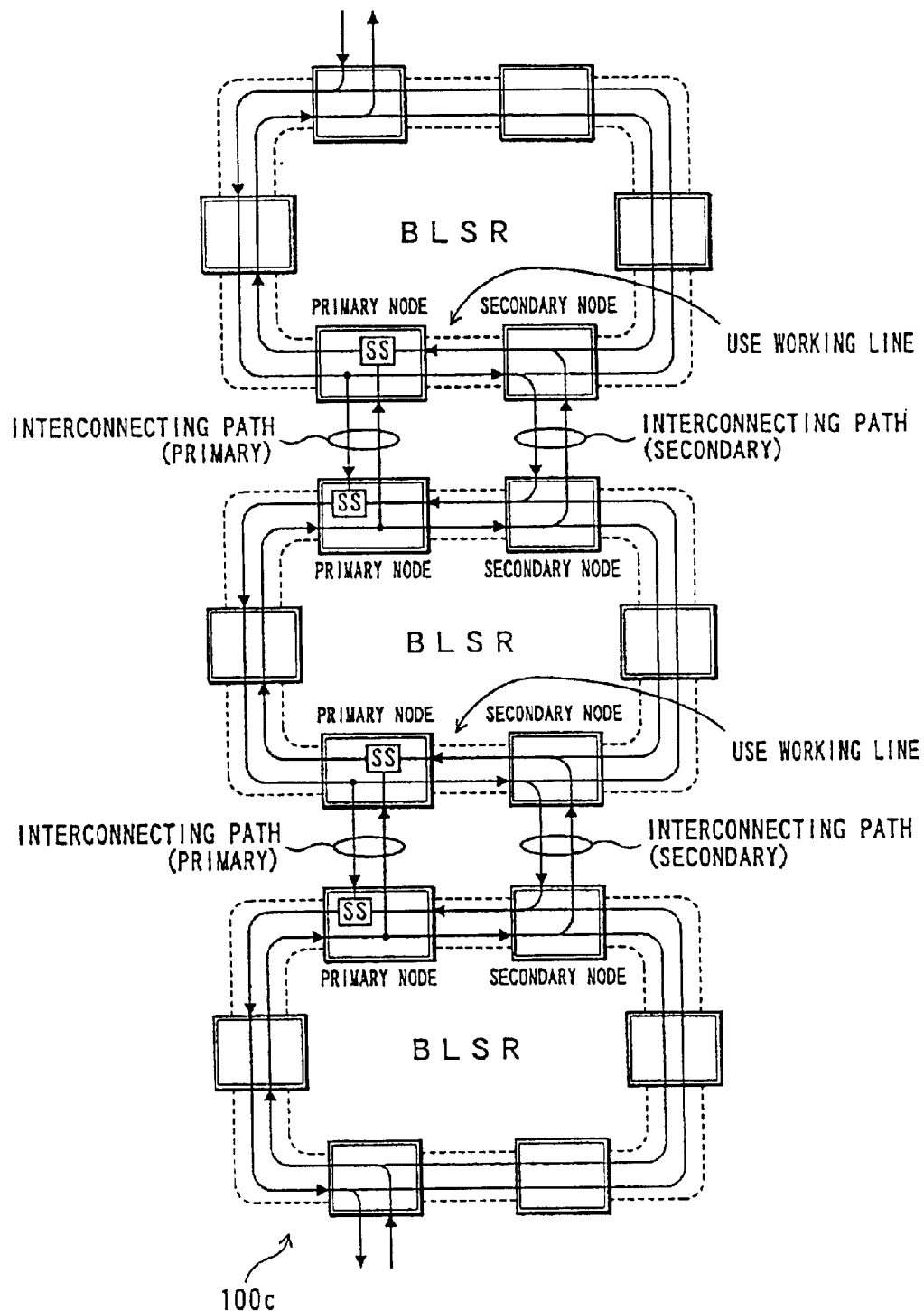
FIG. 33 is a diagram showing a structure of a ring transmission system according to the second embodiment of this invention.

Next, failure operation patterns in DCW-DCW (normal BLSR) will be described. FIG. 33 is a diagram showing a structure of a ring transmission system according to the second embodiment of this invention. A ring transmission system 10c shown in FIG. 33 is in a DCW-DCW (double-sided DCW) structure.

FIGS. 34(a) through 34(h) and FIGS. 35(a) through 35(c) are diagrams showing failure operation patterns in DCW-DCW according to the second embodiment of this invention.

Each of Sec-1 and Pri-1 performs any one of the above line restoration control operations at the time of grouping in DCP-DCP (normal BLSR) as a restoration method, as well. Incidentally, a line restoration connection mode as a whole BLSR ring is different depending on information on which the working line or the protection line at a failure position and the opposite node is used.

Next, failure operation patterns among three nodes will be described with reference to FIGS. 36 through 39.

Figure 37A:
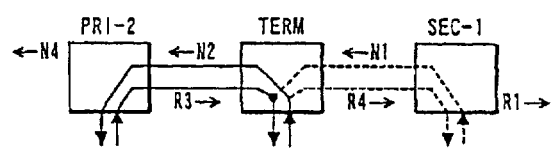
FIGS. 37(a) through 37(e) are diagrams showing operation patterns in DTP according to the second embodiment of this invention.

FIG. 36 is a diagram showing a structure of a ring transmission system according to the second embodiment of this invention. A ring transmission system 100d shown in FIG. 36 is in a DTP structure. FIGS. 37(a) through 37(e) are diagrams showing operation patterns in DTP according to the second embodiment of this invention. FIG. 37(a) shows a normal operation. FIGS. 37(b) through 37(e) show failure operation patterns.

An optical signal added to Sec-1 shown in FIG. 37(a) reaches Term (terminal node) over N1 (protection line). At Term, the optical signal on N1 and an optical signal from Pri-2 are path-selected, and dropped. An optical signal added to Term is connected to Pri-2 over the working line, and connected to Sec-1 over the protection line.

Figure 37B:
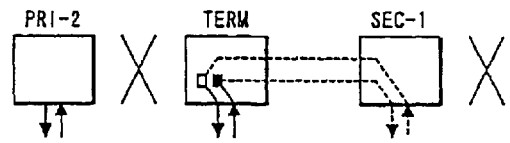

FIG. 37(b) shows a case where failures occur in the working line including the primary node. In concrete, failure positions looked from Sec-1 and Term are in N2-R1. A control shown in FIG. 37(b) corresponds to the above basic operation (2-α).

Figure 37C:
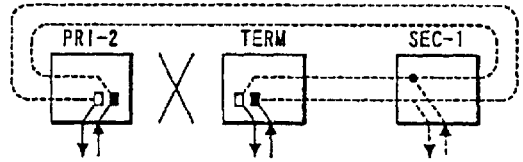

FIG. 37(c) shows a case where a failure position looked from Sec-1 and Term is in N2-R3. This pattern is a working line failure not including the primary node, corresponding to the above basic operation (2-γ).

Figure 37D:
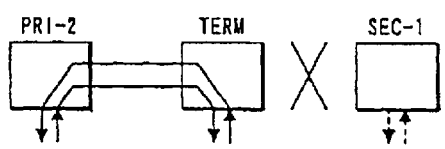

A pattern shown in FIG. 37(d) is a case where a failure position looked from Sec-1 and Term is in N1-R4. This pattern corresponds to a case where a failure occurs in the protection line, corresponding to the above basic operation (1).

Figure 37E:
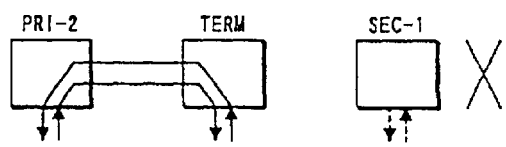

A pattern shown in FIG. 37(e) is a case where a failure position looked from Sec-1 and Term is in N4-R1. This pattern corresponds to a case where a failure occurs in another span, corresponding to the above basic operation (1).

Figure 38:
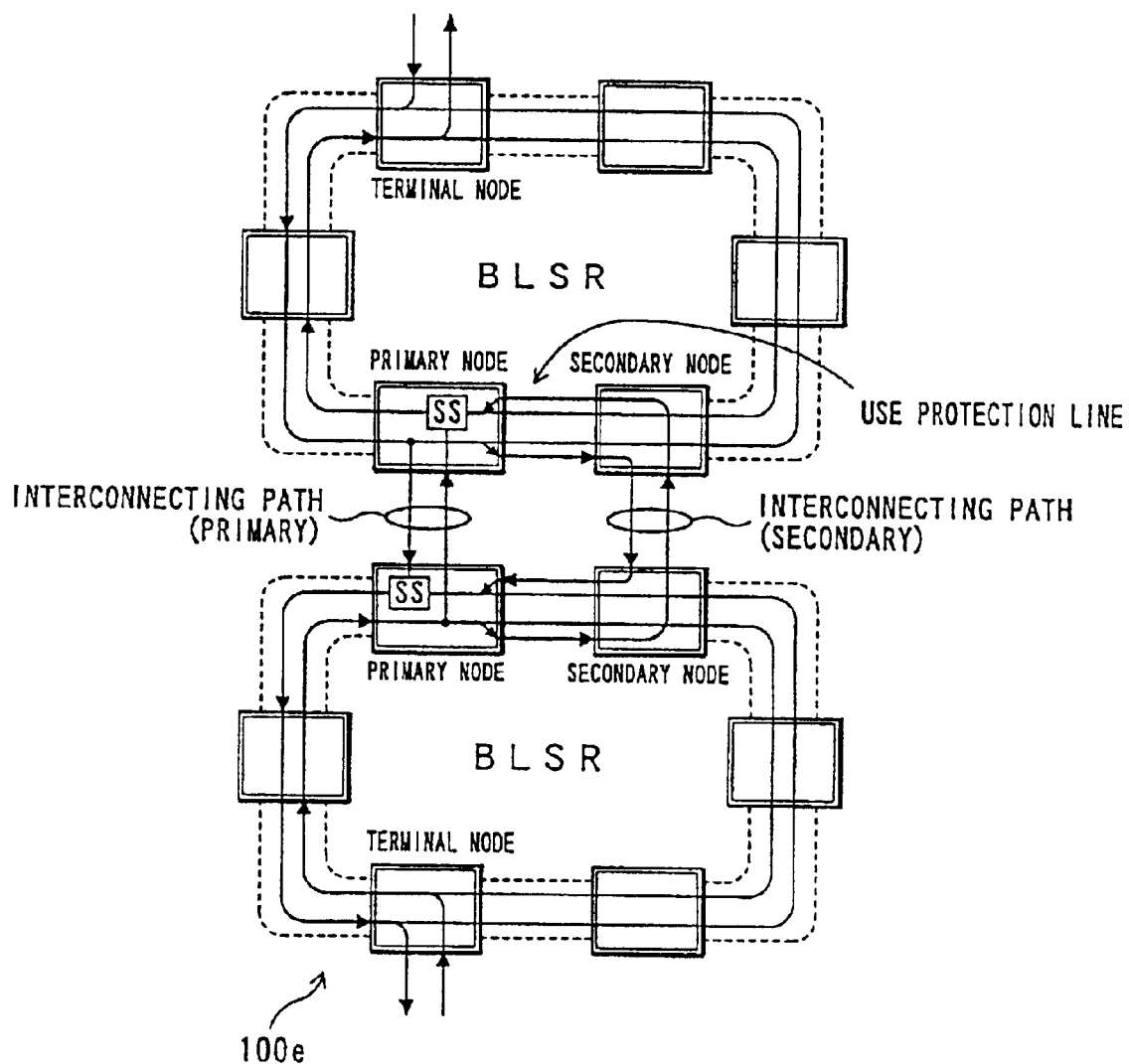
FIG. 38 is a diagram showing a structure of a ring transmission system according to the second embodiment of this invention.

FIG. 38 is a diagram showing a structure of a ring transmission system according to the second embodiment of this invention. A ring transmission system 10e shown in FIG. 38 is in a single-sided DCP structure.

FIGS. 39(a) through 39(e) show operation patterns in a single-sided DCP according to the second embodiment of this invention, in which failure operations among three nodes, Pri-2, pri-1, and Sec-1, are shown.

Figure 39A:
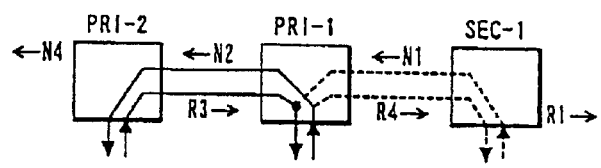
FIGS. 39(a) through 39(e) are diagrams showing failure operation patterns in single-sided DCP according to the second embodiment of this invention.
Figure 39B:
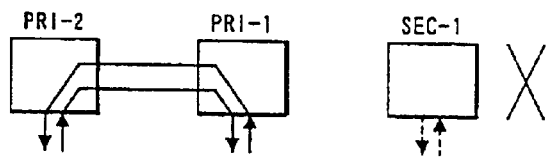
Figure 39C:
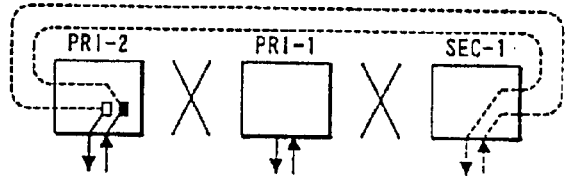
Figure 39D:
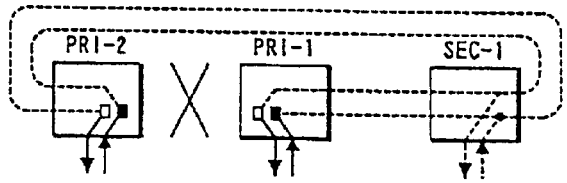
Figure 39E:
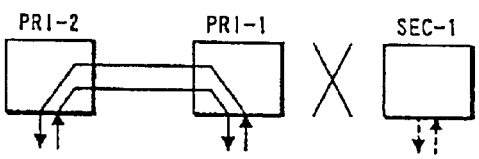

A pattern shown in FIG. 39(a) is a normal operation, corresponding to a operation performed when there is no failure. A pattern shown in FIG. 39(b) shows a case where a failure occurs in a span through which no optical signal is transmitted. A pattern shown FIG. 39(c) shows a case where failures occur in the working line including the primary node, corresponding to the above basic operation (2-α). A pattern shown in FIG. 39(d) shows a case where a failure occurs in the working line not including the primary node, corresponding to the above basic operation (2-γ). A pattern shown in FIG. 39(e) shows a case where a failure occurs in the protection line, corresponding to the above basic operation (1).

Each node can perform an appropriate operation according to each pattern, which allows appropriate optical signal transmission.

An optical transmitting method for a ring transmission system according to this invention for use in a transmission ring (a ring transmission system 100a, 100b, . . . or 10e) in which a plurality of optical transmitting apparatuses (nodes) are connected to one another over a bidirectional ring transmission path, wherein the connection mode recognizing section 100a (refer to FIG. 18) recognizes a connection mode between a transmission ring and another transmission ring connected to the former transmission ring (connection mode recognizing step). The failed span detecting section 110b detects a span in which a failure occurs on the basis of the recognized connection mode (failed span section detecting step).

The loop-back switching control section 110c switches the transmission path on the basis of the recognized connection mode and the detected span in order to minimize a loop-back distance of the optical signal in the transmission ring (loop-back switching controlling step).

In normal operation, a unique address number (node ID) is assigned to each node of the transmission ring (ring transmission system 100a, 100b, . . . or 100e), and each node creates a line information table. When a failure occurs, APS information is notified. The failed span detecting section 110b of each node detects a failed span on the basis of data set in the line information table, thereby smoothly operating and restoring the network such that the optical signal passes through the shortest route.

In an optical transmitting apparatus for a ring transmission system according to this invention, setting of line connection information in the normal operation will be described with reference to FIGS. 40 through 46. Setting of line connection information at the time of failure occurrence will be described with reference to FIGS. 47 and 48.

Figure 40:
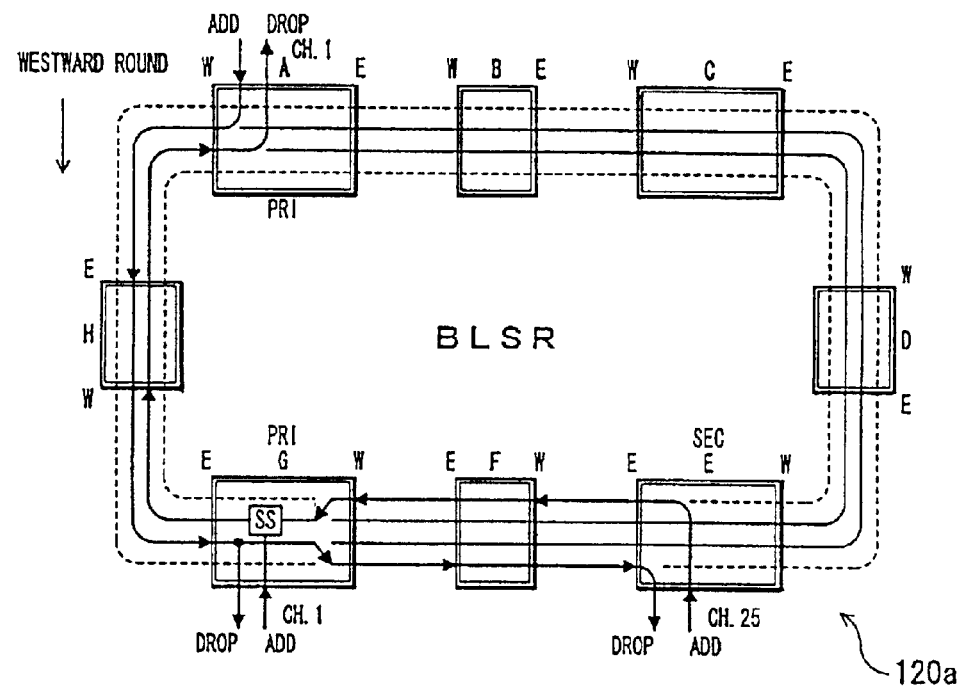
FIG. 40 is a diagram showing an example of line connection information in single-sided DCP according to the second embodiment of this invention.

FIG. 40 is a diagram showing an example of line connection information at the time of a single-sided DCP according to the second embodiment of this invention. A ring 120a shown in FIG. 40 is configured with nodes A, B, C, D, E, F. G, and H, in which channel 1 (representing a working line; a protection line being channel 25) is added/dropped to/from nodes A, G, and E.

The nodes G and E are on a redundant path in the network, which have a relation as a primary node and a secondary node. The nodes G and E are connected over a protection line. An opposite node of the node G and E is the node A, whereas opposite nodes of the node A is the nodes G and E.

Accordingly, there is no secondary node that is a redundant path on the node A's side, so that the ring is in single-sided DCP. Namely, only the nodes G and E on one side perform "drop and continue" over the protection line.

Incidentally, the node A is not a redundant path, so that no secondary node that makes a pair with the node A exists. Therefore, expression such as a primary node or a secondary node is not general. However, in order to be able to add or drop using the similar line connection table in any network structure, when there is no redundant path (that is, it is a general terminal node), a node ID of a terminal node is assigned to node IDs of the primary node and the secondary node.

A positional relation among the node IDs shown in the drawing is similar to that in the above table. Further, unique node IDs should be originally expressed in numeral characters in the line connection table, but they are here expressed in alphabetic characters for the sake of explanation.

In the connection modes shown in FIGS. 40 through 48, a primary node and a secondary node are set on each of the eastward round and westward round on the adding/dropping side, besides a network structure is set.

With respect to an optical signal added on the westward round to the node A, G and E are set in the upper right column of the line connection table. With respect to the node A, DC-WK is set in a column of east end of the network structure (ring interconnection structure).

Absolute node IDs configured using ring topology are converted into relative node IDs, and APS information is transmitted from a node adjacent to a node in which a failure occurs. Each node can thereby perform a squelch control and a line switching by 1L simply comparing the magnitudes thereof.

Figure 41:
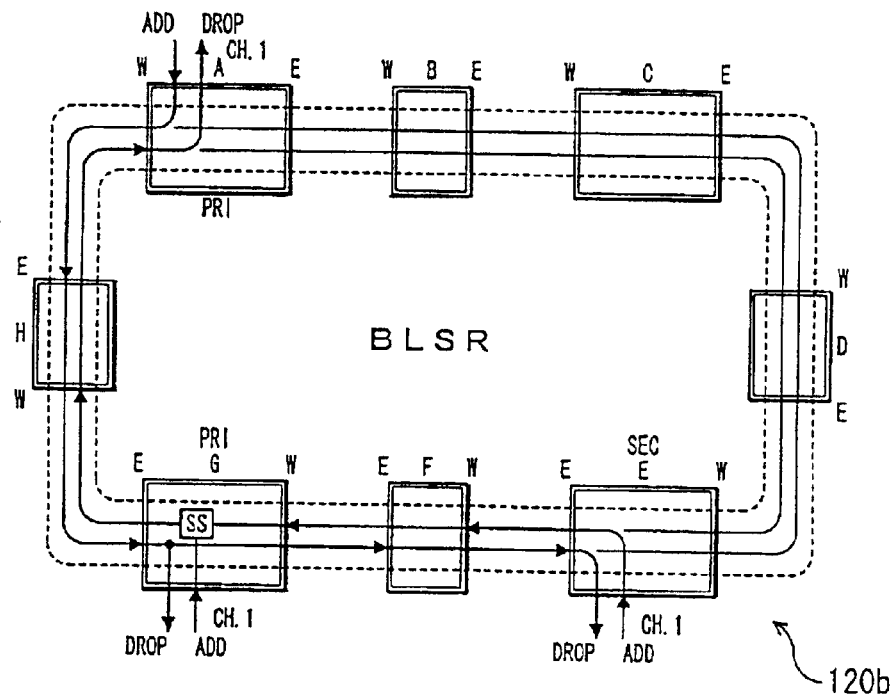
FIG. 41 is a diagram showing an example of line connection information in single-sided DCW according to the second embodiment of this invention.

FIG. 41 is a diagram showing an example of line connection information at the time of a single-sided DCW according to the second embodiment of this invention. A ring 120b shown in FIG. 41 is set in the similar manner to the setting shown in FIG. 40.

When a primary node and a secondary node do not exist as this, it is possible to appropriately select a path to restore optical signals even in not only a ring of four nodes but also a ring of three nodes or a ring of two nodes (one-to-one communication) as long as a node ID of the terminal node is indicated.

Figure 42:
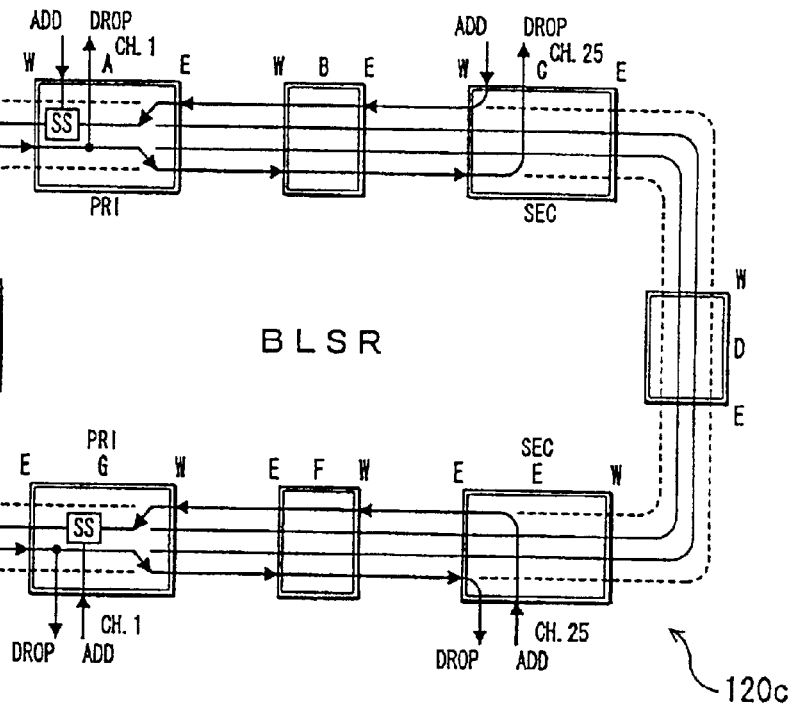
FIG. 42 is a diagram showing an example of line connection information in DCP-DCP according to the second embodiment of this invention.

FIG. 42 is a diagram showing an example of line connection information at the time of DCP-DCP according to the second embodiment of this invention. A ring 120c shown in FIG. 42 comprises nodes A to H, in which channel 1 (protection line is channel 25) is added/dropped at the nodes A, C, E, and G. When looked from the nodes A and C, the nodes G and E are opposite nodes. In contrast, when looked from the nodes G and E, the nodes A and C are opposite nodes. As a result, the network structure is the double-sided DCP (DCP-DCP).

The nodes A and C shown in FIG. 42 are on a redundant path, having a relation as a primary node and a secondary node. The nodes A and C are connected over the protection line. Similarly, the nodes G and E are on a redundant path, having a relation as a primary node and a secondary node. The nodes G and E are connected over the protection line.

The line connection table in the double-sided DCP is created on the basis of paths of optical signals. Namely, an optical signal added to the node C reaches the node A after passing through the node B, and selected by a service selector SS at the node A. The optical signal selected at the node A reaches the node G via the node H. One of the optical signals is dropped from the node G, the other is continued, and dropped from the node E via the node F.

When tracking the optical signal, it is found that the nodes A and C correspond to the eastern end of the ring structure, whereas the nodes G and E correspond to the western end. Therefore, the node C is the secondary node at the eastern end, and the node A is the primary node at the eastern end. Further, the nodes G and E correspond to the western end, so that the primary node at the western end is the node G, whereas the secondary node at the western end is the node E.

Accordingly, S-E, P-E, P-W, and S-W are set in the columns of the add node and the drop node in the line connection table. That DCP is a connection node at the eastern end and the western end is beforehand given as network structure information to the hardware.

Similarly, an optical signal added to the node E is selected by a service selector SS at the node G, transmitted to the opposite node's side, and dropped and continued at the node A. A path of the optical signal to be dropped at the node C is similar; that the ring structure is DCP is beforehand set in the line connection table. Owing to this setting, the hardware can perform necessary operations.

Figure 43:
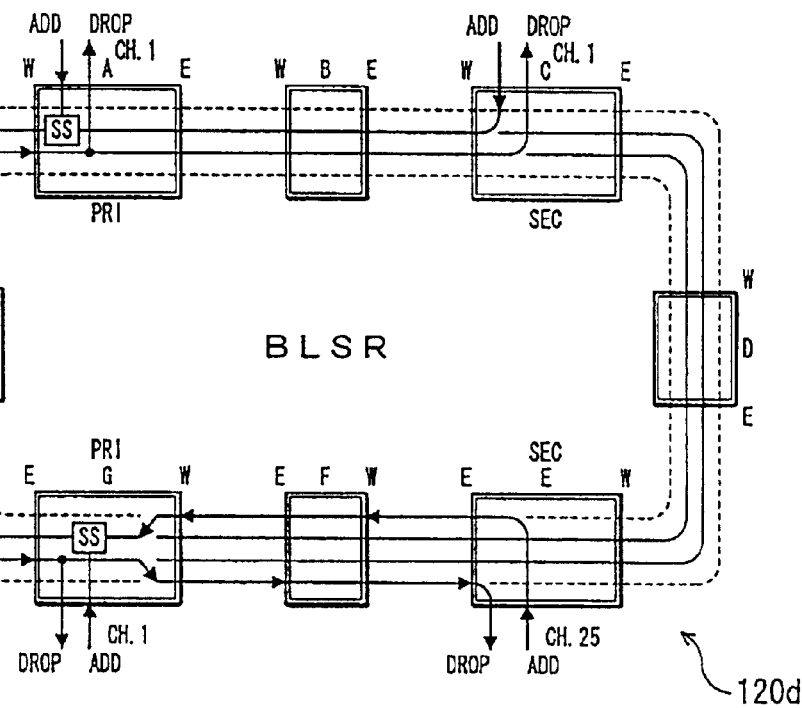
FIG. 43 is a diagram showing an example of line connection information in DCP-DCW according to the second embodiment of this invention.
Figure 44:
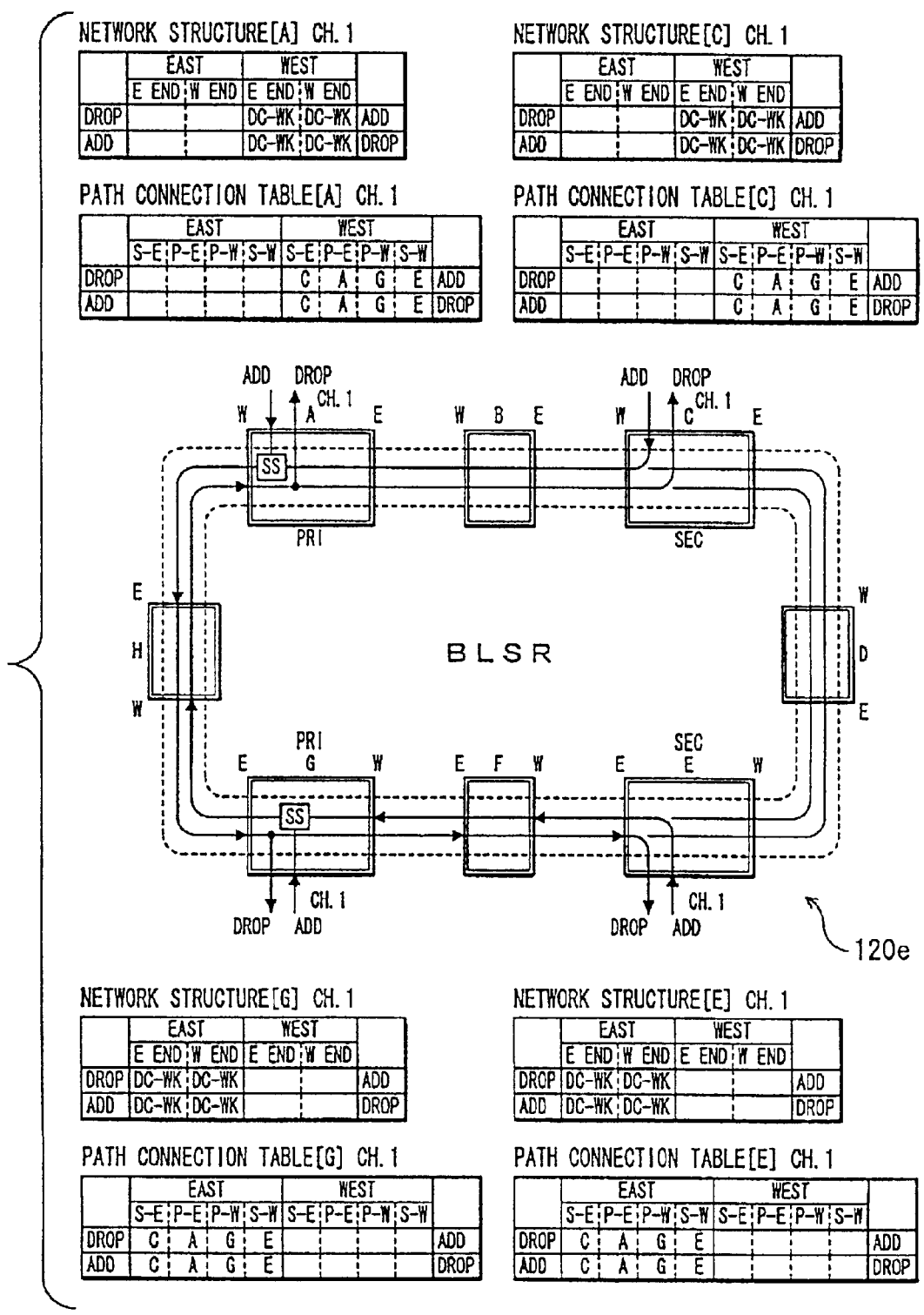
FIG. 44 is a diagram showing an example of line connection information in DCW-DCW according to the second embodiment of this invention.
Figure 45:
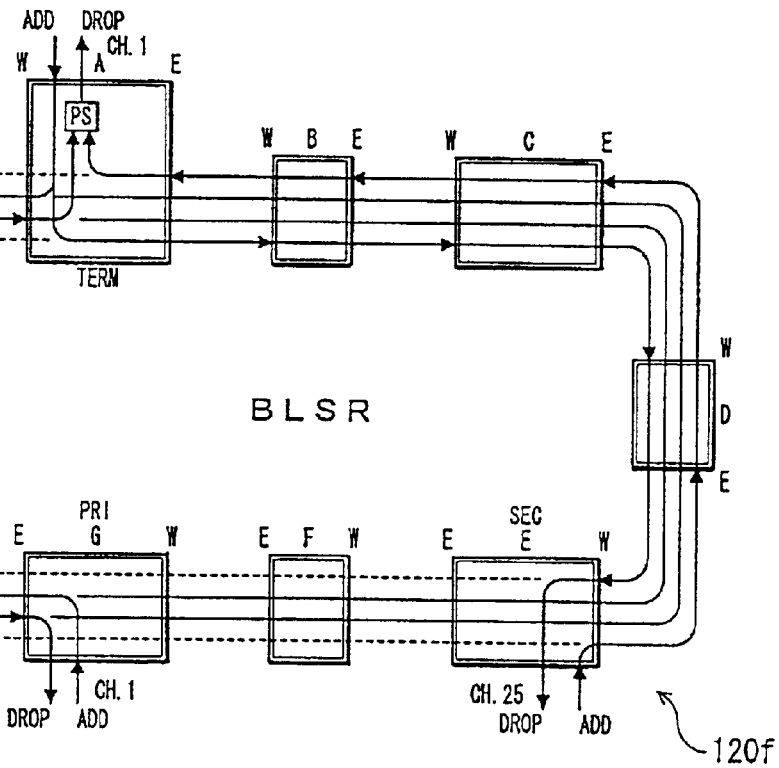
FIG. 45 is a diagram showing an example of line connection information in DTP according to the second embodiment of this invention.
Figure 46:
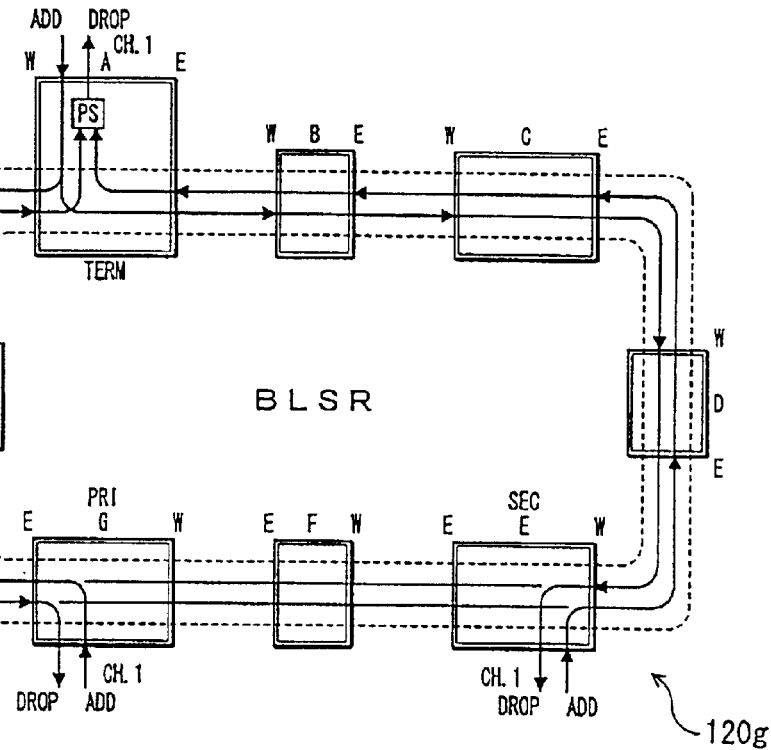
FIG. 46 is a diagram showing an example of line connection information in DTW according to the second embodiment of this invention.

FIG. 43 is a diagram showing an example of line connection information at the time of DCP-DCW according to the second embodiment of this invention. FIG. 44 is a diagram showing an example of line connection information at the time of DCW-DCW according to the second embodiment of this invention. FIG. 45 is a diagram showing an example of line connection information at the time of DTP according to the second embodiment of this invention. FIG. 46 is a diagram showing an example of line connection information at the time of DTW according to the second embodiment of this invention.

On a ring 120d shown in FIG. 43, a ring 120e shown in FIG. 44, a ring 120f shown in FIG. 45, and a ring 120g shown in FIG. 46, the similar controls are performed, and respective line connection tables, and network structure tables are created.

Next, cases where failures occur will be described with reference to FIGS. 47 and 48.

Figure 47:
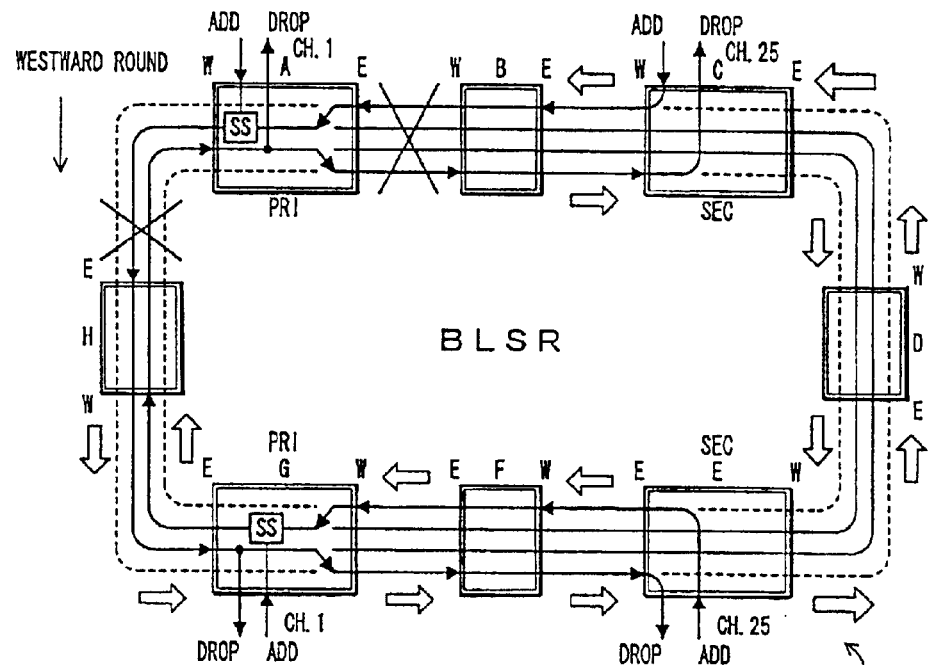
FIG. 47 is a diagram for illustrating a first operation performed when failures occur according to the second embodiment of this invention.

FIG. 47 is a diagram illustrating a first operation at the time of occurrence of failures according to the second embodiment of this invention. A ring 140a shown in FIG. 47 is in DCP-DCP connection. When failures occur between a node A and a node B, and between the node A and a node H in the ring 140a, each of failure detecting nodes (nodes adjacent to failure positions) transfers node ID information of the failure detecting node to each node in the same ring under the APS control to notify the other nodes of the failure detecting node.

Here, as a node adjacent to the failure position, there are inevitably two nodes (say, the nodes A and H). Therefore, each node receives information (node IDs, for example) on two failure detecting nodes.

A reason of this is that even when failures occur in two or more positions, each node receives information from two nodes, and each node having received the failure information can know adjacent nodes of the failure positions.

Each node determines whether or not transmission of the optical signal is to be continued or the optical signal is to be looped-back at itself on the basis of the line connection information given beforehand. If it is determined to loop-back the optical signal at the add/drop node, the optical signal will be restored for the shortest distance.

In FIG. 47, the node A receives an optical signal in the east direction and an optical signal in the west direction. The node A writes information in only a column of the west direction since the node A does not add/drop the optical signal in the east direction.

In a column of the east end of the west direction, there are written a connection structure of an add node on its own node's side and a connection structure of a drop node on its own node's side. From these, it is found that the add node (node C) on its own node's side is in DCP. Namely, connection structures of a pair including itself (add node and drop node) are written. On the other hand, in a column of the west end, there are written a connection structure of an add node on the opposite node's side and a connection structure of a drop node on the opposite node's side. From these, it is found that the drop node (node E) on the opposite node's side is in DCP.

Similarly to the network structure table, optical signals in only the west direction are written in the line connection table. The column of the west direction is divided into eight. In the upper left column and the upper right column of four columns on the left side among the eight columns, a pair of nodes to which the add nodes on its own node's side belong (that is, the secondary node and the primary node on the opposite side, each of which is an add node) are written. In the lower left column and the lower right column, a pair of nodes to which the drop nodes on its own node's side belong (the secondary node and the primary node on its own station's side, each of which is a drop node) are written.

In the upper left column and the upper right column of four columns on the right side among the eight columns in the west direction columns, a pair of nodes (both of which are drop nodes) to which the drop nodes on the opposite node's side belong are written. For example, a pair (node G and node E) to which the drop nodes (node E) on the opposite node's side are written. In the lower left column and the lower right column, a pair of nodes (both of which are add nodes) to which the add nodes on the opposite node's side belong are written.

The node G receives failure information from the node H at the eastern end. The node G also receives failure information from the node B at the western end on the opposite side. The node G refers to the line connection table and the network structure (ring map) to find that the optical signal cannot reach the primary node of the opposite nodes in the east direction, and can reach the secondary node of the opposite nodes in the west direction but cannot reach the primary node.

With respect to an optical signal to be dropped, the node G finds that the optical signal on the eastward round does not arrive from the opposite node even if the node G tries to drop the optical signal. However, if the node G loops back the optical signal on the westward round and drops it, it is possible to communicate with the secondary node of the opposite nodes.

As above, the node G finds that even if the node G keeps adding the optical signal in the east direction, the optical signal cannot reach the opposite node. However, if the node G loops back the optical signal at itself (node G), the opposite signal can reach the secondary node of the opposite nodes.

As a result, a path for restoration is established, so that optical signal transmission is feasible for the shortest distance. Further, an ID of the farthest reachable node is transmitted from the adjacent node of the failure position. Each node compares the farthest reachable node with the RIP table to find the failure position in the network. Each node thereby loops back the optical signal, or restores the optical signal by switching.

Next, setting in the double-sided DCP will be described with reference to FIG. 48.

Figure 48:
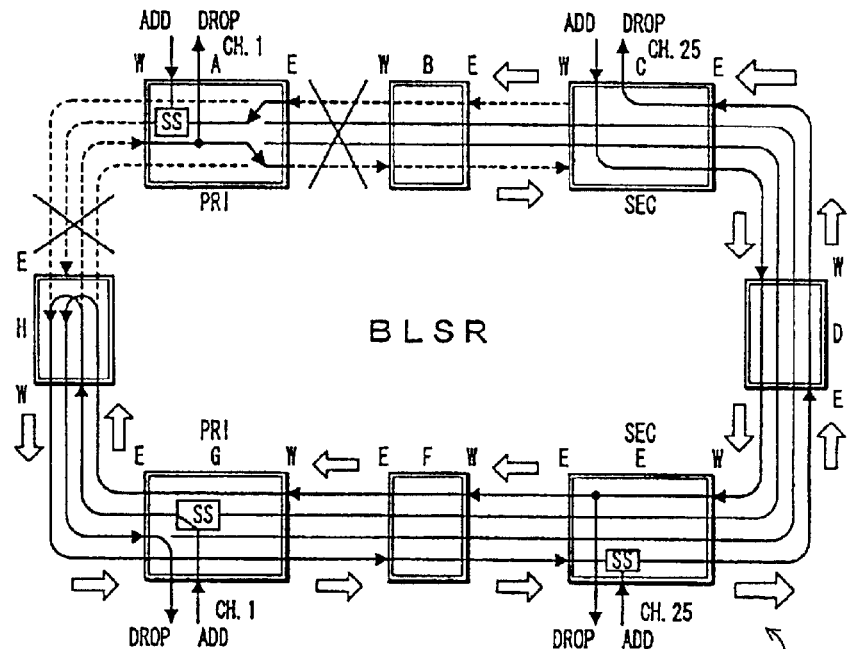
FIG. 48 is a diagram for illustrating a second operation when failures occur according to the second embodiment of this invention.

FIG. 48 is a diagram illustrating a second operation at the time of occurrence of failures according to the second embodiment of this invention. A ring 140*b* shown in FIG. 48 comprises nodes A to H. The nodes A and C make a pair, while the nodes G and E makes another pair. In a line connection table for channel 1 (ch1) at the node A, G and E are set in the upper right corner in the line connection table with respect to an added optical signal added on the westward round to the node A. In the network structure of the node A, DC-PT is set in a column of the eastern end therein. Similarly, the node G with respect to channel 1, the node C with respect to channel 25, and the node E with respect to channel 25 are set predetermined values in the respective tables, whereby each node can recognize that the ring is in the double-sided DCP.

When a first failure occurs between the nodes A and H and a second failure occurs between the nodes A and B, each node switches the line. An optical signal added to the node A is not transmitted in any direction. On the contrary, an optical signal added to the node C reaches the node E via the node D over the protection line, and one of the split optical signal is dropped from the node E, while the other is transmitted over the protection line to the node H via the nodes F and G. The optical signal is then looped-back at the node H, transmitted counterclockwise over the working line, and dropped from the node G.

An optical signal added to the node G is transmitted over the working line, looped back at the node H, transmitted in the opposite direction, and reaches the node E via the nodes G and F. At the node E, either one of that optical signal and another added optical signal is selected. The selected optical signal is transmitted over the protection line, passed through the node D, and dropped from the node C.

The same value is set to the primary node and the secondary node, whereby line connection tables and the like are set. Using the line connection tables that can be centrally managed, rings of four node, three nodes, or two nodes can be interconnected.

Accordingly, not only a connection mode such as the double-sided DCP but also line connection among three nodes (single-sided DCP-single-sided DCP) or line connection of two nodes (one-to-one communication) is possible.

As above, each node has a line connection setting table of add nodes and drop nodes on the working line to recognize which the opposite node transmits an optical signal over the working line or the protection line, thereby recognizing a connection mode between the rings.

In consequence, the optical signal can be looped back for the shortest distance at the terminal node owing to the RIP function and the loop-back function provided to each node, which prevents degradation of the optical signal.

Accordingly, the RIP tables and the control function of looping-back for the shortest distance can be centrally managed; the ring can be configured using nodes having the same specification. This allows the apparatus members to be versatile, and improves a reduction in cost.

Since the coefficient of line utilization and the line failure restoration rate are improved as above, high quality communications can be kept in a ring configured with not only four nodes but also three nodes or two nodes.

Particularly, even in a ring in the double-sided DCP, a control for interconnecting the rings (ring interconnection control) or the loop-back control become possible. In relation to a control on a congested network, more effective, high quality network restoration is possible.

Additionally, an absolute node ID generated using ring topology is converted into a relative node ID, and APS information is transmitted from a node adjacent to a node in which a failure occurs, so that each node can perform the squelch control and a line switching by simply comparing the magnitudes thereof.

(B1) Description of a First Modification of the Second Embodiment of the Invention According to this modification, the submarine BLSR will be described. As a basic operation of the submarine BLSR, when an optical signal accessing to the working line can reach the opposite node by accessing in the opposite direction, loop-back is performed.

When an optical signal can reach the opposite node by accessing in the opposite direction, the optical signal does not reach the opposite node by accessing in the forward direction without looped-back. To the contrary, when the optical node does not reach the opposite node by accessing in the opposite direction, the optical signal reaches the opposite direction by accessing in the forward direction, or the optical signal does not reach the opposite direction even if the optical signal is transmitted in any direction. Here, the opposite node is the same as above, signifying a terminal node terminating the working line or a primary node.

According to this modification, in order to accurately determine the above, a plurality of failure operation patterns are grouped, and a true failure position is specified when the failure position is specified, whereby a failure position such as N1-R4 or the like is accurately detected.

This method is that the loop-back control for the shortest distance in the RIP structure in the BLSR is performed. Each node performs one of plural grouped operations of a primary node or a secondary node on the basis of a difference in connection mode (single-sided DCP, single-sided DTP, single-sided DCW, single-sided DTW, DCP-DCP, DCP-DCW, or DCW-DCW) of the network.

What operation each node should perform depends on a network structure and which a failure occurs in N1-N4 or R1-R4. Basically, it is based on rules for restoration control shown in (3-1) to (3-4) below.

(3-1) When a failure occurs in the ring, an access using the protection line is suspended. This is why the protection line is used to restore the working line.

(3-2) Even when a failure occurs in the ring, the communication is continued in the present line connection setting.

(3-3) When it is determined that the line can be restored by accessing in the opposite direction, an access is made in the opposite direction.

(3-4) By forming a service selector SS in addition to an access in the opposite direction, either one having a better quality of an added optical signal and a through optical signal coming in from the opposite direction is selected.

FIGS. 49(a) through 49(d) and FIGS. 50(a) through 50(c) are diagrams for illustrating operations in a single-sided connection according to the first modification of the second embodiment of this invention. In FIGS. 49(a) through 49(d), a terminal node, a primary node, and a secondary node are shown along with a service selector in the primary node.

Figure 49A:
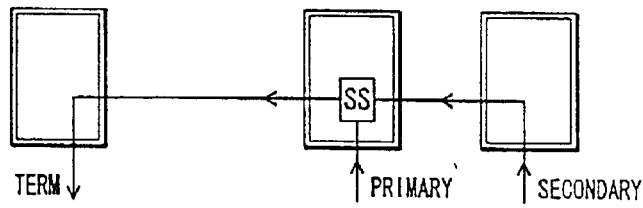
FIGS. 49(a) through 49(d) are diagrams for illustrating operations in a single-sided connection according to a first modification of the second embodiment of this invention.

FIG. 49(a) shows a pattern in a normal state, in which either one of an optical signal added to the primary node and an optical signal from the secondary node is selected by the service selector, and the selected optical signal is transmitted to the terminal node.

Figure 49B:
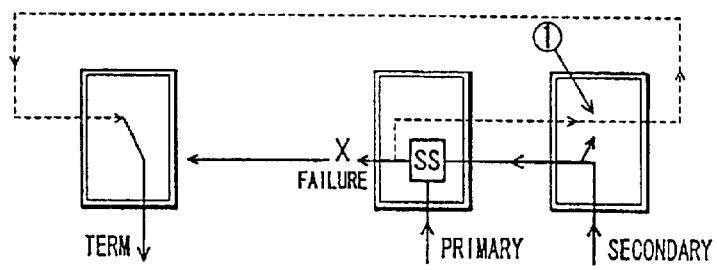

FIG. 49(b) shows a pattern in which a failure occurs on the left of the primary node. If the secondary node does not transmit an optical signal to the primary node but loops back the optical signal over a line denoted by ① shown in FIG. 49(b), the looped-back optical signal would be overwritten by an optical signal added to and looped-back at the primary node. For this, service-selection can not be carried out. In the case of the DCP connection, it is not restorable as well since a direction of the optical signal is opposite.

Figure 49C:
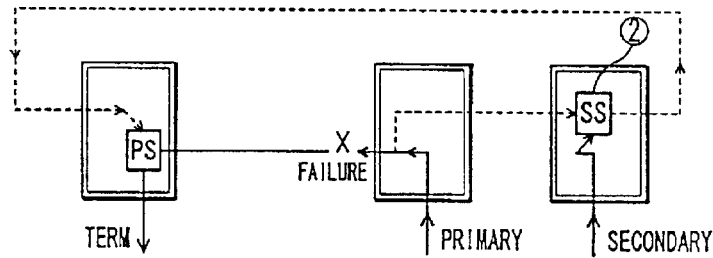

FIG. 49(c) shows a first pattern in such case, where a service selector SS (denoted by ②) is provided in the secondary node. Whereby, either one of an optical signal added to the primary node and transmitted to the secondary node and an optical signal added to the secondary node is selected by the service selector SS at the secondary node. Incidentally, the terminal node may fixedly switch.

Therefore, operations of the secondary node and the primary node shown in FIG. 49(c) are analogous to the operations thereof in the DCP connection.

Figure 49D:
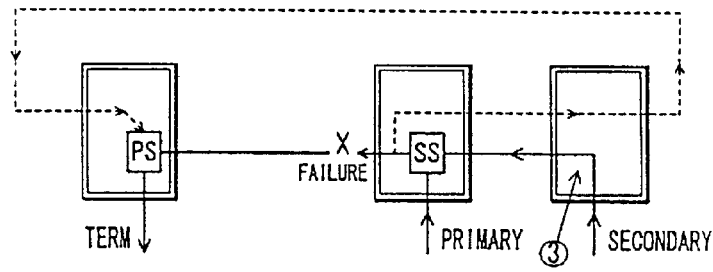

FIG. 49(d) shows a second pattern, where a service selector SS is not provided in the secondary node, but a service selector SS is provided in the primary node.

Whereby, the secondary node does not loop-back the optical signal (denoted by ③), but the primary node does. Incidentally, the terminal node may fixedly switch.

Figure 50A:
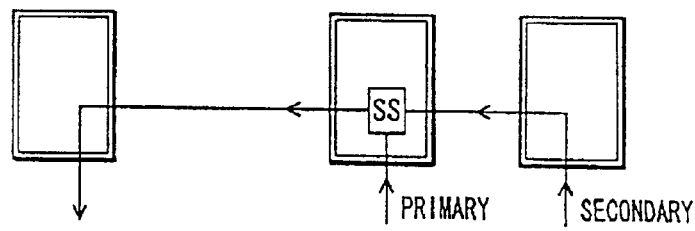
FIGS. 50(a) through 50(c) are diagrams for illustrating operations in a single-sided connection according to the first modification of the second embodiment of this invention.

FIG. 50(a) shows a pattern in a normal state, where either one of an optical signal added to a primary node and an optical signal added to a second node is selected by a service selector, and transmitted to a terminal node.

Figure 50B:
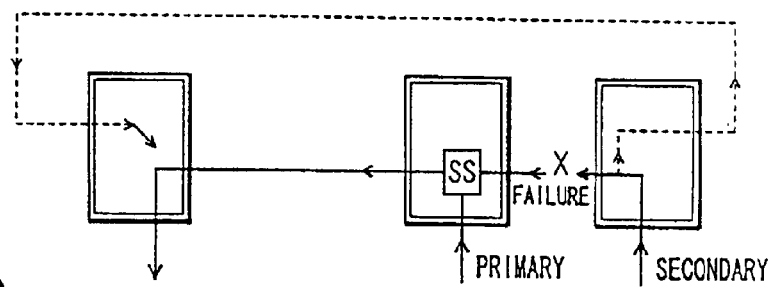

FIG. 50(b) shows a pattern in which a failure occurs between the primary node and the secondary node. When the optical signal is switched at the terminal node, an optical signal from the primary node is not selected.

Figure 50C:
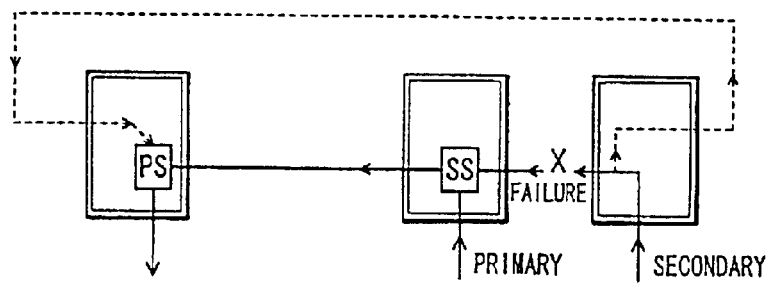

FIG. 50(c) is a pattern at the time of restoration, where a path switch is provided in the terminal node. Whereby, the terminal node can similarly operate to the terminal node in the DCP connection.

Figure 51A:
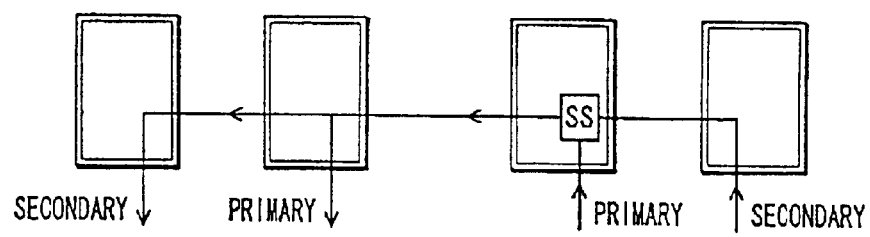
FIGS. 51(a) through 51(c) are diagrams for illustrating operations in a double-sided connection according to the first modification of the second embodiment of this invention.
Figure 51B:
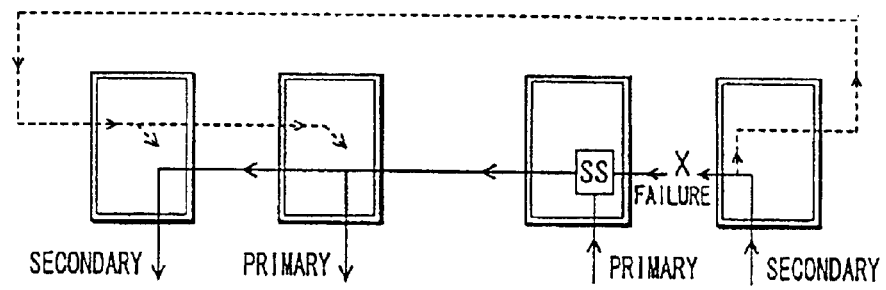
Figure 51C:
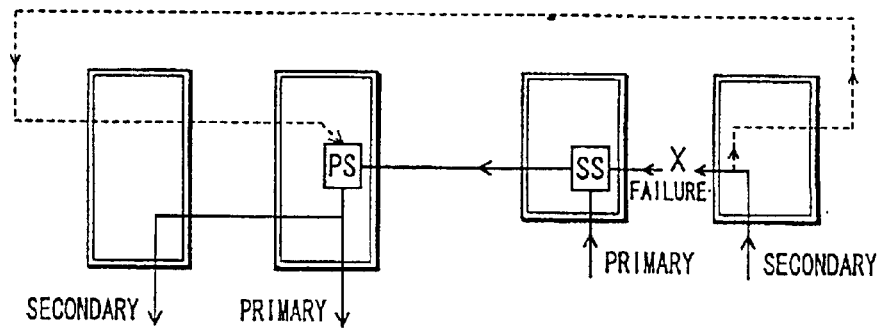

FIGS. 51(a) through 51(c) are diagrams illustrating operations in the double-sided according to the first modification of the second embodiment of this invention, showing patterns in which one ring is connected to other rings on the both sides. In other words, these are ones obtained by extending the patterns in FIGS. 50(a) through 50(c) on the both sides.

FIG. 51(a) shows a pattern in a normal state, where either one of an optical signal added to a primary node and an optical signal from a secondary node is selected by a service selector, and the selected one is transmitted to the opposite primary node and secondary node.

FIG. 51(b) shows a pattern in which a failure occurs between the primary node and the secondary node. When each of the opposite primary node and secondary node switches the optical signal, an optical signal from the primary node is not selected.

FIG. 51(c) shows a pattern at the time of restoration, where a path switch is provided in the opposite primary node. Whereby, the opposite primary node can operate similarly to the terminal node in the DTP connection.

As above, when the system operates as the submarine BLSR, each node selects a path according to the situation.

FIGS. 52(a) and 52(b) are diagrams illustrating failure operation patterns in the single-sided DCW according to the first modification of the second embodiment of this invention. The single-sided DCW here is similar to that shown in FIG. 41. What is shown in FIG. 52(a) is a pattern in a normal state. This is similar to that described above, description of which is omitted in order to avoid duplication.

A pattern shown in FIG. 52(b) is a case where a failure position looked from both Sec-1 and Pri-1 is in N1-R4. A service selector is provided in Pri-2 to enable switching.

An optical signal added to Sec-1 reaches Pri-2 over a line in the opposite direction. At Pri-2, the optical signal is compared with an optical signal added to Pri-1, path-selected, and dropped therefrom. An optical signal added to Pri-2 is dropped from Sec-1 over a line in the opposite direction.

As above, even when the system operates as the submarine BLSR, it is possible to omit a redundant path, enabling effective restoration of optical signals.

Further, an absolute node ID generated using ring topology is converted into a relative node ID, and APS information is transmitted from a node adjacent to a node in which a failure occurs, so that each node can perform the squelch control and line switching by simply comparing the magnitudes thereof.

FIGS. 53(a) and 53(b) are diagrams illustrating a failure operation pattern in DCP-DCW according to the first modification of the second embodiment of this invention. Incidentally, DCP-DCW is similar to that shown in FIG. 28. Further, what is shown in FIG. 53(a) is a normal operation. This is similar to that described above, description of which is omitted in order to avoid duplication.

In a connection shown in FIG. 53(b), nodes Sec-1, Pri-1, pri-2, and Sec-2 are connected in order, from right to left. FIG. 53(b) shows a pattern in which a failure position looked from both Sec-1 and Pri-1 is in N3-R2.

An optical signal added to Sec-1 reaches Sec-2 over a line in the opposite direction. From Sec-2, the optical signal is dropped. An optical signal added to Sec-2 reaches Sec-1 over a line in the opposite direction. One of the split optical signals is dropped from Sec-1. At Pri-1, either one of the other signal and an optical signal from Pri-2 is selected, and dropped.

Even when the system operates in the submarine BLSR, it is possible to omit a wasteful path, which permits effective restoration of the optical signal.

Next, FIGS. 54(a) and 54(b) are diagrams illustrating a failure operation pattern in DCW-DCW according to the first modification of the second embodiment of this invention. Incidentally, DCW-DCW here is similar to that shown in FIG. 33. What is shown in FIG. 54(a) is a normal operation similar to that described above, description of which is omitted in order to avoid duplication.

FIG. 54(b) shows a case where a failure position looked from Sec-1 and Pri-1 is in N3-R2. An optical signal is selected by a service selector in the primary node.

An optical signal added to Sec-1 is split at Pri-1, and the split optical signal reaches Sec-2 over a line in the opposite direction and dropped therefrom. An optical signal added to Sec-2 reaches Pri-1 over a line in the opposite direction via Sec-1. At Pri-1, either one of the optical signal from Sec-2 and an optical signal from Pri-2 is selected, and dropped therefrom.

Next, setting of line connection information in the submarine BLSR in an optical transmitting apparatus for a ring transmission system with the above structure will be described with reference to FIG. 55.

Figure 55:
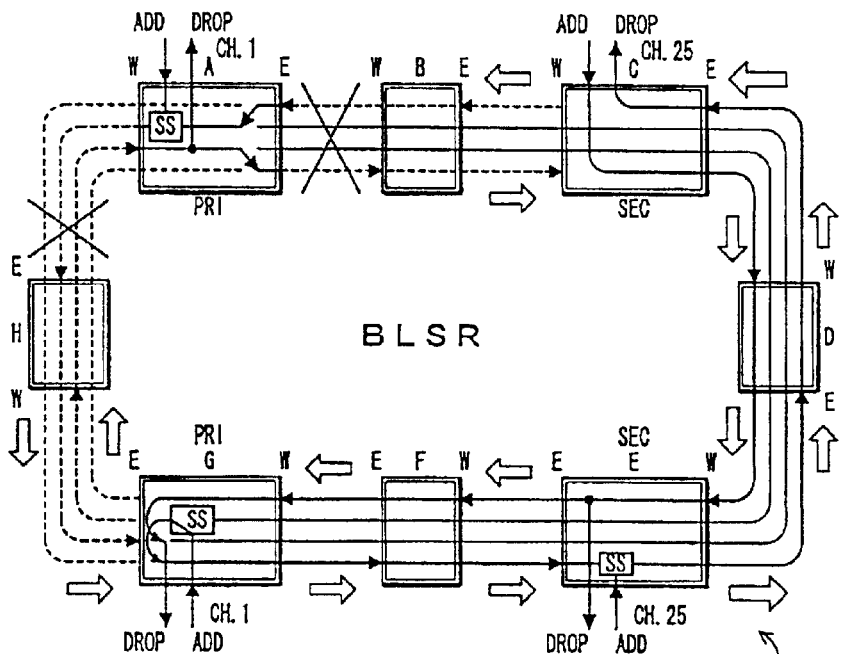
FIG. 55 is a diagram for illustrating a restoration route at the time of failure occurrence in a submarine BLSR according to the first modification of the second embodiment of this invention.

FIG. 55 is a diagram illustrating restoration routes at the time of occurrence of a failure in the submarine BLSR according to the first modification of the second embodiment of this invention. In a ring 140 shown in FIG. 55, white arrows indicate notification routes of APS (representing failure information; a failed span detecting section 110b shown in FIG. 18 plays a role as a trigger for detecting a failed span). A first failure occurs between a node A and a node H shown in FIG. 55, and a second failure occurs between the node A and a node B. The first failure is detected by the node H, whereas the second failure is detected by the node B.

When the first failure occurs, a node G stops communication using the node H and the working line (channel 1). The node G performs ring-bridging and ring-switching, whereby an optical signal transmitted from a node F over the protection line is dropped from the node G, while an optical signal added to the node G is not transmitted to the node H, but is looped-back at the node G and transmitted to the node F over the protection line.

Over the protection line (channel 25), optical signals are transmitted and received between the node G and the node A in the normal state. When a failure occurs in this span, an optical signal is added to (or dropped from) the node C in a direction opposite to a direction toward the node A, in a similar manner to the above restoration for the shortest distance.

As above, even when the system operates as the submarine BLSR, it is possible to loop-back optical signals for the shortest distance and effectively restore the optical signals. This allows a large decrease in transmission loss of the optical signal, which in turn allows the repeating distance to be noticeably extended, leading to a large decrease in cost of the system operation.

(B2) Description of a Second Modification of the Second Embodiment of the Invention According to this modification, description will be made of operations when a particular line failure occurs (hereinafter referred to as a particular example, occasionally).

Figure 74:
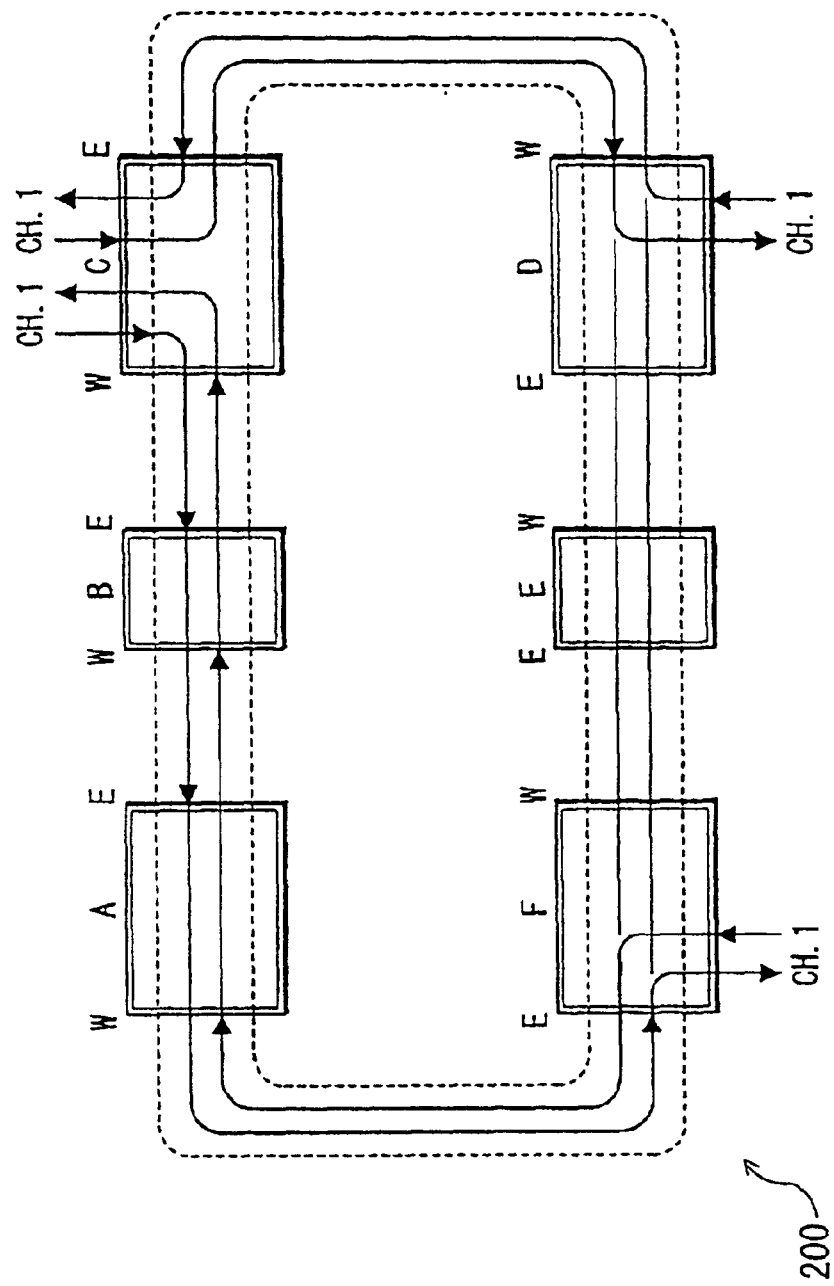
FIG. 74 is a diagram for illustrating transmission as a normal BLSR.
Figure 75:
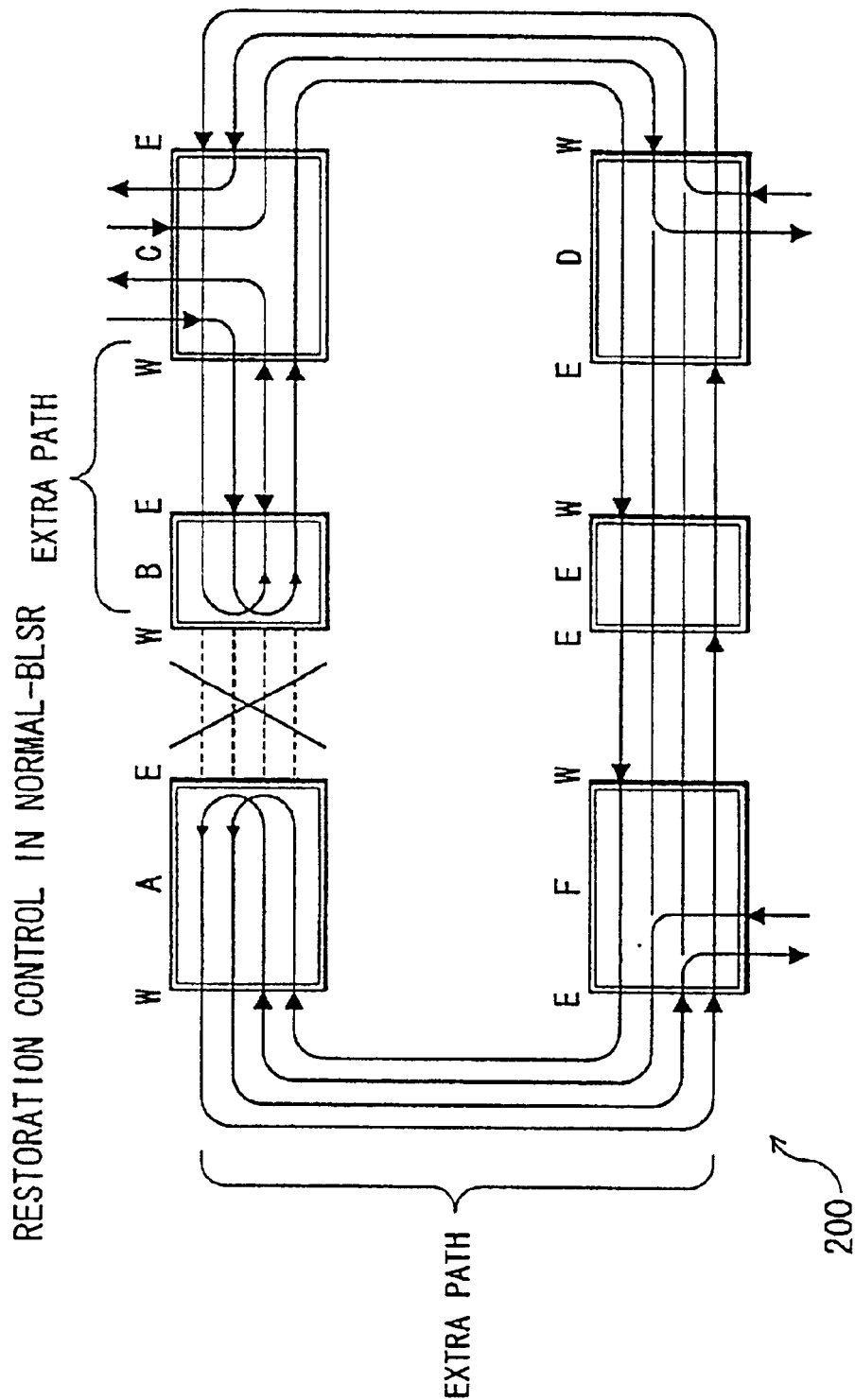
FIG. 75 is a diagram for illustrating a line restoration control.
Figure 76:
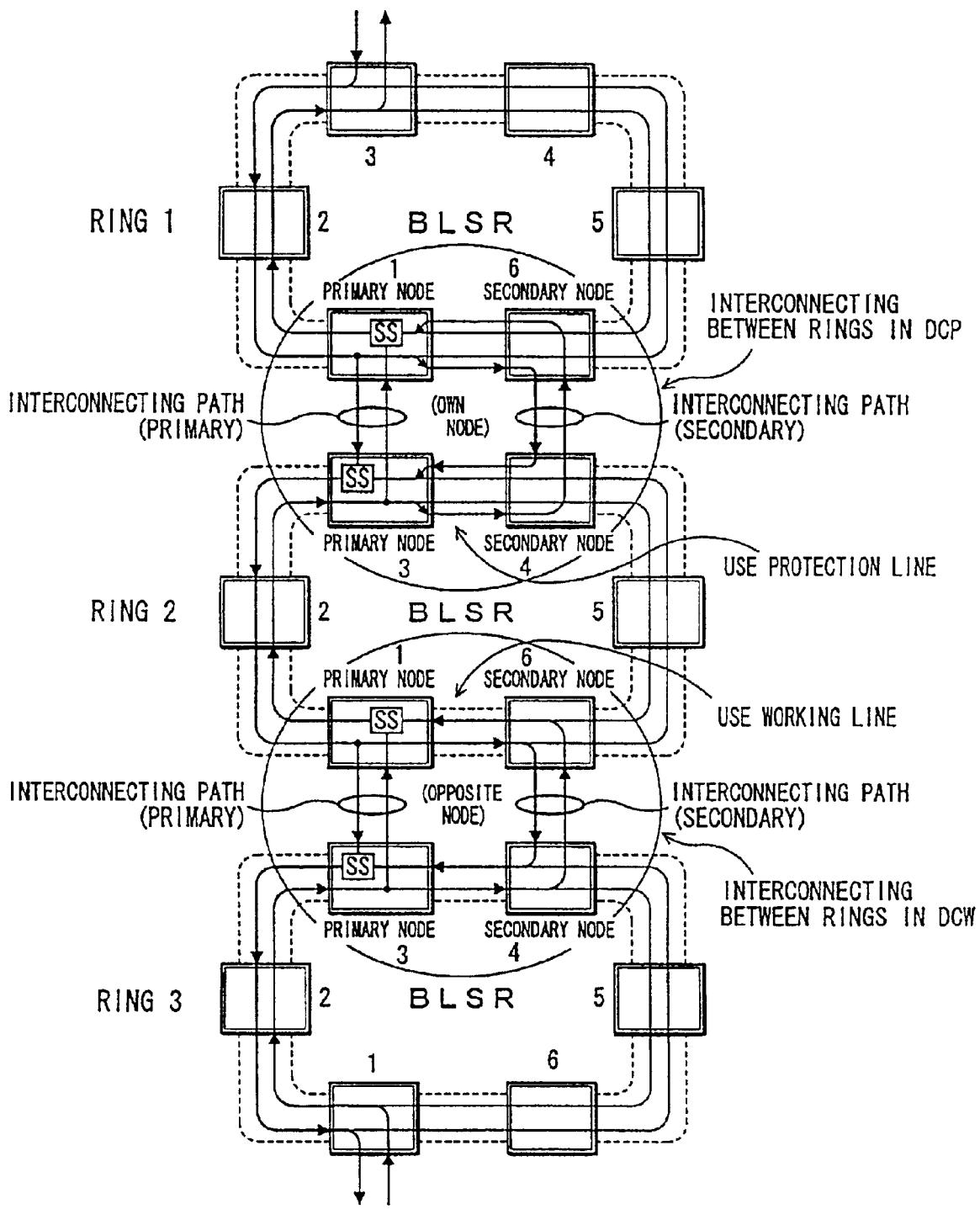
FIG. 76 is a diagram for illustrating a ring interconnection in DCP-DCW.
Figure 77:
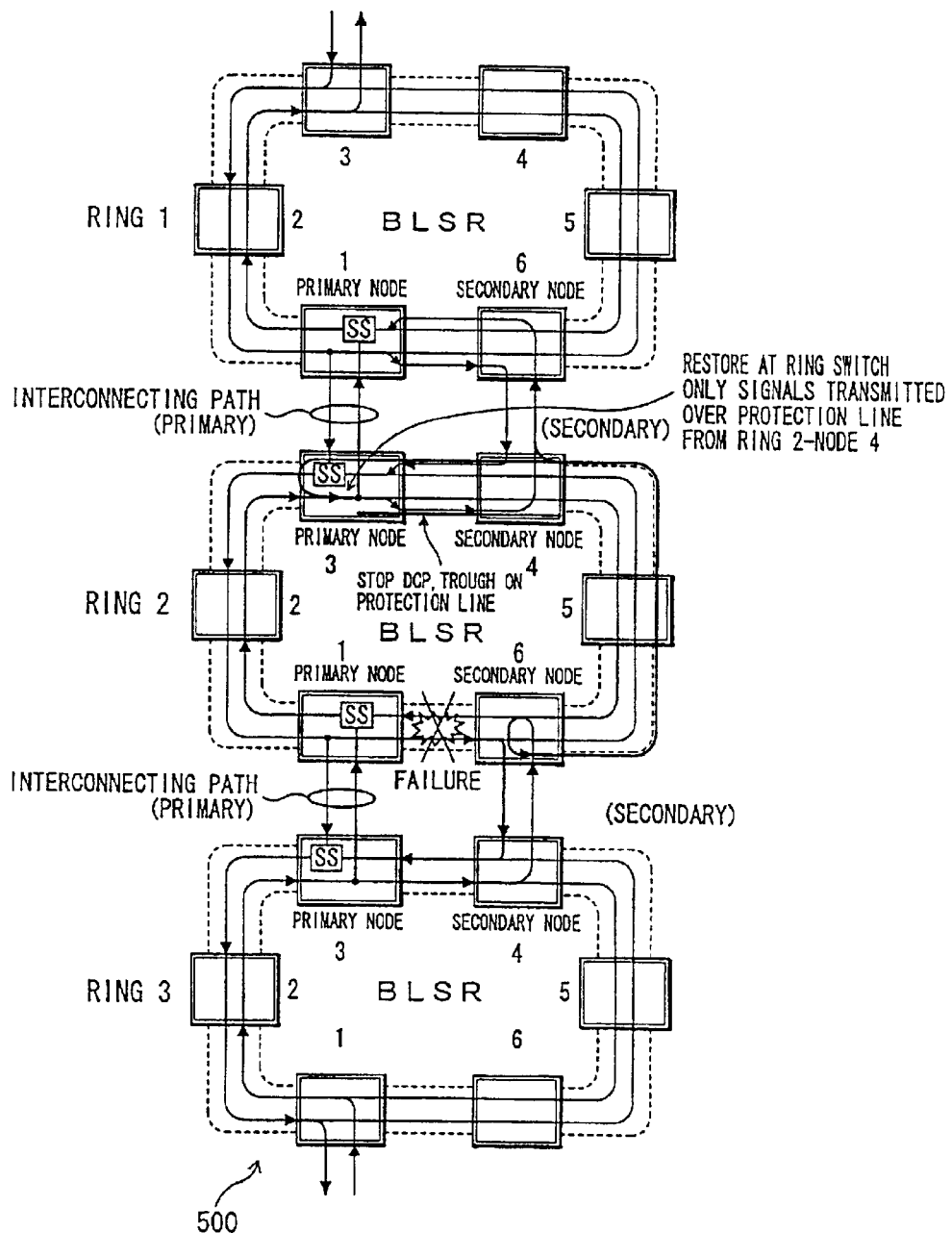
FIG. 77 is a diagram for illustrating a ring at the time of failure occurrence.
Figure 78:
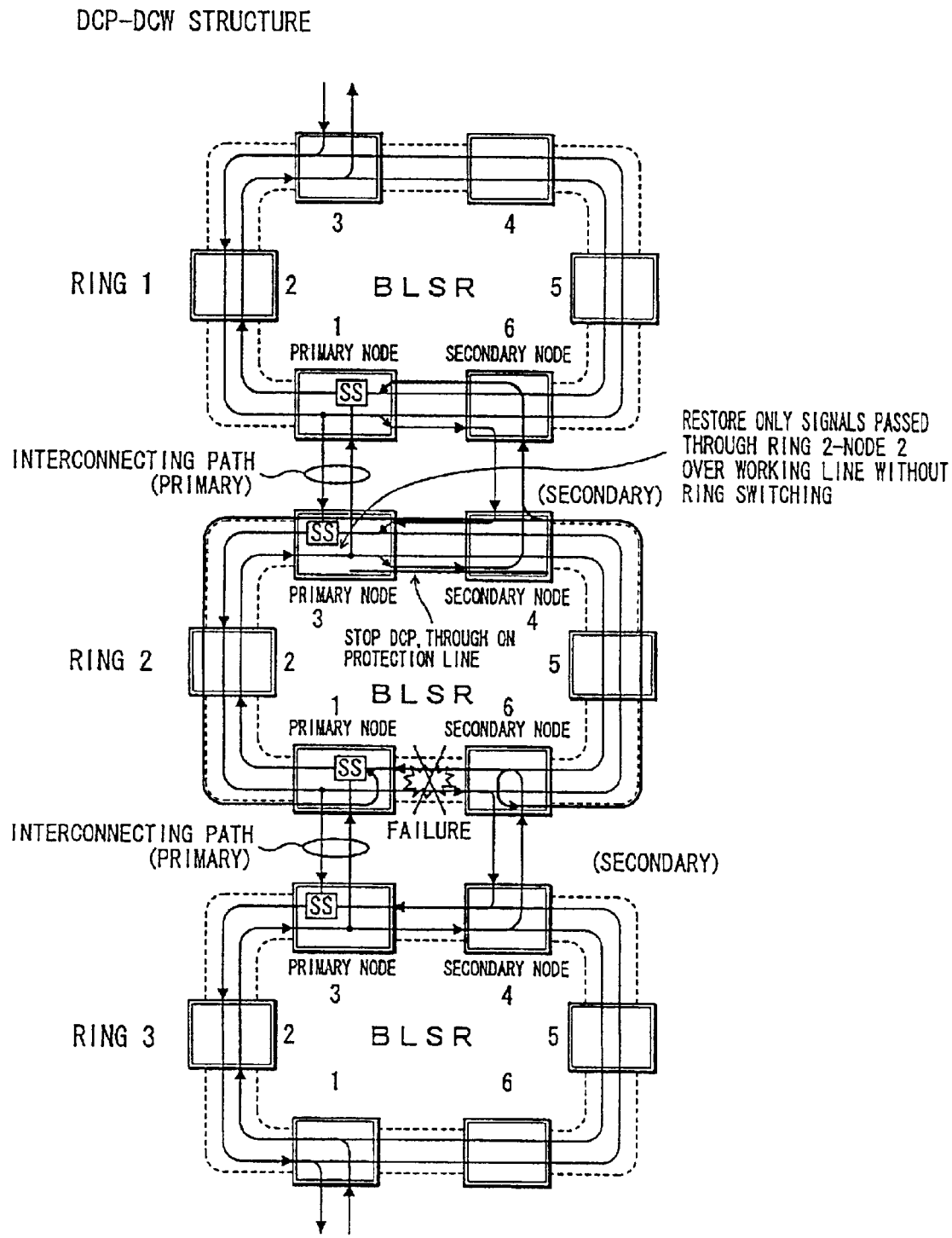
FIG. 78 is a diagram for illustrating a case where a failure occurs in a network without a ring switch function.
Figure 79:
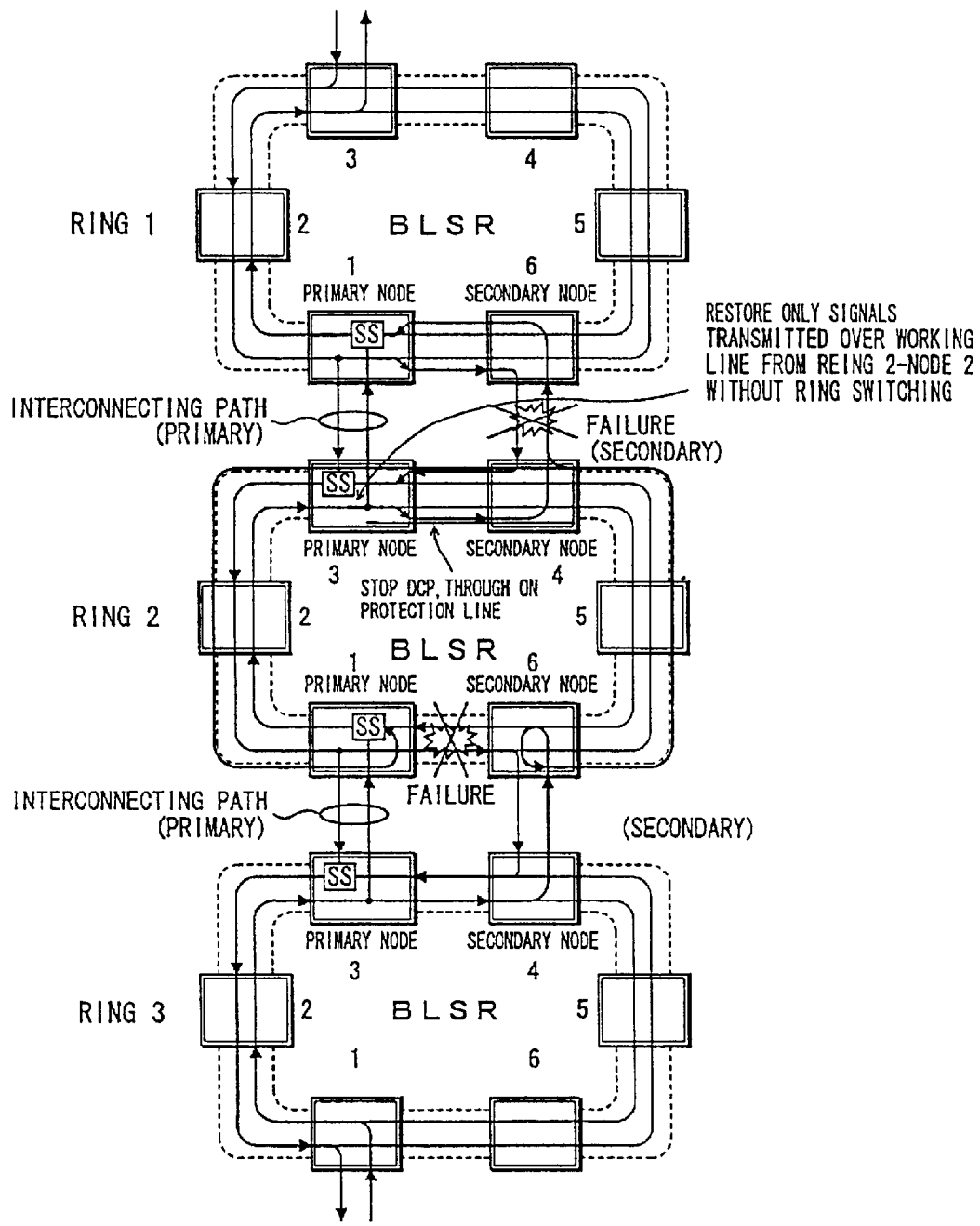
FIG. 79 is a diagram for illustrating a case where failures occur in a network without the ring switch function.

In the above-mentioned ring 200 shown in FIGS. 74 and 75, an optical signal passes through an extra path when going around the failure position. For this, there is a requirement not to pass the optical signal through the extra path due to loop-back.

Therefore, each node has the path switching section 110d (refer to FIG. 18). The path switching section 110d is connected to the loop-back switching control section 110c to select either one having a better quality of a first optical signal in one direction and a second optical signal in the other direction.

In this modification, each node has the same structure as the node B shown in FIG. 18, description of which is omitted in order to avoid duplication.

Figure 56:
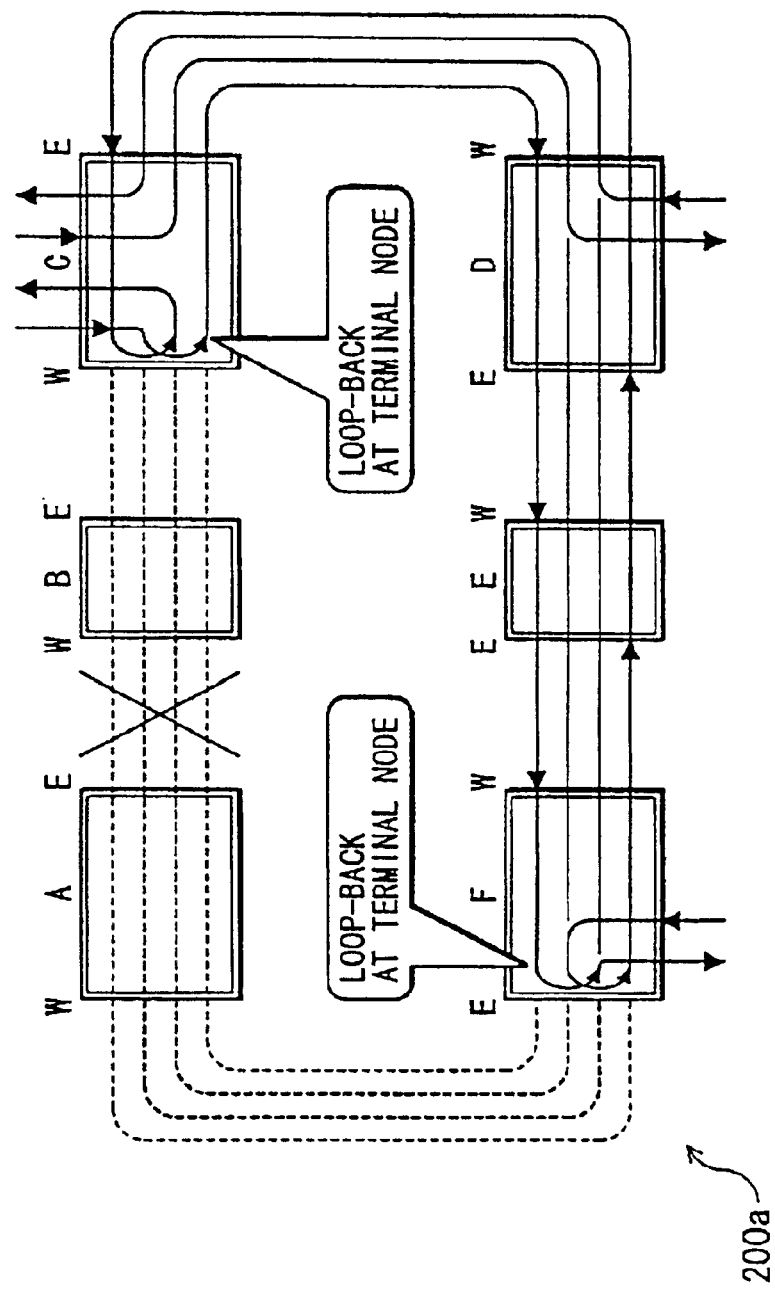
FIG. 56 is a diagram for illustrating a loop-back control according to a second modification of the second embodiment of this invention.

FIG. 56 is a diagram illustrating a loop-back control according to the second modification of the second embodiment. A failure occurs between a node B and a node A shown in FIG. 56. The nodes A and B are switching nodes, but perform no control when the failure occurs. On the other hand, a node C and a node F are terminal nodes. In each of the terminal nodes, optical signals are looped-back.

A path switch in each node does not fixedly select one of optical signals, but monitors optical signals coming in from two directions and selects one having a higher quality.

An optical signal added to the node c from the W side in a ring 200a is not transmitted to the node B, but is ring-bridged at the node C from the working line to the protection line. The optical signal passes through the nodes D, E, and F, and reaches the node F. At the node F, the optical signal does not reach the node A, but is ring-switched to be dropped from the E side of the node F.

As above, the optical signal is transmitted and looped-back for the shortest distance, not passing through an extra path, which enabling the loop-back control for the shortest distance. Unlike the ring 200 shown in FIG. 75, the optical signal is transmitted for the shortest distance in the ring 200a, not passing through an extra path between the node B and the node C shown in FIG. 75.

Figure 57:
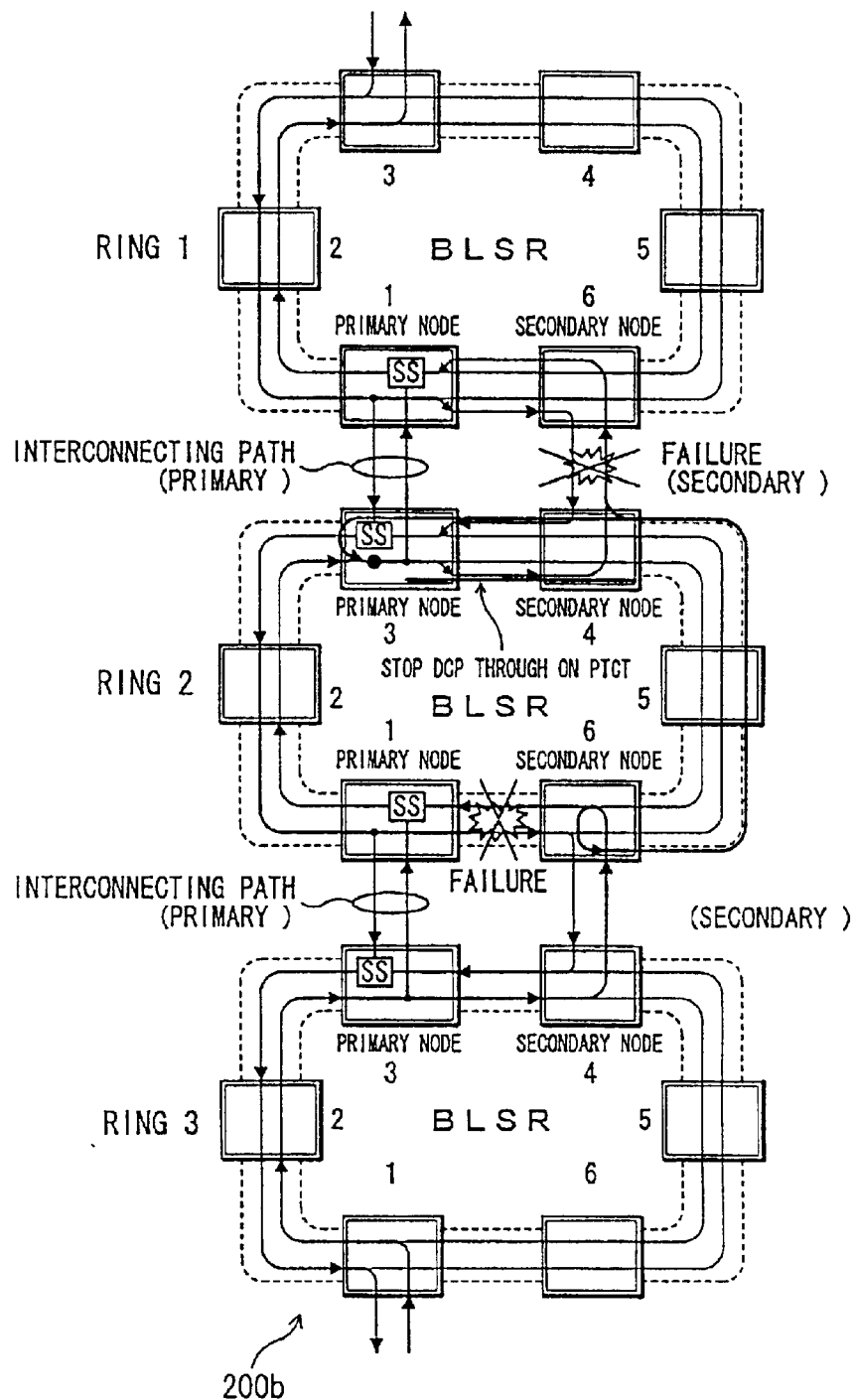
FIG. 57 is a diagram for illustrating an operation in DCP-DCW according to the second modification of the second embodiment of this invention.
Figure 60:
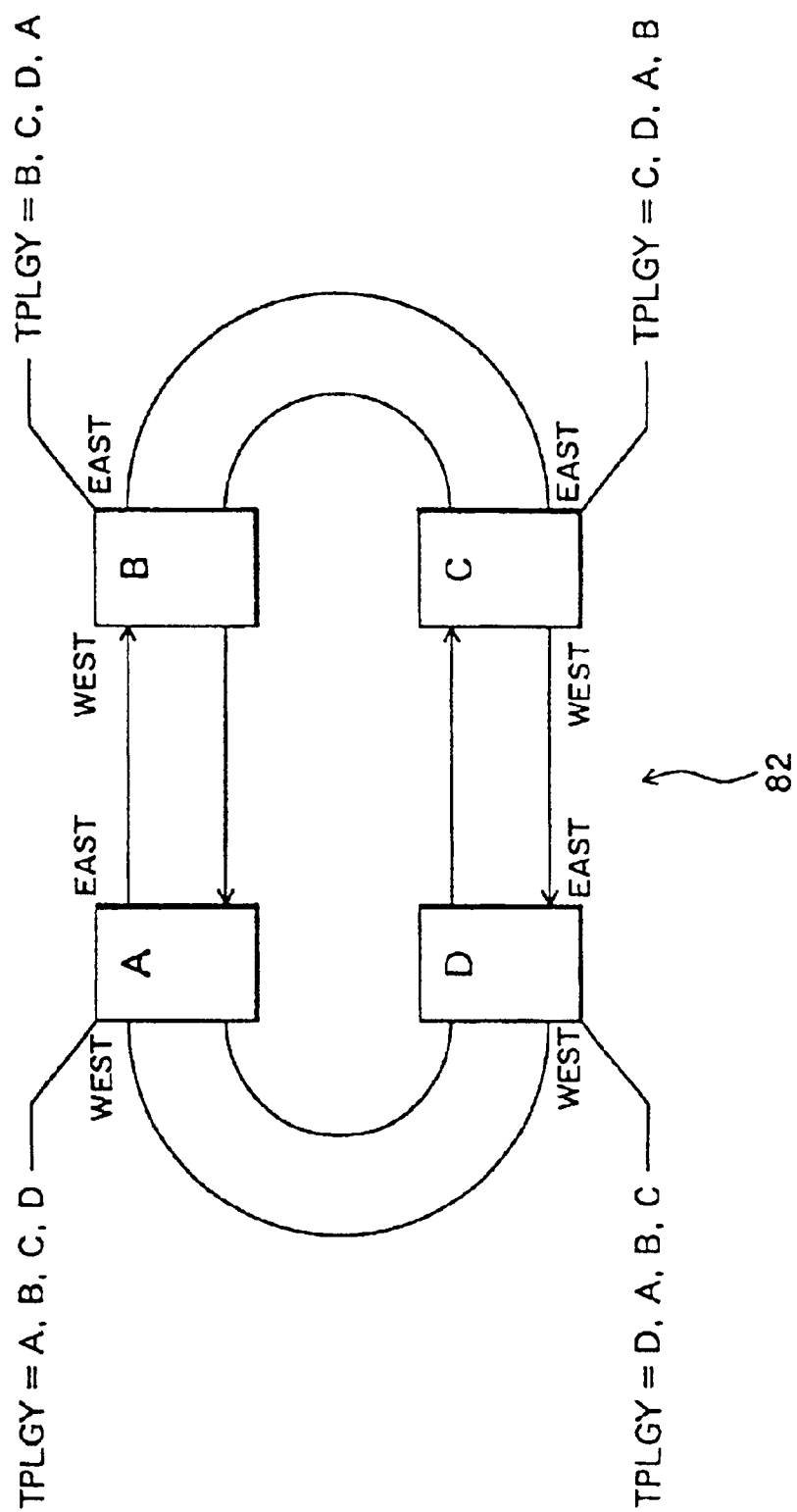
FIG. 60 is a diagram for illustrating topology.
Figures 62A, 62B, 62C:
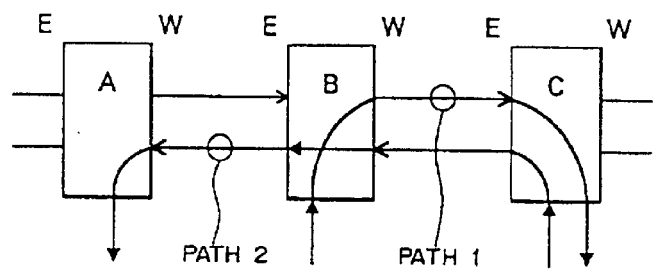
FIG. 62(a) is a schematic diagram of a ring transmission path having an add node and a drop node.
FIG. 62(b) is a diagram showing an example of a squelch table of a node.
FIG. 62(c) is a diagram for comparing squelch table values in each node.

With the above structure, switching shown in FIG. 57 is performed. FIG. 57 is a diagram illustrating operations in DCP-DCW according to the second modification of the second embodiment of this invention. A ring 200b shown in FIG. 57 is in the DCP-DCW connection, and a flow of optical signals in the normal state is similar to the above, description of which is omitted in order to avoid duplication.

Here, a failure occurs between ring 2-node 1 and ring 2-node 6. Further, another failure occurs between ring 2-node 4 and ring 1-node 6. A black dot shown at ring 2-node 3 represents a service selector SS.

In this case, selection of an optical signal is done at ring 2-node 3. Namely, at ring 2-node 3, either one having a better quality of an optical signal from ring 2-node 4 over a protection line and an optical signal from ring 2-node 2 over a working line is selected.

In other words, the path switch in each node monitors optical signals in both directions, determines an optical signal transmitted on which line has a better quality, and adaptively switches to the optical signal on the working line or the protection line on the basis of a result of the determination.

As above, ring 2-node 3 always selects either one having a better quality of an optical from ring 2-node 4 and an optical signal from ring 2-node 2, so that reliability of optical signal transmission is largely improved.

According to this modification, a control by the special operation is used in the loop-back control for the shortest distance in the BLSR, which leads to better line restoration.

(C) Others

The present invention is not limited to the above examples, but may be modified in various ways without departing from the scope of the invention.

Node names, codes and the like described in the above embodiments and modifications are merely examples, not limited to these terms.

In the drawings, what is denoted as merely DCP stands for a DCP connection or a DCP structure. Similarly, what are denoted as merely DTP, DCW, and DTW stand for a DTP connection or a DTP structure, a DCW connection or a DCW structure, and a DTW connection or a DTW structure. What is denoted as SS in FIGS. 66 and 69 stands for a service selector.

Meanwhile, the transmission systems shown in FIGS. 25, 28, 33, 38, 70, 72, and 76 are examples of ring interconnections with RIP tables. In which, the adjacent node is not necessarily a primary node or a secondary node; a plurality of nodes may exist between the primary node and the secondary node. A partner to which a primary node is connected is not always a primary node in ring interconnect, but a primary node and a secondary node may be connected to each other.

Figure 72:
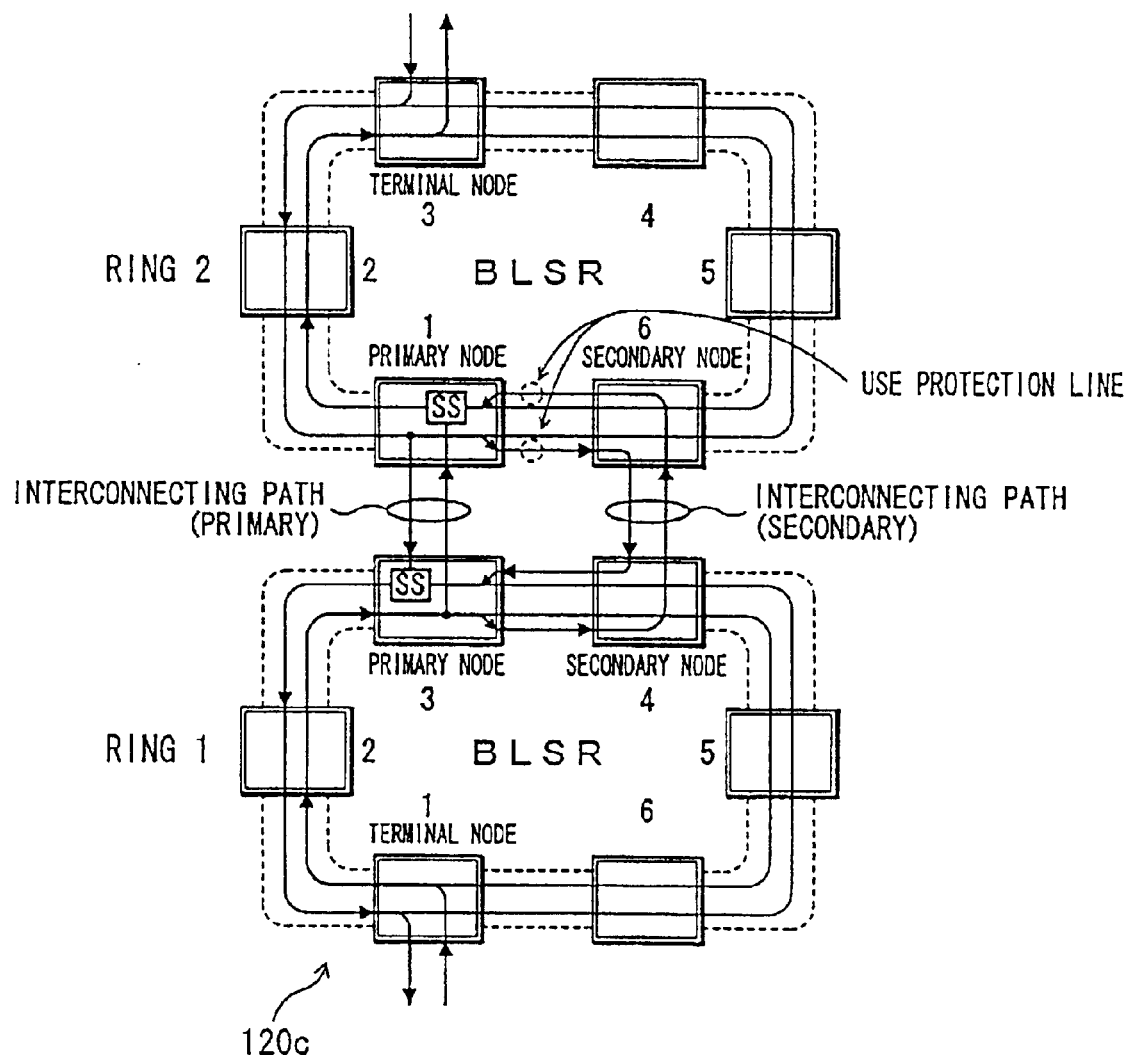
FIG. 72 is a diagram showing a structure of single-sided DCP.
Figure 73:
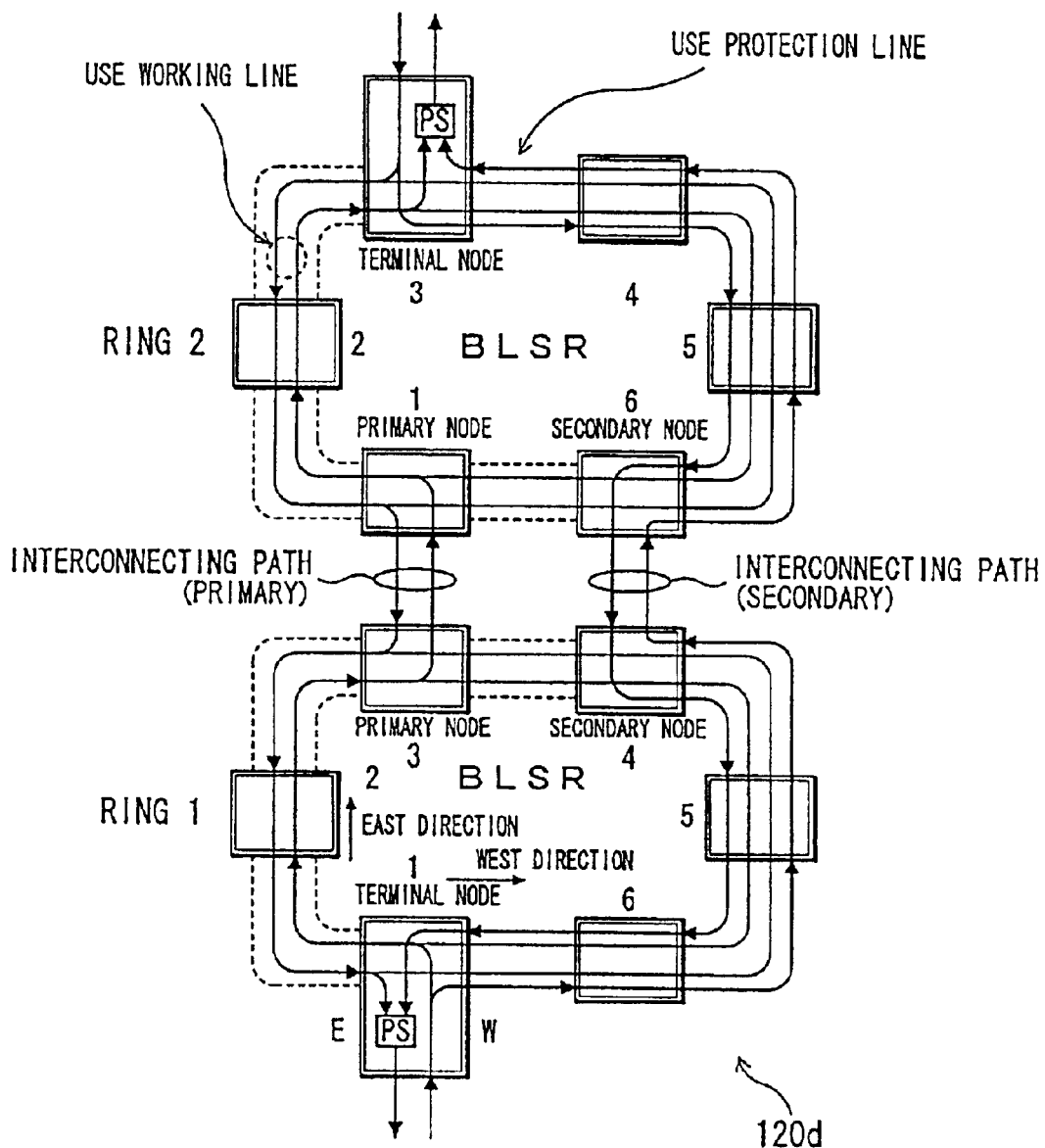
FIG. 73 is a diagram showing a structure of DTP.

Having been described representative operations for failure restoration with a RIP table of each node, the number of nodes in the same ring using a RIP table is not limited to four, but it may be increased up to 16. For example, the number of nodes is not limited to six as shown in FIG. 72.

N1 to N4, and R1 to R4 named as failure positions among nodes in the second embodiment are not limited to their terms.

In each of the drawings, a primary node is indicated as Primary, Primary Node or Pri, a secondary node is indicated as Secondary, Secondary Node or Sec, and a terminal node is indicated as Terminal, Terminal Node or Term; these have the same meaning, respectively.

The network structure shown in FIGS. 40 through 48, and 55 stands for a network structure information table.

In each of the drawings, what is indicated as ch.1 or the like stands for channel 1 or the like.

In FIGS. 25, 28, 33, 36, 38, 57, 70 to 73, and 76 to 79, what is indicated as an interconnecting path interconnects rings.

What is claimed is:

1. An optical transmitting apparatus for a ring transmission system used in a ring transmission system which is combined (a1) a first ring transmission system with (a2) a second ring transmission system, in (a1) the first ring transmission system a plurality of optical transmitting apparatuses are connected to one another over a bidirectional ring transmission path having a data link channel in which crossconnect information representing an add node identifier representing a node adding an optical signal and a drop node identifier representing a node dropping an optical signal is written, and in (a2) the second ring transmission system a plurality of optical transmitting apparatuses are connected to one another over a bidirectional ring transmission path having the data link channel, said optical transmitting apparatus comprising:

a data link reading means for reading said crossconnect information and topology information uniquely representing the order of arrangement of optical transmitting apparatuses connected in ring;

a topology creating means for creating a topology using said topology information read by said data link reading means;

a data link writing means for writing a unique absolute node identifier given to each of said plural optical transmitting apparatuses and a relative node identifier given by relating absolute node identifiers of other nodes with said topology in said crossconnect information of said data link channel on the basis of said topology created by said topology creating means;

a squelch table creating means for creating a squelch table holding said crossconnect information written in said data link, channel; and an RIP table creating means for creating an RIP table holding a primary node identifier indicating a primary node which transmits said optical signal from said first ring transmission path to said second ring transmission path, a secondary node identifier indicating a secondary node adjacent to said primary node to transmit/receive said optical signal, and said drop node identifier for each of a working line and a protection line on the basis of said crossconnect information.

2. The optical transmitting apparatus for a ring transmission system according to claim 1, wherein said data link writing means sets an absolute node identifier of its own node to said add node identifier of said data link channel when its own node is said add node, and sets said drop node identifier of said data link channel to a relative node identifier of its own node corresponding to said add node identifier when its own node is said drop node.

3. The optical transmitting apparatus for a ring transmission system according to claim 1, wherein data other than zero is used as said relative node identifier set by said data link writing means, and said node recognizing means recognizes presence or absence of zero data in a region in which said drop node identifier of said data link channel is written to determine whether or not setting of said crossconnect information is completed.

4. The optical transmitting apparatus for a ring transmission system according to claim 1, wherein said squelch table creating means is such configured as to create the same squelch table among optical transmitting apparatuses of said ring transmission system.

5. An optical transmitting apparatus for a ring transmission system used in a ring transmission system in which a first ring transmission system in which a plurality of optical transmitting apparatuses are connected to one another over a bidirectional ring transmission path having a data link channel in which crossconnect information representing an add node identifier representing a node adding an optical signal and a drop node identifier representing a node dropping the optical signal is written is coupled with a second ring transmission system in which a plurality of optical transmitting apparatuses are connected to one another over a bidirectional ring transmission path having said data link channel; said optical transmitting apparatus comprising:

- a data link reading means for reading said crossconnect information of said data link channel and topology information uniquely representing the order of arrangement of optical transmitting apparatuses connected in ring;
- a topology creating means for creating a topology using said topology information read by said data link reading means;
- a data link writing means for writing a unique absolute identifier given to each of a plurality of optical transmitting apparatuses and a relative node identifier given by relating absolute node identifiers of other nodes with said topology in said crossconnect information of said data link channel on the basis of said topology created by said topology creating means;
- a squelch table creating means for creating a squelch table holding said crossconnect information written in said data link channel;
- an RIP table creating means for creating an RIP table holding a primary node identifier indicating a primary node which transmits said optical signal from said first ring transmission path to said second ring transmission path, a secondary node identifier indicating a secondary node adjacent to said primary node to transmit/receive said optical signal, and said drop node identifier for each of a working line and a protection line on the basis of said crossconnect information; and
- a node recognizing means being able to recognize from said relative node identifier of said crossconnect information read by said data link reading means which its own node is said primary node or said secondary node.

6. The optical transmitting apparatus for a ring transmission system according to claim 5, wherein said data link writing means sets an absolute node identifier of its own node to said add node identifier of said data link channel when its own node is said add node, and sets said drop node identifier of said data link channel to a relative node identifier of its own node corresponding to said add node identifier when its own node is said drop node.

7. The optical transmitting apparatus for a ring transmission system according to claim 5, wherein data other than zero is used as said relative node identifier set by said data link writing means, and said node recognizing means recognizes presence or absence of zero data in a region in which said drop node identifier of said data link channel is written to determine whether or not setting of said crossconnect information is completed.

8. The optical transmitting apparatus for a ring transmission system according to claim 5, wherein said node recognizing means comprises:

- an additional information determining means being able to determine which a connection mode of said first ring transmission system or said second ring transmission system is in a DCP connection in which said optical signal is dropped from said primary node while continued over said protection line or in a DTP connection in which said optical signal is continued over both of said working line and said protection line on the basis of information written in said squelch table.

9. The optical transmitting apparatus for a ring transmission system according to claim 8, wherein said additional information determining means determines which said first ring transmission system or said second ring transmission system is in said DCP connection or in said DTP connection from which a direction of its own node identifier indicating its own node looked from said primary node identifier is in the same direction as or in the opposite direction to the order of arrangement of nodes represented by said topology.

10. The optical transmitting apparatus for a ring transmission system according to claim 5, wherein said squelch table creating means is such configured as to create the same squelch table among optical transmitting apparatuses of said ring transmission system.

11. The optical transmitting apparatus for a ring transmission system according to claim 5, wherein said RIP table creating means is such configured as to create the same RIP table among optical transmitting apparatuses of said ring transmission system.

12. An optical transmitting method for a ring transmission system used in a ring transmission system which is combined (a1) a first ring transmission system with (a2) a second ring transmission system, in (a1) the first ring transmission system a plurality of nodes are connected to one another over a bidirectional ring transmission path having a data link channel in which crossconnect information representing an add node identifier representing a node adding an optical signal and a drop node identifier representing a node dropping an optical signal is written, and in (a2) the second ring transmission system a plurality of optical transmitting apparatuses are connected to one another over a bidirectional ring transmission path having the data link channel, wherein (a1) said first ring transmission system comprises:

- a first add/drop node for receiving an optical signal transmitted from an external node over a working line and transmitting said optical signal to another node of said first ring transmission system over said working line, while receiving an optical signal transmitted from another node of said first ring transmission system over said working line;
- a first primary node for receiving said optical signal transmitted from said first add/drop node over said working line and transmitting said optical signal to an external ring transmission system and another node of said first ring transmission system over said working line, while receiving an optical signal transmitted from said external ring transmission system over said working line and an optical signal transmitted from another node of said first ring transmission system over a protection line, selecting either one of said received optical signals, and transmitting said selected optical signal to another node of said first ring transmission system over said working line;
- a first secondary node for receiving said optical signal transmitted from said first primary node over said protection line and transmitting said optical signal to said external ring transmission system over said protection line, while receiving said optical signal transmitted from said external ring transmission system over said protection line and transmitting said optical signal to said first primary node over said protection line; and (a2) said second ring transmission system comprises:

a second secondary node for receiving said optical signal transmitted from said first secondary node of said first ring transmission system over said protection line and transmitting said optical signal to said second ring transmission system over said protection line;

a second primary node for receiving an optical signal transmitted from said first primary node of said first ring transmission system over said working line and said optical signal transmitted from said second secondary node over said protection line and transmitting said optical signal to another node of said second ring transmission system over said working line, while receiving an optical signal transmitted from another node of said second ring transmission system over said working line, transmitting said optical signal to said first primary node of said first ring transmission system, and transmitting said optical signal to said second secondary node;

a second add/drop node for receiving an optical signal transmitted from an external ring transmission system over said working line and transmitting said optical signal to another node of said second ring transmission system over said working line, while receiving said optical signal transmitted from another node of said second ring transmission system over said working line and transmitting said optical signal to said external ring transmission system over said working line;

said optical transmitting method performed in each of said node comprising the steps of:

a data link reading step of reading said crossconnect information and topology information uniquely representing the order of arrangement of optical transmitting apparatuses connected in ring;

a topology creating step of creating a topology using said topology information read at said data link reading step;

a data link writing step of writing a unique absolute node identifier given to each of a plurality of nodes and a relative node identifier given by relating absolute node identifiers of other nodes with said topology in said cross connect information of said data link channel on the basis of said topology created at said topology creating step;

a squelch table creating step of creating a squelch table holding said crossconnect information written in said data link channel; and an RIP table creating step of creating an RIP table holding a primary node identifier indicating a primary node which transmits said optical signal from said first ring transmission path to said second ring transmission path, a secondary node identifier indicating a secondary node adjacent to said primary node to transmit/receive said optical signal, and said drop node identifier for each of a working line and a protection line on the basis of said crossconnect information.

13. The optical transmitting method for a ring transmission system according to claim 12, wherein at said data link writing step, data other than zero is used as said relative node identifier.

14. An optical transmitting method for a ring transmission system used in a first ring transmission system in which a plurality of nodes are connected to one another over a bidirectional ring transmission path having a data link channel in which crossconnect information representing an add node identifier indicating a node adding an optical signal and a drop node identifier indicating a node dropping the optical signal is written, and a second ring transmission system in which a plurality of nodes are connected to one another over a bidirectional ring transmission path having said data channel;

wherein said first ring transmission system comprises:

a first add/drop node for receiving an optical signal transmitted from an external node over a working line and transmitting said optical signal to another node of said first ring transmission system over said working line, while receiving an optical signal transmitted from another node of said first ring transmission system over said working line;

a first primary node for receiving said optical signal transmitted from said first add/drop node over said working line and transmitting said optical signal to an external ring transmission system and another node of said first ring transmission system over said working line, while receiving an optical signal transmitted from said external ring transmission system over said working line and an optical signal transmitted from another node of said first ring transmission system over a protection line, selecting either one of said received optical signals, and transmitting said selected optical signal to another node of said first ring transmission system over said working line;

a first secondary node for receiving said optical signal transmitted from said first primary node over said protection line and transmitting said optical signal to said external ring transmission system over said protection line, while receiving said optical signal transmitted from said external ring transmission system over said protection line and transmitting said optical signal to said first primary node over said protection line;

said second ring transmission system comprises:

a second secondary node for receiving said optical signal transmitted from said first secondary node of said first ring transmission system over said protection line and transmitting said optical signal to said second ring transmission system over said protection line;

a second primary node for receiving an optical signal transmitted from said first primary node of said first ring transmission system over said working line and said optical signal transmitted from said second secondary node over said protection line and transmitting said optical signal to another node of said second ring transmission system over said working line, while receiving an optical signal transmitted from another node of said second ring transmission system over said working line, transmitting said optical signal to said first primary node of said first ring transmission system, and transmitting said optical signal to said second secondary node;

a second add/drop node for receiving an optical signal transmitted from an external ring transmission system over said working line and transmitting said optical signal to another node of said second ring transmission system over said working line, while receiving said optical signal transmitted from another node of said second ring transmission system over said working line and transmitting said optical signal to said external ring transmission system over said working line;

said optical transmitting method performed in each of said nodes comprising the steps of:
- a data link reading step of reading said crossconnect information of said data link channel and topology information uniquely representing the order of arrangement of optical transmitting apparatuses connected in ring;
- a topology creating step of creating a topology using said topology information read at said data link reading step;
- a data link writing step of writing a unique absolute node identifier given to each of a plurality of nodes and a relative node identifier given by relating absolute node identifiers of other nodes with said topology in said crossconnect information of said data link channel on the basis of said topology created at said topology crating step;
- a squelch table creating step of creating a squelch table holding said crossconnect information written in said data link channel;
- an RIP table creating step of creating an RIP table holding a primary node identifier indicating a primary node transmitting said optical signal from said first ring transmission path to said second ring transmission path, a secondary node identifier indicating a secondary node adjacent to said primary node to transmit/receive said optical signal, and said drop node identifier for each of said working line and said protection line on the basis of said crossconnect information; and
- a node recognizing step of recognizing from said relative node identifier of said crossconnect information read at said data link reading step which its own node is said primary node or said secondary node.

15. The optical transmitting method for a ring transmission system according to claim 14, wherein at said node recognizing step, presence or absence of zero data in a region in which said drop node identifier of said data link is written is recognized to determine whether or not setting of said crossconnect information is completed.

16. An optical transmitting method for a ring transmission system used in a first ring transmission system in which a plurality of nodes are connected to one another over a bidirectional ring transmission path having a data link channel in which crossconnect information representing an add node identifier indicating a node adding an optical signal and a drop node identifier indicating a node dropping an optical signal is written and a second ring transmission system in which a plurality of nodes are connected to one another over a bidirectional ring transmission path having said data link channel;

wherein said first ring transmission system comprises:
- a first add/stop node for receiving an optical signal transmitted from an external node over a working line, transmitting said optical signal to said first ring transmission system over said working line, and transmitting said optical signal to said first ring transmission system over a protection line, while receiving an optical signal transmitted from another node of said first ring transmission system over said working line, receiving an optical signal transmitted from another node of said first ring transmission system over said protection line, and transmitting said optical signal to an external ring transmission system over said working line;
- a first primary node for receiving said optical signal transmitted from said first add/drop node over said working line, and transmitting said optical signal to an external ring transmission system and another node of said first ring transmission system over said working line, while receiving an optical signal transmitted from said external ring transmission system over said working line and an optical signal transmitted from another node of said first ring transmission system over said protection line, selecting either one of said received optical signals, and transmitting said selected optical signal to another node of said first ring transmission system over said working line;
- a first secondary node for receiving an optical signal transmitted from said first add/drop node over said protection line, and transmitting said optical signal to a node of said external ring transmission system over said protection line, while receiving an optical signal transmitted from a node of said external ring transmission system over said protection line, and transmitting said optical signal to said first add/drop node over said protection line;

said second ring transmission system comprises:
- a second primary node for receiving said optical signal transmitted from said first primary node of said first ring transmission system over said working line, and transmitting said optical signal to another node of said second ring transmission system over said working line, while receiving an optical signal transmitted from another node of said second ring transmission system over said working line, and transmitting said optical signal to said first primary node of said first ring transmission system over said working line;
- a second secondary node for receiving an optical signal transmitted from said first secondary node of said first ring transmission system over said protection line, and transmitting said optical signal to another node of said second ring transmission ring over said protection line, while receiving said optical signal transmitted from another node of said second ring transmission system over said protection line, and transmitting said optical signal to said first secondary node of said first ring transmission system over said protection line;
- a second add/drop node for receiving said optical signal transmitted from said second primary node over said protection line, receiving said optical signal transmitted from another node of said second ring transmission system over said working line, and transmitting said optical signal to an external ring transmission system over said working line, while receiving an optical signal transmitted from said external ring transmission system over said working line, transmitting said optical signal to another node of said second ring transmission system over said working line, and transmitting said optical signal to another node of said second ring transmission system over said protection line;

said optical transmitting method performed in each of said nodes comprising the steps of:
- a data link reading step of reading said crossconnect information of said data link channel and topology information uniquely representing the order of arrangement of optical transmitting apparatuses connected in ring;
- a topology creating step of creating a topology using said topology information read at said data link reading step;

a data link writing step of writing a unique absolute node identifier given to each of a plurality of nodes and a relative node identifier given by relating absolute node identifiers of other nodes with said topology in said crossconnect information of said data link channel on the basis of said topology created at said topology creating step;

a squelch table creating step of creating a squelch table holding said crossconnect information written in said data link channel;

an RIP table creating step of creating an RIP table holding a primary node identifier indicating a primary node transmitting said optical signal from said first ring transmission path to said second ring transmission path, a secondary node identifier indicating a secondary node adjacent to said primary node to transmit/receive said optical signal, and said drop node identifier for each of said working line and said protection line on the basis of said crossconnect information; and a node recognizing step of recognizing from said relative node identifier of said crossconnect information read at said data link reading step which its own node is said primary node or said secondary node.

* * * * *